(12) United States Patent
Sussman et al.

(10) Patent No.: US 8,204,770 B2
(45) Date of Patent: *Jun. 19, 2012

(54) COMPUTER-IMPLEMENTED SYSTEMS AND METHODS FOR RESOURCE ALLOCATION

(75) Inventors: Adam Sussman, Los Angeles, CA (US); Robert Bennett, Los Angeles, CA (US); Dennis Denker, Scottsdale, AZ (US)

(73) Assignee: Ticketmaster, West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,085

(22) Filed: Jul. 8, 2011

(65) Prior Publication Data

US 2012/0047268 A1   Feb. 23, 2012

Related U.S. Application Data

(63) Continuation of application No. 11/702,733, filed on Feb. 6, 2007, now Pat. No. 7,979,291, which is a continuation of application No. 11/386,459, filed on Mar. 22, 2006, now Pat. No. 7,945,463.

(60) Provisional application No. 60/663,999, filed on Mar. 22, 2005, provisional application No. 60/664,000, filed on Mar. 22, 2005, provisional application No. 60/664,028, filed on Mar. 22, 2005, provisional application No. 60/664,131, filed on Mar. 22, 2005, provisional application No. 60/664,234, filed on Mar. 22, 2005.

(51) Int. Cl.
*G06Q 10/00* (2012.01)
*G06Q 40/00* (2012.01)
*G06F 17/00* (2006.01)

(52) U.S. Cl. ............... 705/5; 705/1.1; 705/7.32; 705/37
(58) Field of Classification Search .................. 705/5–6, 705/1.1, 7.32, 37
See application file for complete search history.

(56) References Cited

U.S. PATENT DOCUMENTS 3,581,072 A   5/1971   Nymeyer
(Continued)

FOREIGN PATENT DOCUMENTS

EP   0828223   3/1998
(Continued)

OTHER PUBLICATIONS

Dai, Fei et al., An Analysis Pattern for the Request and Allocation of Limited Resources, Jun. 30, 2002, Florida Atlantic University, pp. 1-10.*

(Continued)

*Primary Examiner* — Fadey Jabr
(74) *Attorney, Agent, or Firm* — Knobbe, Martens, Olson & Bear LLP

(57) ABSTRACT

Systems and methods are described for processing queue data and for providing queue messaging over a network. An illustrative queuing system includes a first queue configured to hold resource requests from a plurality of users, and program code stored in computer readable memory configured to determine or estimate whether a resource requested by a first resource request submitted by a first requester will be available when the first resource request will be serviced, and to transmit a message over a network to the first requester indicating that the requested resource will not be available when the queued request is serviced if it is estimated or determined that the requested resource will not be available when the first request is serviced.

18 Claims, 32 Drawing Sheets

U.S. PATENT DOCUMENTS

| | | | |
|---|---|---|---|
| 3,622,995 A | 11/1971 | Dilks |
| 4,412,287 A | 10/1983 | Braddock, III |
| 4,603,232 A | 7/1986 | Kurland et al. |
| 4,788,643 A | 11/1988 | Trippe et al. |
| 4,789,928 A | 12/1988 | Fujisaki |
| 4,799,156 A | 1/1989 | Shavit et al. |
| 4,816,904 A | 3/1989 | McKenna et al. |
| 4,845,739 A | 7/1989 | Katz |
| 4,862,357 A | 8/1989 | Ahlstrom et al. |
| 4,889,280 A | 12/1989 | Gradl et al. |
| 4,980,826 A | 12/1990 | Wagner |
| 5,077,665 A | 12/1991 | Silverman et al. |
| 5,101,353 A | 3/1992 | Lupien et al. |
| 5,112,050 A | 5/1992 | Koza et al. |
| 5,136,501 A | 8/1992 | Silverman et al. |
| 5,181,786 A | 1/1993 | Hujink |
| 5,237,499 A | 8/1993 | Garback |
| 5,239,480 A | 8/1993 | Huegel |
| 5,253,165 A | 10/1993 | Leiseca et al. |
| 5,265,916 A | 11/1993 | Coe |
| 5,283,734 A | 2/1994 | Von Kohorn |
| 5,311,425 A | 5/1994 | Inada |
| 5,329,589 A | 7/1994 | Fraser et al. |
| 5,333,257 A | 7/1994 | Merrill et al. |
| 5,347,306 A | 9/1994 | Nitta |
| 5,408,417 A | 4/1995 | Wilder |
| 5,422,809 A | 6/1995 | Griffin et al. |
| 5,426,281 A | 6/1995 | Abecassis |
| 5,428,778 A | 6/1995 | Brookes |
| 5,475,585 A | 12/1995 | Bush |
| 5,489,096 A | 2/1996 | Aron |
| 5,496,991 A | 3/1996 | Delfer et al. |
| 5,518,239 A | 5/1996 | Johnston |
| 5,553,145 A | 9/1996 | Micali |
| 5,557,518 A | 9/1996 | Rosen |
| 5,559,707 A | 9/1996 | DeLorme et al. |
| 5,592,375 A | 1/1997 | Salmon et al. |
| 5,598,477 A | 1/1997 | Berson |
| 5,634,101 A | 5/1997 | Blau |
| 5,664,115 A | 9/1997 | Fraser |
| 5,724,520 A | 3/1998 | Goheen |
| 5,742,763 A | 4/1998 | Jones |
| 5,754,654 A | 5/1998 | Hiroya et al. |
| 5,757,917 A | 5/1998 | Rose et al. |
| 5,774,873 A | 6/1998 | Berent et al. |
| 5,794,207 A | 8/1998 | Walker et al. |
| 5,794,210 A | 8/1998 | Goldhaber et al. |
| 5,794,219 A | 8/1998 | Brown |
| 5,797,126 A | 8/1998 | Helbling et al. |
| 5,812,670 A | 9/1998 | Micali |
| 5,818,914 A | 10/1998 | Fujisaki |
| 5,826,241 A | 10/1998 | Stein et al. |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,890,138 A | 3/1999 | Godin et al. |
| 5,918,209 A | 6/1999 | Campbell et al. |
| 6,023,685 A | 2/2000 | Brett et al. |
| 6,023,686 A | 2/2000 | Brown |
| 6,026,383 A | 2/2000 | Ausubel |
| 6,038,537 A | 3/2000 | Matsuoka |
| 6,044,363 A | 3/2000 | Mori et al. |
| 6,047,264 A | 4/2000 | Fisher et al. |
| 6,048,271 A | 4/2000 | Barcelou |
| 6,067,532 A | 5/2000 | Gebb |
| 6,070,146 A | 5/2000 | Mimata |
| 6,082,620 A | 7/2000 | Bone, Jr. |
| 6,085,164 A | 7/2000 | Smith et al. |
| 6,085,169 A | 7/2000 | Walker et al. |
| 6,085,976 A | 7/2000 | Sehr |
| 6,094,640 A | 7/2000 | Goheen |
| 6,107,932 A | 8/2000 | Walker et al. |
| 6,119,096 A | 9/2000 | Mann et al. |
| 6,119,945 A | 9/2000 | Muller et al. |
| 6,175,922 B1 | 1/2001 | Wang et al. |
| 6,192,349 B1 | 2/2001 | Husemann et al. |
| 6,216,227 B1 | 4/2001 | Goldstein et al. |
| 6,223,166 B1 | 4/2001 | Kay |
| 6,230,146 B1 | 5/2001 | Alaia et al. |
| 6,240,396 B1 | 5/2001 | Walker et al. |
| 6,243,691 B1 | 6/2001 | Fisher et al. |
| 6,246,996 B1 | 6/2001 | Stein et al. |
| 6,263,315 B1 | 7/2001 | Talluri |
| 6,308,159 B1 | 10/2001 | Strohl |
| 6,313,833 B1 | 11/2001 | Knight |
| 6,332,129 B1 | 12/2001 | Walker et al. |
| 6,341,353 B1 | 1/2002 | Herman et al. |
| 6,418,415 B1 | 7/2002 | Walker et al. |
| 6,434,398 B1 | 8/2002 | Inselberg |
| 6,446,045 B1 | 9/2002 | Stone et al. |
| 6,449,346 B1 | 9/2002 | Katz |
| 6,466,917 B1 | 10/2002 | Goyal et al. |
| 6,470,451 B1 | 10/2002 | Weinstein |
| 6,477,503 B1 | 11/2002 | Mankes |
| 6,484,153 B1 | 11/2002 | Walker et al. |
| 6,496,809 B1 | 12/2002 | Nakfoor |
| 6,523,037 B1 | 2/2003 | Monahan et al. |
| 6,556,548 B1 | 4/2003 | Kirkby et al. |
| 6,603,568 B1 | 8/2003 | Sansone |
| 6,604,107 B1 | 8/2003 | Wang |
| 6,658,390 B1 | 12/2003 | Walker et al. |
| 6,679,421 B2 | 1/2004 | Shin et al. |
| 6,685,093 B2 | 2/2004 | Challa et al. |
| 6,690,794 B1 | 2/2004 | Terao et al. |
| 6,704,713 B1 | 3/2004 | Brett et al. |
| 6,736,322 B2 | 5/2004 | Gobburu et al. |
| 6,820,201 B1 | 11/2004 | Lincoln et al. |
| 6,842,741 B1 | 1/2005 | Fujimura |
| 6,854,651 B2 | 2/2005 | Smith et al. |
| 6,877,661 B2 | 4/2005 | Webb et al. |
| 6,877,665 B2 | 4/2005 | Challa et al. |
| 6,901,429 B2 | 5/2005 | Dowling |
| 6,907,405 B2 | 6/2005 | Brett |
| 6,910,019 B2 | 6/2005 | Dorr |
| 6,910,627 B1 | 6/2005 | Simpson-Young et al. |
| 6,920,428 B2 | 7/2005 | Greene |
| 6,944,599 B1 | 9/2005 | Vogel et al. |
| 6,963,854 B1 | 11/2005 | Boyd et al. |
| 6,965,914 B2 | 11/2005 | Dowling |
| 6,999,936 B2 | 2/2006 | Sehr |
| 7,003,485 B1 | 2/2006 | Young |
| 7,004,388 B2 | 2/2006 | Kohita |
| 7,010,494 B2 | 3/2006 | Etzioni et al. |
| 7,031,945 B1 | 4/2006 | Donner |
| 7,044,362 B2 | 5/2006 | Yu |
| 7,058,602 B1 | 6/2006 | La Mura et al. |
| 7,069,243 B2 | 6/2006 | Dinwoodie |
| 7,076,460 B2 | 7/2006 | Dinwoodie |
| 7,076,558 B1 | 7/2006 | Dunn |
| 7,080,026 B2 | 7/2006 | Singh et al. |
| 7,080,030 B2 | 7/2006 | Eglen et al. |
| 7,080,328 B1 | 7/2006 | Sawyer |
| 7,080,882 B2 | 7/2006 | Stitt |
| 7,083,081 B2 | 8/2006 | McGee et al. |
| 7,085,818 B2 | 8/2006 | Brown et al. |
| 7,092,892 B1 | 8/2006 | Sobalvarro et al. |
| 7,093,130 B1 | 8/2006 | Kobayashi et al. |
| 7,099,841 B1 | 8/2006 | Hall et al. |
| 7,110,960 B2 | 9/2006 | Phillips et al. |
| 7,114,179 B1 | 9/2006 | Ritter et al. |
| 7,127,404 B1 | 10/2006 | Poon |
| 7,127,408 B2 | 10/2006 | Rosen |
| 7,133,848 B2 | 11/2006 | Phillips et al. |
| 7,139,916 B2 | 11/2006 | Billingsley et al. |
| 7,149,549 B1 | 12/2006 | Ortiz et al. |
| 7,152,043 B2 | 12/2006 | Alaia et al. |
| 7,162,454 B1 | 1/2007 | Donner et al. |
| 7,171,472 B2 | 1/2007 | O'Brien et al. |
| 7,177,945 B2 | 2/2007 | Hong et al. |
| 7,191,147 B2 | 3/2007 | Heene et al. |
| 7,213,754 B2 | 5/2007 | Eglen et al. |
| 7,225,442 B2 * | 5/2007 | Dutta et al. ................ 718/100 |
| 7,228,350 B2 | 6/2007 | Hong et al. |
| 7,248,888 B2 | 7/2007 | Inselberg |
| 7,328,166 B1 | 2/2008 | Geoghegan et al. |
| 7,333,943 B1 | 2/2008 | Charuk et al. |

| | | |
|---|---|---|
| 7,403,993 B2 | 7/2008 | John et al. |
| 7,418,496 B2 | 8/2008 | Macey et al. |
| 7,555,466 B2 | 6/2009 | Eglen et al. |
| 7,584,123 B1 | 9/2009 | Karonis et al. |
| 7,587,372 B2 | 9/2009 | Eglen et al. |
| 7,606,900 B2 * | 10/2009 | Martin et al. ............... 709/225 |
| 2001/0005833 A1 | 6/2001 | Asami et al. |
| 2001/0032115 A1 | 10/2001 | Goldstein |
| 2001/0034639 A1 | 10/2001 | Jacoby et al. |
| 2001/0034687 A1 | 10/2001 | Bushonville et al. |
| 2001/0049652 A1 | 12/2001 | Nakajima |
| 2001/0056374 A1 | 12/2001 | Joao |
| 2002/0004762 A1 | 1/2002 | Izumoto |
| 2002/0023955 A1 | 2/2002 | Frank et al. |
| 2002/0040308 A1 | 4/2002 | Hasegawa et al. |
| 2002/0040346 A1 | 4/2002 | Kwan |
| 2002/0042729 A1 | 4/2002 | Yajima et al. |
| 2002/0042749 A1 | 4/2002 | Yugami et al. |
| 2002/0052758 A1 | 5/2002 | Arthur et al. |
| 2002/0052774 A1 | 5/2002 | Parker et al. |
| 2002/0052965 A1 | 5/2002 | Dowling |
| 2002/0062236 A1 | 5/2002 | Murashita et al. |
| 2002/0062265 A1 | 5/2002 | Poon |
| 2002/0065763 A1 | 5/2002 | Taylor et al. |
| 2002/0065783 A1 | 5/2002 | Na et al. |
| 2002/0072999 A1 | 6/2002 | Andres et al. |
| 2002/0082879 A1 | 6/2002 | Miller et al. |
| 2002/0082969 A1 | 6/2002 | O'Keefe et al. |
| 2002/0087456 A1 | 7/2002 | Abeshouse et al. |
| 2002/0091555 A1 | 7/2002 | Leppink |
| 2002/0094090 A1 | 7/2002 | Lino |
| 2002/0095357 A1 | 7/2002 | Hunter et al. |
| 2002/0103849 A1 | 8/2002 | Smith |
| 2002/0107726 A1 | 8/2002 | Torrance et al. |
| 2002/0107779 A1 | 8/2002 | Maltzman |
| 2002/0116343 A1 | 8/2002 | Nakamura et al. |
| 2002/0116348 A1 | 8/2002 | Phillips et al. |
| 2002/0120492 A1 | 8/2002 | Phillips et al. |
| 2002/0128922 A1 | 9/2002 | Joao |
| 2002/0133424 A1 | 9/2002 | Joao |
| 2002/0138325 A1 | 9/2002 | Mashimo et al. |
| 2002/0138751 A1 | 9/2002 | Dutta |
| 2002/0138770 A1 | 9/2002 | Dutta |
| 2002/0143860 A1 | 10/2002 | Catan |
| 2002/0152458 A1 | 10/2002 | Eyer et al. |
| 2002/0156715 A1 | 10/2002 | Wall et al. |
| 2002/0169623 A1 | 11/2002 | Call et al. |
| 2002/0169694 A1 | 11/2002 | Stone et al. |
| 2002/0174026 A1 | 11/2002 | Pickover et al. |
| 2002/0178018 A1 | 11/2002 | Gillis et al. |
| 2002/0178093 A1 | 11/2002 | Dean et al. |
| 2002/0178226 A1 | 11/2002 | Anderson et al. |
| 2002/0188523 A1 | 12/2002 | Hyyppa et al. |
| 2002/0188551 A1 | 12/2002 | Grove et al. |
| 2003/0023500 A1 | 1/2003 | Boies et al. |
| 2003/0023734 A1 * | 1/2003 | Martin et al. ............... 709/229 |
| 2003/0024988 A1 | 2/2003 | Stanard |
| 2003/0040943 A1 | 2/2003 | Bates et al. |
| 2003/0061303 A1 | 3/2003 | Brown et al. |
| 2003/0067464 A1 | 4/2003 | Gathman et al. |
| 2003/0069762 A1 | 4/2003 | Gathman et al. |
| 2003/0069763 A1 | 4/2003 | Gathman et al. |
| 2003/0069764 A1 | 4/2003 | Gathman et al. |
| 2003/0069789 A1 | 4/2003 | Gathman et al. |
| 2003/0069810 A1 | 4/2003 | Gathman et al. |
| 2003/0069827 A1 | 4/2003 | Gathman et al. |
| 2003/0069829 A1 | 4/2003 | Gathman et al. |
| 2003/0101213 A1 * | 5/2003 | Wright ............... 709/203 |
| 2003/0105641 A1 | 6/2003 | Lewis |
| 2003/0154142 A1 | 8/2003 | Ginsburg et al. |
| 2003/0154169 A1 | 8/2003 | Yanai |
| 2003/0163373 A1 | 8/2003 | Cornateanu |
| 2003/0164400 A1 | 9/2003 | Boyd |
| 2003/0171960 A1 | 9/2003 | Skinner |
| 2003/0177022 A1 | 9/2003 | Francis |
| 2003/0185197 A1 | 10/2003 | Banerjee et al. |
| 2003/0187802 A1 | 10/2003 | Booth |
| 2003/0200137 A1 | 10/2003 | Drummond |
| 2003/0229790 A1 | 12/2003 | Russell |
| 2003/0233337 A1 | 12/2003 | Yanase et al. |
| 2003/0236736 A1 | 12/2003 | Harmon et al. |
| 2004/0006497 A1 | 1/2004 | Nestor et al. |
| 2004/0019571 A1 | 1/2004 | Hurwitz et al. |
| 2004/0039635 A1 | 2/2004 | Linde et al. |
| 2004/0039696 A1 | 2/2004 | Harmon et al. |
| 2004/0049412 A1 | 3/2004 | Johnson |
| 2004/0054574 A1 | 3/2004 | Kaufman et al. |
| 2004/0073439 A1 | 4/2004 | Shuster |
| 2004/0083156 A1 | 4/2004 | Schulze |
| 2004/0086257 A1 | 5/2004 | Werberg et al. |
| 2004/0093175 A1 | 5/2004 | Tan |
| 2004/0111303 A1 | 6/2004 | Francis |
| 2004/0128257 A1 | 7/2004 | Okamoto et al. |
| 2004/0128516 A1 | 7/2004 | Okamoto et al. |
| 2004/0138962 A1 | 7/2004 | Kopelman et al. |
| 2004/0148219 A1 | 7/2004 | Norris |
| 2004/0172270 A1 | 9/2004 | Sugimoto et al. |
| 2004/0186765 A1 | 9/2004 | Kataoka |
| 2004/0204990 A1 | 10/2004 | Lee et al. |
| 2004/0204991 A1 | 10/2004 | Monahan et al. |
| 2004/0215527 A1 | 10/2004 | Grove et al. |
| 2004/0220821 A1 | 11/2004 | Ericsson et al. |
| 2004/0225540 A1 | 11/2004 | Waytena et al. |
| 2004/0260659 A1 | 12/2004 | Chan et al. |
| 2005/0001711 A1 | 1/2005 | Doughty et al. |
| 2005/0004818 A1 | 1/2005 | Liman |
| 2005/0004819 A1 | 1/2005 | Etzioni et al. |
| 2005/0015303 A1 | 1/2005 | Dubin et al. |
| 2005/0015308 A1 | 1/2005 | Grove et al. |
| 2005/0021364 A1 | 1/2005 | Nakfoor |
| 2005/0021365 A1 | 1/2005 | Nakfoor |
| 2005/0021417 A1 | 1/2005 | Kassan |
| 2005/0027608 A1 | 2/2005 | Wiesmuller et al. |
| 2005/0027641 A1 | 2/2005 | Grove et al. |
| 2005/0043994 A1 | 2/2005 | Walker et al. |
| 2005/0055275 A1 | 3/2005 | Newman et al. |
| 2005/0060271 A1 | 3/2005 | Vig |
| 2005/0065866 A1 | 3/2005 | Grove et al. |
| 2005/0071245 A1 | 3/2005 | Norins, Jr. et al. |
| 2005/0091069 A1 | 4/2005 | Chuang |
| 2005/0131809 A1 | 6/2005 | Watt, II et al. |
| 2005/0132267 A1 | 6/2005 | Aviv |
| 2005/0139661 A1 | 6/2005 | Eglen et al. |
| 2005/0139662 A1 | 6/2005 | Eglen et al. |
| 2005/0140675 A1 | 6/2005 | Billingsley et al. |
| 2005/0144115 A1 | 6/2005 | Brett |
| 2005/0149458 A1 | 7/2005 | Eglen et al. |
| 2005/0160020 A1 | 7/2005 | Asher et al. |
| 2005/0165758 A1 | 7/2005 | Kasten et al. |
| 2005/0193333 A1 | 9/2005 | Ebert |
| 2005/0198107 A1 | 9/2005 | Cuhls et al. |
| 2005/0209954 A1 | 9/2005 | Asher et al. |
| 2005/0213742 A1 * | 9/2005 | Fukuzawa ............... 379/265.02 |
| 2005/0228722 A1 | 10/2005 | Embree |
| 2005/0240453 A1 | 10/2005 | Lyons |
| 2005/0273405 A1 | 12/2005 | Chen |
| 2006/0010029 A1 | 1/2006 | Gross |
| 2006/0017541 A1 | 1/2006 | Nguyen |
| 2006/0085396 A1 | 4/2006 | Evans et al. |
| 2006/0095344 A1 | 5/2006 | Nakfoor |
| 2006/0100985 A1 | 5/2006 | Mark et al. |
| 2006/0105783 A1 | 5/2006 | Giraldin et al. |
| 2006/0108418 A1 | 5/2006 | Rice |
| 2006/0111959 A1 | 5/2006 | Tarr et al. |
| 2006/0111967 A1 | 5/2006 | Forbes |
| 2006/0116916 A1 | 6/2006 | Bowman et al. |
| 2006/0124734 A1 | 6/2006 | Wallerstorfer et al. |
| 2006/0140374 A1 | 6/2006 | Light et al. |
| 2006/0143094 A1 | 6/2006 | Kohout et al. |
| 2006/0143109 A1 | 6/2006 | Goel |
| 2006/0143698 A1 | 6/2006 | Ohara |
| 2006/0144946 A1 | 7/2006 | Kuriyama et al. |
| 2006/0147005 A1 * | 7/2006 | Taub ............... 379/114.2 |
| 2006/0147024 A1 | 7/2006 | Dezonno et al. |
| 2006/0148566 A1 | 7/2006 | Lakshminarasimha |
| 2006/0155659 A1 | 7/2006 | DiCesare |
| 2006/0155857 A1 | 7/2006 | Feenan et al. |
| 2006/0161474 A1 | 7/2006 | Diamond et al. |

| | | | |
|---|---|---|---|
| 2006/0167756 A1 | 7/2006 | VonBergen et al. | |
| 2006/0178930 A1 | 8/2006 | Kim | |
| 2006/0190387 A1 | 8/2006 | Molloy | |
| 2006/0190388 A1 | 8/2006 | Molloy | |
| 2006/0190389 A1 | 8/2006 | Molloy | |
| 2006/0190390 A1 | 8/2006 | Molloy | |
| 2006/0195356 A1 | 8/2006 | Nerenhausen et al. | |
| 2006/0232110 A1 | 10/2006 | Ovadia | |
| 2006/0244564 A1 | 11/2006 | Madsen | |
| 2006/0249572 A1 | 11/2006 | Chen et al. | |
| 2006/0271462 A1 | 11/2006 | Harmon | |
| 2006/0277130 A1 | 12/2006 | Harmon | |
| 2006/0287898 A1 | 12/2006 | Murashita et al. | |
| 2006/0293929 A1 | 12/2006 | Wu et al. | |
| 2006/0293994 A1 | 12/2006 | Stuart | |
| 2007/0012765 A1 | 1/2007 | Trinquet et al. | |
| 2007/0017979 A1 | 1/2007 | Wu et al. | |
| 2007/0022020 A1 | 1/2007 | Bernstein | |
| 2007/0245351 A1 | 10/2007 | Sussman et al. | |
| 2008/0027827 A1 | 1/2008 | Eglen et al. | |
| 2008/0052252 A1 | 2/2008 | Eglen et al. | |
| 2008/0059384 A1 | 3/2008 | Eglen et al. | |
| 2008/0065566 A1 | 3/2008 | Eglen et al. | |
| 2008/0065567 A1 | 3/2008 | Eglen et al. | |
| 2008/0194987 A1 | 8/2008 | Boecker | |
| 2008/0215452 A1 | 9/2008 | Eglen et al. | |
| 2008/0215507 A1 | 9/2008 | Eglen et al. | |
| 2008/0221948 A1 | 9/2008 | Eglen et al. | |
| 2008/0262903 A1 | 10/2008 | Keser et al. | |
| 2008/0300956 A1* | 12/2008 | Nishikawa et al. | 705/9 |
| 2009/0043637 A1 | 2/2009 | Eder | |
| 2009/0132904 A1 | 5/2009 | Holloway et al. | |
| 2009/0292593 A1 | 11/2009 | Seki et al. | |
| 2010/0241475 A1 | 9/2010 | Eglen et al. | |
| 2010/0241491 A1 | 9/2010 | Eglen et al. | |
| 2010/0241492 A1 | 9/2010 | Eglen et al. | |
| 2011/0082761 A1 | 4/2011 | Eglen et al. | |

FOREIGN PATENT DOCUMENTS

| | | |
|---|---|---|
| EP | 1069539 | 1/2001 |
| JP | 5266049 | 10/1993 |
| JP | 11031204 | 2/1999 |
| WO | WO 88/03295 | 5/1988 |
| WO | WO 98/10361 | 3/1998 |
| WO | WO 99/06928 | 2/1999 |
| WO | WO 99/18533 | 4/1999 |
| WO | WO 99/38129 | 7/1999 |
| WO | WO 99/60489 | 11/1999 |
| WO | WO 00/62260 | 10/2000 |
| WO | WO 00/74300 | 12/2000 |
| WO | WO 00/75838 | 12/2000 |
| WO | WO 01/03040 | 1/2001 |
| WO | WO 01/08065 | 2/2001 |
| WO | WO 01/41021 | 6/2001 |
| WO | WO 01/41085 | 6/2001 |
| WO | WO 01/44892 | 6/2001 |
| WO | WO 01/52139 | 7/2001 |
| WO | WO 01/59649 | 8/2001 |
| WO | WO 01/59658 | 8/2001 |
| WO | WO 01/71669 | 9/2001 |
| WO | WO 01/84473 | 11/2001 |
| WO | WO 02/03174 | 1/2002 |
| WO | WO 02/35322 | 5/2002 |
| WO | WO 03/027808 | 4/2003 |

OTHER PUBLICATIONS

"Acteva and Enspot.com Sign Agreement to Provide On-Line Ticketing, Broader Distribution", Business Wire (Dec. 3, 1999).
"AuctionNet Still One-Of-A-Kind", Automotive News, S12 (Sep. 20, 1993).
"Cathay Pacific Airways Auctions a Boeing 747-400 Worth of Seats in Third Cybertraveler Auction", Business Wire (Apr. 29, 1996).
"Cathay Pacific Airways-USA Receives More than 1,300 Bids During First Five Days of CyberAuction", Business Wire (Oct. 18, 1995).
"Cathay Pacific Airways-USA to Hold First-Ever Internet CyberAuction", Business Wire (Sep. 26, 1995).
"E-TicketBoard Launches PSL Xchange for Eight NFL Teams", PR Newswire (Jul. 18, 2000).
"E-TicketBoard Launches Revolutionary New Site—Seats and Suites", PR Newswire (Oct. 17, 2000).
"Keyware Unveils Multi-Application Smart Card Suite", Card News, vol. 16, No. 10 (May 30, 2001).
"Online Movie Ticket Site Launched in China", China Online (Dec. 23, 1999).
"OnSale Brings Thrill of the Auction to the Web", Link-up p. 34 (Jul./Aug. 1995).
"Season Ticket Solutions Announces Availability of Ticket Exchange for Sporting Teams and Entertainment Venues", Business Wire (Jul. 30, 2001).
"WBGH to Hold Online Computer Auction", Link-Up, p. 10 (Sep./Oct. 1988).
Article from Smart Card News, "Major Players form Proton World International," Aug. 1998, pp. 141-160.
Asokan et al., "SEMPER Consortium: Advanced Services, Architecture and Design," Deliverable D10 of ACTS Project AC026, Mar. 15, 1999.
Banâtre, "Distributed Auction Bidding System", International Computing Symposium, vol. 4, No. 4 (Aug. 1981).
Banks, "PSL Put Owners on the Hot Seat", St. Petersburg Times, p. 10C (Oct. 31, 1993).
Beam et al, "Electronic Negotiation through Internet-Based Auctions", CITM Working Paper 96-WP-1019, http://haas.berkeley.edu/citm/publications/papers/wp-1019.pdf (Dec. 1996).
Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Chui et al., "Auction on the Internet—A Preliminary Study," Department of Marketing, HK University of Science and Technology; 1999, pp. 1-7.
Collier, "Columbia, S.C.-Based Internet Firm Helps Buy, Sell Sports Tickets", The State, (Oct. 23, 2000).
U.S. Appl. No. 09/702,794, filed Nov. 1, 2000.
Courty, et al. "An Economic Guide to Ticket Pricing in the Entertainment Industry," London Business School, pp. 167-192, Jun. 1, 2000.
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Fujimura et al., "Digital-Ticket-Controlled Digital Ticket Circulation," NTT Information Sharing Platform Laboratories, USENIX Security Symposium, Aug. 23-26, 1999.
Fujimura et al., "General-purpose Digital Ticket Framework," NTT Information and Communication Systems Labs, USENIX Workshop on Electronic Commerce, Aug. 31-Sep. 1998.
Fujimura, "XML Ticket: Generalized Digital Ticket Definition Language," The W3C Signed XML Workshop—Copyright © 1999, 33 pages.
Garza, "Space Cruise", Reason (May 2000).
Happel, "Creating a Futures Market for Major Event Tickets: Problems and Prospects", Cato Journal, vol. 21, No. 3 (Winter 2002).
Harlan, "At Least it isn't the Team's Ball that's in Somebody Else's Court", Wall Street Journal (Jun. 4, 1991).
Hes et al., "At Face Value" on biometrical identification and privacy, Registratiekamer, Sep. 1999, 78 pages.
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
In, Shirley Siu Weng, "A Proposed Electronic Ticket Management for Trading Service in Internet," Feb. 9, 2001, 7 pages.
International Search Report for PCT Application—PCT /US06/10295, mailing date Sep. 14, 2007.
Jackson, "Media Futures: This Bazaar Could Put Retailers Under the Hammer", Financial Times (May 25, 1995).
Jenkins, "Giants Draw Fans into Web Team Helps Season-Ticket Holders Get Mileage Out of Plans", USA Today, p. 3C (Jun. 27, 2000).
Kasper, "Purchase Griz Playoff Tickets Now", Missoulian Online (May 3, 2001).

Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Krueger, "Music Sales Slump, Concert Tickets Costs Jump and Rock Fans Pay the Price," Oct. 17, 2002, New York Times, Late Edition, pp. C2.
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Matsuyama et al., "Distributed Digital-Ticket Management for Rights Trading System," E-Commerce, 1999, pp. 110-118.
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.uni-mannheim.de/publications/dp99-75.pdf (Jul. 14, 1999).
Nestor et al, "Transforming Tickets from a Commodity into a Valuable Strategic Asset", Global eTicket Exchange whitepaper, Oct. 13, 2000.
Office Action Dated Oct. 8, 2009, U.S. Appl. No. 11/702,993.
Office Action Dated Nov. 25, 2008, U.S. Appl. No. 11/386,459.
Office Action Dated May 26, 2009, U.S. Appl. No. 11/386,459.
Office Action Dated Jun. 26, 2009, U.S. Appl. No. 11/702,344.
Office Action Dated Jul. 21, 2009, U.S. Appl. No. 11/699,283.
Office Action Dated Jul. 27, 2009, U.S. Appl. No. 11/702,803.
Office Action in U.S. Appl. No. 11/453,286, mailed Nov. 5, 2007.
Office Action mailed on Aug. 2, 2007 in U.S. Appl. No. 11/453,286.
Office Action mailed on Jul. 27, 2007 in U.S. Appl. No. 11/475,733.
O'Neil, "Q and A", St. Louis Post-Dispatch, p. 4D (Jan. 19, 1995).
Pelline, "Cathay Pacific to Auction Off Airline Tickets on the Internet", San Francisco Chronicle, p. C4 (Apr. 30, 1996).
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Scheff, "Factors Influencing Subscription and Single-Ticket Purchases at Performing Arts Organizations," 1999, International Journal of Arts Management, pp. 16-27.
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
www.TicketOptions.com Web Pages, as retrieved from archive.org (2001).
www.trashcity.org (web archive Jan. 12, 2004).
wwwSeasonTicket.com Web Pages, as retrieved from archive.org (2001).
Zoltak, "Advantix Acquisitions Continue with Protix Deal", Amusement Business (Nov. 2, 1998).

* cited by examiner

| Group | Pop % | Patience Param | 1 Median Price | 1 75% Price Threshold | 1 No. of tickets | 2 Median Price | 2 75% Price Threshold | 2 No. of tickets | 3 Median Price | 3 75% Price Threshold | 3 No. of tickets | 4 Median Price | 4 75% Price Threshold | 4 No. of tickets |
|---|---|---|---|---|---|---|---|---|---|---|---|---|---|---|
| Show offs | 9.0% | 25% | $600.00 | $800.00 | 2 | $300.00 | $400.00 | 2 | $0.00 | $0.00 | 0 | $0.00 | $0.00 | 0 |
| High Income fans | 22.0% | 25% | $350.00 | $425.00 | 3 | $150.00 | $225.00 | 2 | $40.00 | $50.00 | 4 | $50.00 | $0.00 | 0 |
| Middle Income fans | 34.0% | 75% | $85.00 | $110.00 | 3 | $85.00 | $110.00 | 4 | $40.00 | $50.00 | 4 | $50.00 | $30.00 | 4 |
| Low income fans | 15.0% | 75% | $25.00 | $30.00 | 2 | $25.00 | $30.00 | 2 | $25.00 | $30.00 | 4 | $30.00 | $30.00 | 4 |
| Socially oriented | 10.0% | 50% | $15.00 | $20.00 | 4 | $15.00 | $20.00 | 4 | $15.00 | $20.00 | 4 | $20.00 | $20.00 | 6 |
| Brokers | 10.0% | 90% | $120.00 | $135.00 | 10 | $85.00 | $100.00 | 10 | $0.00 | $0.00 | 0 | $0.00 | $0.00 | 0 |
| END | | | | | | | | | | | | | | |

*FIG. 4*

Welcome

Bon Jovi-Have a Nice Day Auction
Air Canada Centre, Toronto, ON
Mon, Jan 30, 2006 07:30 PM

GRAPHIC IMAGE

Auction Start: Sat, 11/12/05 10:00 AM EST
Auction End: Mon, 11/21/05 12:00 PM EST
Auction time remaining: 1 day, 6 hrs

Event Details

Seating Chart

Additional information can go here.
So on and so forth.

SPRINT/AEG LIVE PRESENT
BON JOVI
HAVE A NICE DAY TOUR
AIR CANADA CENTRE
GST# 890906803RT0001
MON JAN 23, 2006 7:30PM

-See Onsale info
-View all Auctions

REQUEST ACCESSIBLE TICKET

| ONSALE NOW | BID ON AUCTION |

Bid on Bon Jovi Auction Tickets

Customize Your Auction! All winning bidders will receive reserved seats in one of the Ticket Groups they select. The highest winning bidder will receive the best seats.

The more ticket groups you select for your bid, the greater your chances of winning tickets.
What are Ticket Groups?

STEP 1 ▶ Select one or more consecutive Ticket Groups:

| All | Ticket Group Description | Current per Ticket Minimum |
|---|---|---|
| ☐ | 1. Third Row ▼<br>This Ticket Group include the chance to win reserved seats with in the following location: Floor, Row 3, Seats 1-8 | US $110.00 |
| ☑ | 2. Fourth Row ▶ | US $90.00 |
| ☑ | 3. Fifth Row ▶ | US $80.00 |
| ☑ | 4. Sixth Row ▶ | US $70.00 |
| ☐ | 5. Seventh Row ▶ | US $60.00 |
| ☐ | 6. Ninth Row ▶ | US $60.00 |
| ☐ | 7. Eleventh Row ▶ | US $60.00 |
| ☐ | 8. Thirteenth Row ▶ | US $60.00 |
| ☐ | 9. Fourteenth Row ▶ | US $60.00 |
| ☐ | 10. Fifteenth Row ▶ | US $60.00 |

[ Next ]

Auction Rules

You can only have one valid bid at a time in an auction. Once you submit a bid, you will not be able to cancel it.

You may rebid and increase your bid amount at any time before the auction ends. If you rebid it is considered your new bid; your previous bid will no longer be valid.

Bids are ranked first by the amount bid per ticket. Ties will be broken based on the time that the bids were placed with earlier bids receiving priority. If other bidders later submit higher bids, your bid may be re-assigned to a lower Ticket Group or you may receive no tickets at all, depending on the quantities of tickets in those bids and in the Ticket Groups. If this happens, you may wish to rebid with a higher price.

If you have a valid winning bid when the auction ends, you agree to pay, and your credit card will be charged a per ticket price. equal to the amount you bid plus a delivery price (if applicable) and a processing fee.

*FIG. 8A*

GRAPHIC IMAGE

Bon Jovi-Have a Nice Day Auction
Air Canada Centre, Toronto, ON
Mon, Jan 30, 2006 07:30 PM Auction Start: Sat, 11/12/05 10:00 AM EST
Auction End: Mon, 11/21/05 12:00 PM EST
Auction time remaining: 1 day, 6 hrs

Event Details

Seating Chart

Additional information can go here. So on and so forth.

SPRINT/AEG LIVE PRESENT
BON JOVI
HAVE A NICE DAY TOUR
AIR CANADA CENTRE
GST# 890906803RT0001
MON JAN 23, 2006 7:30PM

-See Onsale Info
-View all Auctions

REQUEST ACCESSIBLE TICKET

| ONSALE NOW | BID ON AUCTION |

Bid on Bon Jovi Auction Tickets

Your bid will be competing in the following Ticket Groups:

| Ticket Group Description | Current per Ticket Minimum |
|---|---|
| 1. Third Row ▼ This Ticket Group include the chance to win reserved seats with in the following location: Floor, Row 3, Seats 1-8 | US $110.00 |
| 2. Fourth Row ▶ | US $90.00 |
| 3. Fifth Row ▶ | US $80.00 |
| 4. Sixth Row ▶ | US $70.00 |

Add More Ticket Groups

STEP 2▶ Enter your bid and desired number of tickets:

Bid per Ticket:$ [    ]   Increase Bid by Multiples of $10

Ticket Quantity: [0 ▼]

Total Bid Amount:      Recalculate Total

☑ Email me if my bid status changes.

[ Next ]

You must confirm your bid on the next page.

Auction Rules

You can only have one valid bid at a time in an auction. Once you submit a bid, you will not be able to cancel it.

You may rebid and increase your bid amount at any time before the auction ends. If you rebid it is considered your new bid; your previous bid will no longer be valid.

Bids are ranked first by the amount bid per ticket. Ties will be broken based on the time that the bids were placed with earlier bids receiving priority. If other bidders later submit higher bids, your bid may be re-assigned to a lower Ticket Group or you may receive no tickets at all, depending on the quantities of tickets in those bids and in the Ticket Groups. If this happens, you may wish to rebid with a higher price.

If you have a valid winning bid when the auction ends, you agree to pay, and your credit card will be charged a per ticket price, equal to the amount you bid plus a delivery price (if applicable) and a processing fee.

*FIG. 8B*

Bon Jovi—Have a Nice Day Auction
Air Canada Centre, Toronto, ON
Mon, Jan 30, 2006 07:30 PM Auction Start: Sat, 11/12/05 10:00 AM EST
Auction End: Mon, 11/21/05 12:00 PM EST
Auction time remaining: 1 day, 6 hrs

ONSALE NOW | BID ON AUCTION

Bid on Bon Jovi Auction Tickets

Bridget's Bid Status: Winning Ticket Group 2 • 11/21/05 5:50 PM EST        *Refresh Status*

Your bid will be competing in the following Ticket Groups:

| Ticket Group Description | Current per Ticket Minimum |
|---|---|
| 1. Third Row ▾ This Ticket Group include the chance to win reserved seats with in the following location: Floor, Row 3, Seats 1-8 | US $110.00 |
| 2. Fourth Row ▸ | US $90.00 |
| 3. Fifth Row ▸ | US $80.00 |
| 4. Sixth Row ▸ | US $70.00 |

Add More Ticket Groups to increase your chances of winning tickets

⚠ You must increase your bid to win seats in Ticket Group 1.

Increase Bid per Ticket to:$ [    ]

Calculate New Total Bid Amount:$

[Submit Increase]

You must confirm your new bid on the next page.

Your Current Bid Summary:
Bid Per Ticket: $100.00
Ticket Quantity: 4
Your Total Bid Amount: $400.00
(not including appropriate fees)

---

Event Details

*Seating Chart*

Additional Information can go here. So on and so forth.

SPRINT/AEG LIVE PRESENT
BON JOVI
HAVE A NICE DAY TOUR
AIR CANADA CENTRE
GST# 890906803RT0001
MON JAN 23, 2006 7:30PM

-See Onsale Info
-View all Auctions

[REQUEST ACCESSIBLE TICKET]

Auction Rules

You can only have one valid bid at a time in an auction. Once you submit a bid, you will not be able to cancel it.

You may rebid and increase your bid amount at any time before the auction ends. If you rebid it is considered your new bid; your previous bid will no longer be valid.

Bids are ranked first by the amount bid per ticket. Ties will be broken based on the time that the bids were placed with earlier bids receiving priority. If other bidders later submit higher bids, your bid may be re-assigned to a lower Ticket Group or you may receive no tickets at all, depending on the quantities of tickets in those bids and in the Ticket Groups. If this happens, you may wish to rebid with a higher price.

If you have a valid winning bid when the auction ends, you agree to pay, and your credit card will be charged a per ticket price equal to the amount you bid plus a delivery price (if applicable) and a processing fee.

*FIG. 8C*

☐ For the Acme Star concert at Acme Arena, on Saturday, March 1, 2006

☐ Please provide me with a notification whenever there is a price drop

☐ Please provide me with a notification when the price reaches or falls below _____

☐ Please provide me with a notification when additional seats are released for the concert ☐ Please provide notifications using my:
☐ email address
☐ SMS address
☐ Instant Messaging address

[Submit]

FIG. 10

```
File  Edit  View  Go  Favorite  Help
```

Please answer the following survey questions to help us better price tickets:

For a concert featuring Acme Star:
How much would you pay for a front row seat?_____
How much would you pay for a floor seat in row 2-10?_____
How much would you pay floor seat in rows 11-50?_____
How much would you pay for a lower level seat in rows 1-20?_____
How much would you pay for a lower level seat in rows 21-35?_____
How much would you pay for a upper level seat in rows 1-25?_____
How much would you pay for an upper level seat in rows 26-45?_____

Do you think that floor seats in row 1 are worth:
☐ 0% more than floor seats in row 2-10
☐ 10% more than floor seats in rows 2-10
☐ 20% more than floor seats in rows 2-10
☐ 30% more than floor seats in rows 2-10

Do you think that floor seats in rows 11-50 are worth:
☐ 0% more than seats in lower level row 1-20
☐ 10% more than seats in lower level rows 1-20
☐ 20% more than seats in lower level rows 1-20
☐ 30% more than seats in lower level rows 1-20

Do you think that floor seats in lower level rows 21-35 are worth:
☐ 0% more than seats in upper level rows 1-25
☐ 10% more than seats in upper level rows 1-25
☐ 20% more than seats in upper level rows 1-25
☐ 30% more than seats in upper level rows 1-25

[Submit]

*FIG. 11*

Presale Opt-In

☐ • Please charge me a non-refundable $20.00 for the right to purchase tickets during the first week of the presale for the Acme Star concert at Acme Arena, on Sunday, March 1, 2006

☐ • Please charge me a non-refundable $10.00 for the right to purchase tickets during the second week of the presale for the Acme Star concert at Acme Arena, on Sunday, March 1, 2006

[Submit]

*FIG. 12*

Define/Select Characteristics

| Use | Characteristics | Type | Value Count |
|---|---|---|---|
| ☑ | Prototype Curve | Prototype | 0 |
| ☑ | Primary Performer | Text | 1 |
| ☑ | Secondary Performer | Text | 28 |
| ☑ | Performance Date | Date | 45 |
| ☑ | Day of Week | Day of Week | 7 |
| ☑ | Time of Day | Time | 5 |
| ☑ | Major Category | Text | 1 |
| ☑ | Minor Category | Text | 1 |
| ☑ | Venue | Text | 1 |

[Add Characteristics] [Delete Characteristics] [Edit Values...]

*FIG. 15A*

Define/Select Characteristics

| Use | Characteristics | Type | Value Count |
|---|---|---|---|
| ☑ | Primary Performer | Text | 1 |
| ☑ | Secondary Performer | Text | 28 |
| ☑ | Performance Date | Date | 45 |
| ☑ | Day of Week | Day of Week | 7 |
| ☑ | Time of Day | Time | 5 |
| ☑ | Major Category | Text | 1 |
| ☑ | Minor Category | Text | 1 |
| ☑ | Venue | Text | 1 |
| ☑ | weekday/weekend | Text | |

[Add Characteristics] [Delete Characteristics] [Edit Values....]

FIG. 15B

Define Characteristics

Edit:

Current Table: Secondary Performer ▶

Characteristic Type: Generic

Define New Table ▶

Allowed Assignments:

PHILADELPHIA PHILLIES
SAN FRANCISCO GIANTS
NEW YORK METS
ATLANTA BRAVES
SAN DIEGO PADRES
LOS ANGELES DODGERS
TORONTO BLUE JAYS
BOSTON RED SOX
MILWAUKEE BREWERS

Figure 16A:
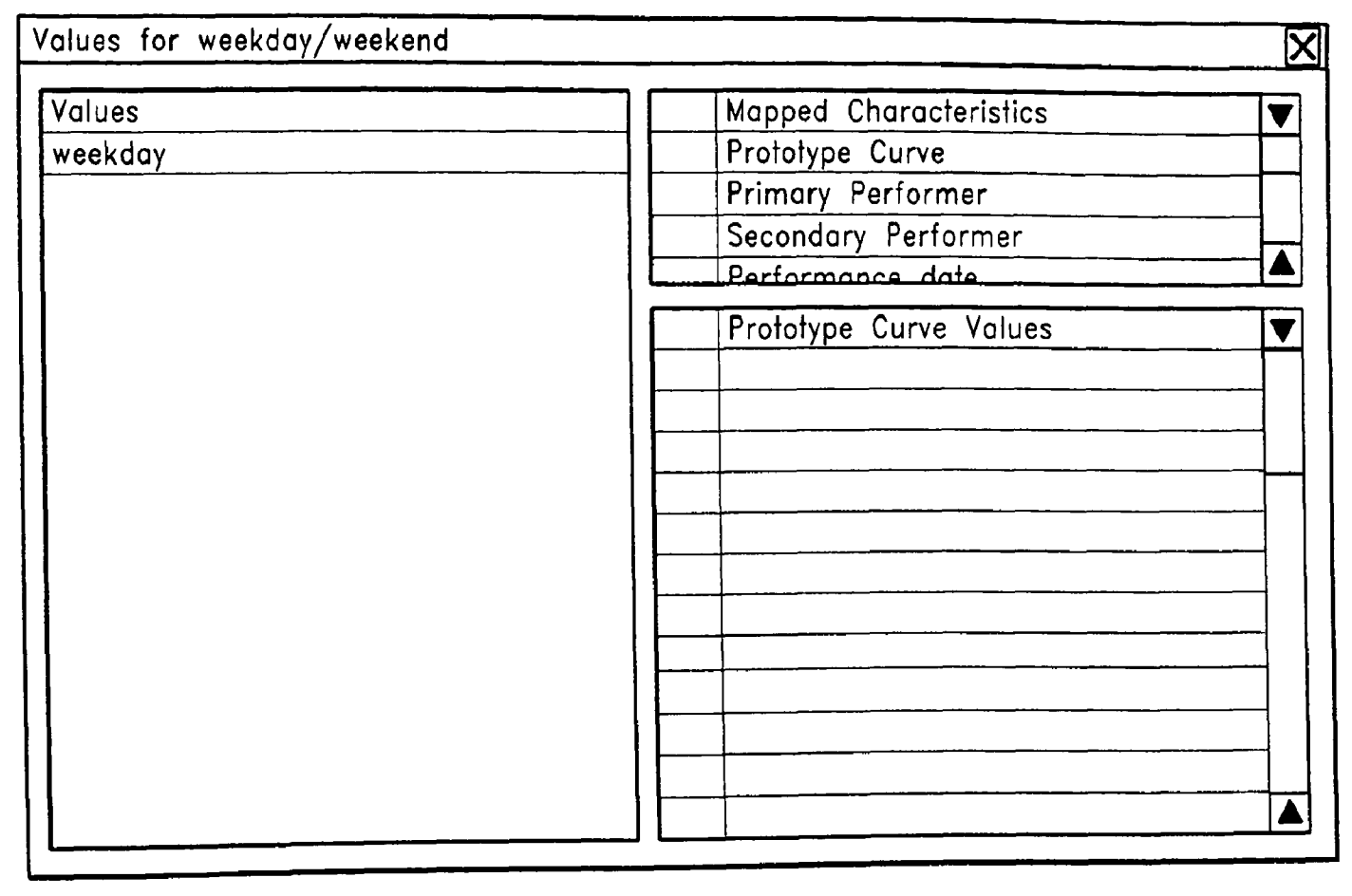

Values for weekday/weekend

| Values |
|--------|
| weekday |

| Mapped Characteristics |
|------------------------|
| Prototype Curve |
| Primary Performer |
| Secondary Performer |
| Performance date |

Prototype Curve Values

| Values for weekday/weekend | | |
|---|---|---|
| | Mapped Characteristics | Day of Week Values |
| | Secondary Performer | Sunday ☐ |
| | Performance Date | Monday ☑ |
| | Day of Week ▲ | Tuesday ☑ |
| | Time of Day | Wednesday ☑ |
| | | Thursday ☑ |
| | | Friday ☑ |
| | | Saturday ☐ |

| Values |
|---|
| weekday |

FIG. 16B

Relative seat value

Guessed relative price lead values:

| | PL1 | PL2 | PL3 | PL4 | PL5 |
|---|---|---|---|---|---|
| PL1 | 1.00 | 0.00 | 0.00 | 0.00 | 0.00 |
| PL2 | 0.00 | 1.00 | 0.00 | 0.00 | 0.00 |
| PL3 | 0.00 | 0.00 | 1.00 | 0.00 | 0.00 |
| PL4 | 0.00 | 0.00 | 0.00 | 1.00 | 0.00 |
| PL5 | 0.00 | 0.00 | 0.00 | 0.00 | 1.00 |

Estimated relative values:

| Price Level | Relative to PL1 |
|---|---|
| PL1 | 1.00 |
| PL2 | 1.00 |
| PL3 | 1.00 |
| PL4 | 1.00 |
| PL5 | 1.00 |

[ Initialize Guesses ]  [ Transfer from prices to guesses ]  [ Transfer from estimates to guesses ]

I consider the value of seats in price level [ ] to be [ ] times better than those in price level [ ]    [ Add guess ]

FIG. 17

Historical Events Used in Forecast

| Match Rule | Characteristic Name | Comparison | Characteristic Value |
|---|---|---|---|
| ⊟Match All | | | |
| | Secondary Performer | equals | MILWAUKEE BREWERS |
| | Time of Day | equals | 07:05 PM |

Current Preset: Brewer Night Games ▶  Save Preset...  Apply Filter...

FIG. 18

Override Characteristic Values

Select Season: Season 2005 ▶ | Mapping

| | | Primary Performer | Secondary Performer | Performance Date | Day of Week |
|---|---|---|---|---|---|
| EPPM0422 | Actual | FLORIDA MARLINS | PHILADELPHIA PHILLIES | 23-Apr-00 | Saturday |
| | Remapped | FLORIDA MARLINS | PHILADELPHIA PHILLIES | 23-Apr-00 | Saturday |
| EPPM0423 | Actual | FLORIDA MARLINS | PHILADELPHIA PHILLIES | 24-Apr-00 | Sunday |
| | Remapped | FLORIDA MARLINS | PHILADELPHIA PHILLIES | 24-Apr-00 | Sunday |
| EPPM0424 | Actual | FLORIDA MARLINS | PHILADELPHIA PHILLIES | 25-Apr-00 | Monday |
| | Remapped | FLORIDA MARLINS | PHILADELPHIA PHILLIES | 25-Apr-00 | Monday |
| EPPM0425 | Actual | FLORIDA MARLINS | PHILADELPHIA PHILLIES | 26-Apr-00 | Tuesday |

☐ Use Overridden Characteristic Values in Forecast

*FIG. 19*

New Cash Flow Analysis

Source of Initial Demand Estimate: | Accounting |

Initial Cost/Income Schedule: | Baseline Scenario |

Maximum Venue Capacity: | 1000 |

Number of price Levels: | 2 |

Minimum Price for All Price Levels: | 20 |

Maximum Price for All Price Levels: | 50 |

[ OK ]   [ Cancel ]

FIG. 22

Cash Flow Schedules

| Description | | Category | Estimated Cash Flow | | |
|---|---|---|---|---|---|
| Rule Input | Rule Type | | Pessimistic | Likely | Optimistic |
| | Face Value | Ticketing | | | |
| 100 | Percent of Ticket Revenue | | $18,600.00 | $23,950.00 | $33,250.00 |
| | Security | Facilities:event security | | | |
| -1000 | Fixed Amount | Facilities:janitorial | | ($1,000.00) | |
| | Post-event cleanup | | | | |
| -2 | Per Ticket Sold (per attendee) | | ($744.00) | ($958.00) | ($1,330.00) |
| | Performer Fee | Performer | | | |
| -15000 | Fixed Amount | | | ($15,000.00) | |
| | Food and Drink | Concessions | | | |
| 3 | Per Ticket Sold (per attendee) | | $1,116.00 | $1,437.00 | $1,995.00 |
| | Performer's Concessions Cut | Performer | | | |
| -20 | Percent of 'Food and Drink' | | ($223.20) | ($287.40) | ($399.00) |
| | Surcharge to TM | Ticketing:surcharge | | | |
| <Price Level Split> | Percent of Ticket Revenue | | ($1,116.00) | ($1,437.00) | ($1,995.00) |
| NET CASH FLOW | | | $1,632.80 | $6,704.00 | $15,521.00 |

Schedule
Current Schedule: Baseline Scenario ▶   [New Schedule...]

[Filter Schedule Items...]   [Optimize Cash Flow...]

Schedule Item
[New Schedule Item...]
[Create Split]   [Remove Split]

FIG. 23

COMPUTER-IMPLEMENTED SYSTEMS AND METHODS FOR RESOURCE ALLOCATION

PRIORITY CLAIM

This is a continuation of U.S. patent application Ser. No. 11/702,733 (filed 6 Feb. 2007), which is a continuation of U.S. patent application Ser. No. 11/386,459 (filed 22 Mar. 2006), which claims the benefit of U.S. Provisional Patent Application 60/663,999 (filed 22 Mar. 2005), U.S. Provisional Patent Application 60/664,000 (filed 22 Mar. 2005), U.S. Provisional Patent Application 60/664,028 (filed 22 Mar. 2005), U.S. Provisional Patent Application 60/664,131 (filed 22 Mar. 2005), and U.S. Provisional Patent Application 60/664,234 (filed 22 Mar. 2005). The entire disclosure of all of these priority applications is hereby incorporated by reference herein in its entirety.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related to resource allocation, and in particular, to apparatus and processes for electronically allocating resources and for providing queue messaging over a network related to resource requests.

2. Description of the Related Art

Conventional systems for allocating resources often do not efficiently allocate such resources or units to users. There have been several conventional approaches to servicing requests for and servicing resource requests, where finite resources are available, and where the potential demand may exceed the available resources. However, disadvantageously, many of these conventional approaches offer limited flexibility in allocating resources. Still further, certain approaches may disadvantageously result in too few resources being distributed. Still further, certain embodiments appear to result in an inequitable distribution of resources.

SUMMARY OF THE INVENTION

Embodiments described herein are related to resource allocation, and in particular, to apparatus and processes for electronically allocating finite or limited resources and/or for providing queue messaging over a network related to resource requests. The following example embodiments and variations thereof are illustrative examples, and are not intended to limit the scope of the invention.

One embodiment includes a queuing system comprising: a first queue configured to hold resource requests from a plurality of users; program code stored in computer readable memory configured: to determine or estimate whether a resource requested by a first resource request submitted by a first requester will be available when the first resource request will be serviced; and to transmit a message over a network to the first requester indicating that the requested resource will not be available when the queued request is serviced if it is estimated or determined that the requested resource will not be available when the first request is serviced.

The system optionally further comprises program code stored in computer readable memory configured to automatically identify to the first requester a potential alternate resource at least partly in response to determining or estimating the requested resource will not be available when the first request is serviced, program code stored in computer readable memory configured to automatically identify an alternate resource that may be acceptable to the first requester at least partly in response to determining or estimating the requested resource will not be available when the queued request is serviced, and/or program code stored in computer readable memory configured to transmit to the requester an estimated time period related to when the resource request will be serviced. The requested resource can relate to tickets, such as seat or event tickets, by way of example.

One embodiment provides a method of providing queue messaging to resource requesters, the method comprising: determining or estimating a position in a queue of a resource request associated with a first requester; determining or estimating whether the requested resource will be available when the queued request is serviced; and if it is estimated or determined that the requested resource will not be available when the queued request is serviced, transmitting a message over a network to the first requester indicating that the requested resource will not be available when the queued request is serviced. Optionally, the method further comprises automatically identifying to the first requester a potential alternate resource at least partly in response to determining or estimating the requested resource will not be available when the queued request is serviced. Optionally, the method further comprises using filtering to automatically identify an alternate resource that may be acceptable to the first requester at least partly in response to determining or estimating the requested resource will not be available when the queued request is serviced. Optionally, the method further comprises transmitting to the requester an estimated time period related to when the resource request will be serviced. The requested resource can relate to tickets, such as seat or event tickets, by way of example.

An example embodiment provides a method of setting a ticket price, the method comprising: storing in computer readable memory an estimate of a first population size of potential attendees of a first event at a venue, the first population including at least a first group and a second group, wherein members of the first group have a first motivation for attending the first event, and members of the second group have a second motivation for attending the first event; storing in computer readable memory an estimate of the size of the first group; storing in computer readable memory an estimate of a first price threshold that it is estimated would result in at least a first percentage of members of the first group purchasing an event ticket; storing in computer readable memory an estimate of the size of the second group; storing in computer readable memory an estimate of a second price threshold that it is estimated would result in at least a second percentage of members of the second group purchasing an event ticket; storing in computer readable memory information identifying a plurality of venue seating areas; accessing from computer readable memory a first limit on how many tickets a user can purchase in at least one of the venue seating areas; and based at least in part on the size of the first group, the size of the second group, the first price threshold, the second price threshold, and the first limit, setting a least a first event ticket price.

With reference to the example above, in an example embodiment, the first motivation is to impress others. By way of further example, the members of the first group will tend to only purchase relatively expensive event tickets. By way of example, the members of the first group will tend to only purchase relatively inexpensive event tickets. By way of further example, the members of the first group have relatively high incomes. By way of still further example, the members of the first group have relatively low incomes. By way of yet further example, the members of the first group include ticket brokers. Optionally, the method further comprises accessing a first parameter associated with patience with respect to ticket acquisition associated with the first group. In an example embodiment, the second motivation is related to an interest in the event. By way of further example, the second motivation is related to socializing. Optionally, the method further comprises accessing a first minimum ticket price, wherein the first minimum price is set based at least in part on a first revenue guarantee to a first entity.

An example embodiment provides a method of setting a ticket price, the method comprising: storing in computer readable memory a first size estimate corresponding to a first set of potential event attendees, wherein members of the first set are characterized by a first level of income, and/or a first parameter associated with patience with respect to ticket acquisition; storing in computer readable memory a second size estimate corresponding to a second set of potential event attendees, wherein members of the second set are characterized by a second level of income and/or a second parameter associated with patience with respect to ticket acquisition; storing in computer readable memory a first indication as to what event ticket price at least a portion of members of the first set would be willing to pay; storing in computer readable memory a second indication as to what event ticket price at least a portion of members of the second set would be willing to pay; and based at least in part on the first size estimate, the second size estimate, the first indication, and the second indication, setting a least a first event ticket price.

Optionally, the method above further comprises accessing event cost data, wherein the first event ticket price is set partly based on the event cost data. Optionally, the method above further comprises accessing historical ticket sales data related to resold tickets, wherein the first event ticket price is set partly based on the historical ticket sales data related to resold tickets. Optionally, the method above further comprises accessing a median ticket price that it is estimated that at least a first portion of the first set would be willing to pay, wherein the first event ticket price is set partly based on the median ticket price. Optionally, the method above further comprises accessing historical event-related income data, wherein the first event ticket price is set partly based on the historical event-related income data.

An example embodiment provides a method of setting a ticket price, the method comprising reading a first limit on how many event tickets a user can purchase, wherein the first event ticket price is set partly based on the first limit.

An example embodiment provides a method of setting a ticket price, the method comprising reading a first minimum permissible event ticket price, wherein the first event ticket price is set partly based on the first minimum permissible ticket price.

An example embodiment provides a method of setting a ticket price, the method comprising: storing in computer readable memory a first size estimate corresponding to a first set of potential event attendees, wherein members of the first set are characterized by a first level of income; storing in computer readable memory a second size estimate corresponding to a second set of potential event attendees, wherein members of the second set are characterized by a second level of income; storing in computer readable memory a first indication as to what event ticket price at least a portion of members of the first set would be willing to pay; storing in computer readable memory a second indication as to what event ticket price at least a portion of members of the second set would be willing to pay; and based at least in part on the first size estimate, the second size estimate, the first indication, and the second indication, setting a least a first event ticket price.

Optionally, the members of the first set are associated with a first motivation for attending the event. In certain instances, members of the first set are likely to purchase relatively expensive event seats to impress others. In certain instances, members of the first set are likely to attend the event with the intention of socializing with others. In certain instances, members of the first set are likely to only purchase relatively inexpensive event tickets. In certain instances, members of the first set have relatively high incomes and/or a relatively large amount of disposable income. In certain instances, members of the first set have relatively low incomes. In certain instances, members of the first set include ticket brokers that resell tickets. The above method optionally further comprises: accessing a first parameter associated with patience with respect to ticket acquisition associated with members of the first set, wherein the first event ticket price is set partly based on the first parameter. The above method optionally further comprises reading a first limit on how many event tickets a user can purchase, wherein the first event ticket price is set partly based on the first limit. The above method optionally further comprises reading a first minimum permissible event ticket price, wherein the first event ticket price is set partly based on the first minimum permissible ticket price. The above method optionally further comprises accessing historical ticket sales data, wherein the first event ticket price is set partly based on the historical ticket sales data. The above method optionally further comprises accessing event cost data, wherein the first event ticket price is set partly based on the event cost data. The above method optionally further comprises accessing historical ticket sales data related to resold tickets, wherein the first event ticket price is set partly based on the historical ticket sales data related to resold tickets. The above method optionally further comprises accessing a median ticket price that it is estimated that at least a first portion of the first set would be willing to pay, wherein the first event ticket price is set partly based on the median ticket price. The above method optionally further comprises accessing historical sales data related to concessions sold at least one event, wherein the first event ticket price is set partly based on the historical sales data related to concessions. The above method optionally further comprises accessing historical sales data related to event income, wherein the first event ticket price is set partly based on the historical income data. The above method optionally further comprises setting the first event ticket price is set partly based on the historical sales data related to concessions. The above method optionally further comprises setting ticket prices for a plurality of venue areas at least partly based on historical sales data related to concessions and tickets. The above method optionally further comprises accessing cost data related to putting on the event, wherein the first event ticket price is set partly based on the cost data.

An example embodiment provides a method of processing electronic queue data, the method comprising: determining or estimating the number of ticket-related requests that are in a first electronic queue; based at least in part on the number of ticket-related requests that are in a first electronic queue and historical queue abandonment data, selecting a notification-type regarding the queue to be provided to at least one user that has a ticket-related request in the queue; and transmitting a notification corresponding to the notification-type to a terminal associated with at least one user that has a ticket-related request in the queue.

With reference to the example embodiment above, in certain instances, the notification-type is selected to reduce the number of users that abandon their queued ticket-related request. In certain instances, the selected notification-type is used to present an estimated queue wait time rounded up to the nearest minute. In certain instances, the selected notification-type is used to present a queue wait time as being less than a specified time duration. In certain instances, the selected notification-type is used to present a notification regarding the queue that does not include queue wait time information. In certain instances, the selected notification-type is selected partly based on an historical average and/or standard deviation of length of time one or more users were willing to wait in queue before abandoning their queued ticket-related requests.

An example embodiment provides a method of processing electronic queue data, the method comprising: accessing historical queue abandonment data for at least one ticket queue, wherein the abandonment data relates to users abandoning queued ticket-related requests; based at least in part on the historical queue abandonment data, selecting a type of queue information that is to be provided to at least one user that has a queued ticket-related request; and transmitting a notification including information corresponding to the selected the type of queue information to a terminal associated with at least one user that has a queued ticket-related request.

With reference to the example embodiment above, in certain instances, the type of queue information is selected to reduce queue abandonment. In certain instances, the type of queue information is selected to increase queue abandonment. In certain instances, the selected type of queue information includes an estimated queue wait time rounded up to the nearest minute. In certain instances, the notification presents a queue wait time as being less than a specified time duration. In certain instances, the selected type of queue information does not include queue wait time information. In certain instances, the type of queue information is selected partly based on an historical average and/or standard deviation of length of time one or more users were willing to wait in a queue before abandoning their queued ticket-related requests. In certain instances, the ticket-related request is a request to purchase at least one ticket. In certain instances, the ticket-related request is a request to view ticket availability.

An example embodiment provides a method of processing electronic queue data, the method comprising: receiving in a queue a ticket-related request for a first event from a first user; determining seat availability for the first event; based at least in part on the actual, estimated, or relative position of the ticket-related request in the queue and the seat availability, estimating whether seats will be available when the first user's ticket-related request is serviced; and providing an indication to the user that seats will not be available when the estimate indicates seats will not be available when the first user's ticket-related request is serviced.

With reference to the example embodiment above, in certain instances, servicing the ticket-related request includes determining if there are seats available that correspond to the request. The above method optionally further comprises providing the first user with information regarding a second event, wherein a same performer is scheduled to be at both the first event and the second event. The above method optionally further comprises providing the first user with information regarding a second event at least partly in response to the estimate indicating seats will not be available when the first user's ticket-related request is serviced. The above method optionally further comprises providing the first user with information regarding a second event at least partly in response to the estimate indicating seats will not be available when the first user's ticket-related request is serviced, wherein the second event is selected at least partly using collaborative filtering. The above method optionally further comprises receiving in a queue a ticket-related request for a first event from a first user, and based at least in part on a actual, estimated, or relative position of the ticket-related request in the queue and event seat availability, selectively indicating to the first user that seats will not be or are unlikely to be available when the first user's ticket-related request is serviced. In certain instances, the ticket-related request in the example embodiment includes determining if there are seats available that correspond to the request. The above method optionally further comprises providing the first user with information regarding a second event at least partly in response to estimating or determining that seats will not be available when the first user's ticket-related request is serviced, wherein a same performer is scheduled to be at both the first event and the second event. The above method optionally further comprises providing the first user with information regarding a second event at least partly in response to estimating or determining that seats will not be available when the first user's ticket-related request is serviced, wherein the information regarding the second event identifies a performer for the second event, wherein the identified performer is not scheduled to perform at the first event. The above method optionally further comprises providing the first user with information regarding a second event at least partly in response to estimating or determining that seats will not be available when the first user's ticket-related request is serviced, wherein the second event is selected at least partly using collaborative filtering.

An example embodiment provides a method of providing access to tickets, the method comprising: transmitting over a network to a first user an offer to participate in a first phase of a ticket sale for a first event for a first participation fee; receiving over the network at a ticketing system an indication that the offer has been accepted by the first user; during the first phase of the ticket sale, receiving over the network a ticket request from the first user; and at least partly in response to receiving the ticket request, determining that the first user is entitled to participate in the first phase of the ticket sale.

The above method optionally further comprises determining how many seats are to be made available during the first phase based at least in part on the number of users that paid the first participation fee. In certain instances, the first participation fee is not refundable. In certain instances, the first participation fee is refundable if the first user does not purchase a ticket during the first phase. The above method optionally further comprises transmitting over the network an offer to participate in a second phase of the ticket sale for the first event for a second participation fee, wherein the second phase takes place after the first phase, and the second participation fee is lower than the first participation fee. The above method optionally further comprises enabling a plurality of users to participate in another phase of the event ticket sale without paying a participation fee. Optionally, in certain instances, only certain users are entitled to pay the participation fee so as to participate in the first phase of the ticket sale. Optionally, in certain instances, only members of a fan club associated with a performer at the first event. Optionally, in certain instances, only holders of a first credit card-type are entitled to pay the first participation fee.

An example embodiment provides a method of providing access to tickets, the method comprising: transmitting over a network to a first user an offer to participate in a first phase of a ticket sale for a first event in exchange for a first premium provided by the first user; receiving over the network at a ticketing system an indication that the offer has been accepted by the first user; during the first phase of the ticket sale, receiving over the network a ticket-related request from the first user; and at least partly in response to receiving the ticket-related request, determining that the first user is entitled to participate in the first phase of the ticket sale.

The above method optionally further comprises providing the first user with a password or a link via which the first user can provide an indication that the first user is entitled to participate in the first phase of the ticket sale. Optionally, in certain instances, tickets sold during the first phase are sold at a fixed ticket price. Optionally, in certain instances, tickets sold during the first phase are sold at auction. Optionally, the method further comprises determining how many seats are to be made available during the first phase based at least in part on the number of users that paid the first premium. Optionally, in certain instances, the first premium is not refundable. Optionally, in certain instances, the first premium is refundable if the first user does not purchase a ticket during the first phase. Optionally, the method further comprises transmitting over the network an offer to participate in a second phase of the ticket sale for the first event for a second premium, wherein the second phase takes place after the first phase, and the second premium is different than the first premium. Optionally, the method further comprises enabling a plurality of users to participate in another phase of the event ticket sale without providing a premium. Optionally, in certain instances, only certain users are entitled to provide the premium so as to participate in the first phase of the ticket sale. Optionally, in certain instances, only members of a fan club associated with a performer at the first event are entitled to provide the first premium so as to participate in the first phase. Optionally, in certain instances, only holders of a first credit card-type are entitled to provide the first premium so as to participate in the first phase.

An example embodiment provides a method of dynamically setting event ticket prices, comprising setting an initial seat ticket price for a first event based at least in part on historical ticket sales data and on historical event-related income data; monitoring ticket sales data for the first event and storing ticket sales data in computer readable; and setting a second seat ticket price after a ticket sale for the event has begun based at least in part on ticket sales data for the first event, on historical ticket sales data for at least one previous event, and on a specified price adjustment limit that indicates how much the second seat ticket price can vary from the initial seat ticket price.

The above method optionally further comprises timing a sales offer of seat tickets at the second seat ticket price in accordance with a predetermined schedule stored in computer readable memory. Optionally, the method further comprises setting the initial seat ticket price partly based on event cost data. In certain instances, the historical event-related income data includes historical parking revenues or other concession-related revenues. Optionally, the method further comprises setting the initial seat ticket price partly based on event cost data, accessing from computer readable memory an indication as to the maximum number of seat ticket price adjustments that can be performed for the first event. In certain instances, the setting of the second seat ticket price is based at least in part on unsold seat inventory. Optionally, the method further comprises timing a sales offer of seat tickets at the second seat ticket price is based at least in the time period remaining prior to the event. Optionally, the method further comprises transmitting an email, an SMS message, and/or an instant message directed to at least one person providing information to the person related to the setting of the second ticket price. Optionally, the method further comprises releasing additional seats for which tickets may be procured at a time after the beginning of the event ticket sale and before the event occurring. Optionally, the method further comprises releasing additional seats for which tickets may be procured at a time after the beginning of the event ticket sale and before the event occurring, determining that at least one user requested that a notification be when additional seats are released, and causing a notification regarding the release of additional seats to be transmitted to the at least one user. In certain instances, the initial seat ticket price is partly selected so as to be high enough so as to reduce the number of seat tickets purchased by a given ticket purchaser so as to reduce the number of orphaned event seats. In certain instances, the initial seat ticket price and/or the second seat price is partly selected so as to reduce the number of orphaned event seats.

An example embodiment provides a method of dynamically setting event ticket prices: setting an initial seat ticket price for a first event based at least in part on historical ticket sales data; storing in computer readable memory a schedule of at least one seat ticket price reduction; and transmitting over a network to a terminal associated with a potential ticket purchaser the schedule of the at least one seat ticket price reduction.

The above method optionally further comprises transmitting the amount of the price reduction to the terminal. Optionally, the method further comprises transmitting to the terminal in association with the seat price reduction schedule: an event name; an event date; an identification of at least one available seat and the current corresponding seat price; and a limit on the quantity of tickets the potential ticket purchaser can purchase for the event. In certain instances, the transmitted schedule includes a date for the at least one seat ticket price reduction. In certain instances, the transmitted schedule includes a time for the at least one seat ticket price reduction. In certain instances, the amount of the at least one seat ticket price reduction is selected based at least in part on historical ticket sales data. In certain instances, the initial seat ticket price is set based at least in part on historical event-related income data. Optionally, the method further comprises transmitting an email, an SMS message, and/or an instant message to at least one person notifying the person of the ticket price reduction. Optionally, the method further comprises releasing additional seats for which tickets may be procured at a time after the beginning of the event ticket sale and before the event occurring. Optionally, the method further comprises releasing additional seats for which tickets may be procured at a time after the beginning of the event ticket sale and before the event occurring, determining that at least one user requested that a notification be provided to the at least one user when additional seats are released, and causing a notification regarding the release of additional seats to be transmitted to the at least one user.

An example embodiment provides a method of dynamically setting event ticket prices: storing information related to a desired pattern of ticket sales over time for a first event; monitoring actual ticket sales over time for the event; and setting at least a first seat ticket price based at least in part on the desired pattern and the actual ticket sales over time for the event, wherein the first seat ticket price is set after the beginning of a ticket sale for the event.

In certain instances, the desired pattern is based at least in part on actual ticket sales over time for at least one historical event. The above method optionally further comprises transmitting to a terminal associated with a potential purchaser: an event name; an event date; an identification of at least one available seat; the first seat ticket price; and a limit on the quantity of tickets the potential ticket purchaser can purchase for the event. In certain instances, an initial seat ticket price is set prior to the setting of the first seat ticket price based at least in part on historical concession sales data. In certain instances, an initial seat ticket price is set prior to the setting of the first seat ticket price based at least in part on historical income data related to one or more past events. The above method optionally further comprises transmitting an email, an SMS message, and/or an instant message to at least one person notifying the person of the availability of seat tickets at the first ticket price. The above method optionally further comprises releasing seats for which tickets may be procured at the first ticket price.

An example embodiment provides a method of setting minimum bids for tickets in a ticket auction, the method comprising: setting an initial minimum bid for a first set of seat tickets for a first event based at least in part on historical sales data; and setting a minimum bid for a second set of seat tickets for the first event based at least in part on bid information for the first event, wherein the second set of seat tickets are auctioned after the first set of seat tickets.

In certain instances of the above embodiment, the bid information includes information related to the number of bids received for tickets for the first event. In certain instances, the bid information includes information related to the rate of bids for tickets for the first event. In certain instances, the historical sales data includes historical parking revenues. In certain instances, the historical sales data includes historical concession revenues. In certain instances, the historical sales data includes historical ticket sales data. The above method optionally further comprises reading from computer readable memory a minimum bid adjustment limit. The above method optionally further comprises reading from computer readable memory a first minimum bid adjustment limit, wherein the setting of the minimum bid for a second set of seat tickets is constrained by the first minimum bid adjustment limit. In certain instances, the setting of the second minimum bid is based at least in part on unsold seat inventory. In certain instances, the timing of offering at auction seat tickets with associated with the second minimum bid is based at least in the time period remaining prior to the event. The above method optionally further comprises releasing additional seat tickets at a time after the beginning of the event ticket auction and before the event occurring, determining that at least one user requested that a notification be provided when additional seats are released for auction, and causing a notification related the release of additional seats to be transmitted to the at least one user. The above method optionally further comprises storing a reserve price associated with at least one seat ticket being auctioned, wherein the reserve price is not disclosed to bidders prior to the close of the auction for the at least one seat ticket. The above method optionally further comprises determining winning bids for tickets for a first set of seats, wherein the winning bids include a highest winning bid from a first bidder and a lowest winning bid from a second bidder, calculating a first ticket price lower than the highest winning bids and higher than the lowest winning bid, charging the first bidder the first ticket price for at least one ticket, and charging the second bidder the first ticket price for at least one ticket. The above method optionally further comprises charging the first bidder a delivery and/or service fee in addition to the first ticket price.

An example embodiment provides a method of setting ticket prices for an event, the method comprising: causing a survey related to ticket pricing to be provided over a network to at least a first user, wherein the survey asks the first user to provide an indication as to the value of seats in a plurality of venue areas; receiving survey results, including survey responses and/or information derived from survey responses; accessing historical ticket sales data stored in computer readable memory; accessing historical income data stored in computer readable memory; accessing cost data associated with providing the event stored in computer readable memory; and based at least in part on the survey results, the historical ticket sales data, and the cost data, setting at least a first ticket price and/or a first minimum bid amount.

In certain instances, the survey requests that the first user provide a monetary value for at least a ticket for a seat in a first venue area and for a ticket for a seat in a second venue area. In certain instances, the survey requests that the first user provide an indication as to the first user's opinion on the difference in quality of a first seat in a first venue area and a second seat in a second venue area. In certain instances, the survey is provided to the first user prior to tickets for the event being offered for sale. In certain instances, the survey is provided to the first user during a sale of event tickets, wherein the sale is restricted to a subset of potential ticket purchasers. In certain instances, the survey is provided to the first user during a sale of event tickets, wherein the sale is open to the general public. In certain instances, the survey is provided to the first user during a ticket selection or ticket purchase process. In certain instances, the survey requests that the first user provide seat rankings for a plurality of seats and/or seating areas. In certain instances, the survey requests that the first user provide a ranking and/or a valuation for a specified row. In certain instances, the survey requests that the first user provide a ranking and/or a valuation for a specified portion of a row.

An example embodiment provides a method of selecting ticket prices for an event, the method comprising: causing a survey related to seat ranking and/or valuations to be provided over a network to at least a first user, wherein the survey asks the first user to provide an indication as to the value and/or ranking of seats in a plurality of venue areas; receiving survey results, including survey responses and/or information derived from survey responses; accessing historical sales data stored in computer readable memory; based at least in part on the survey results and historical ticket sales data, setting at least a first ticket price and/or a first minimum bid amount.

In certain instances, the survey requests that the first user provide a monetary value for a first seat ticket in a first venue area and for a second seat ticket in a second venue area. In certain instances, the survey requests that the first user provide an indication as to the difference in quality of a first seat in a first venue area and a second seat in a second venue area. In certain instances, the survey is provided to the first user prior to tickets for the event being offered for sale. In certain instances, the survey is provided to the first user prior to tickets for the event being offered for auction. In certain instances, the survey is provided to the first user during a sale of event tickets, wherein the sale is restricted to a subset of potential ticket purchasers. In certain instances, the survey is provided to the first user during a sale of event tickets, wherein the sale is open to the general public. In certain instances, the survey is provided to the first user during a ticket selection or ticket purchase process. In certain instances, the survey is provided to the first user at least partly in response to determining that the first user has purchased at least one ticket. In certain instances, the survey is provided to the first user at least partly in response to determining that the first user has abandoned a first ticket-related request. In certain instances, the survey requests that the first user provide seat rankings for a plurality of seats and/or seating areas. In certain instances, the survey requests that the first user provide a ranking and/or a valuation for a specified row. In certain instances, the survey requests that the first user provide a ranking and/or a valuation for a specified portion of a row. The above method optionally further comprises setting a ticket price for at least one event ticket after tickets sales for the event have begun.

An example embodiment provides a system for enhancing yields, the system comprising code stored in computer readable memory configured to: provide a user interface via which a user can define and/or select event characteristics with respect to a first event; provide a user interface via which a user can set an event filter used to locate one or more historical events that correspond to the filter; provide the user with a predicted sales rate for the first event.

With respect to the example system above, the event characteristics are optionally selected from a group including at least one of the following: primary performer; secondary performer; performance date; day of week; time of day; venue. With respect to the example system above, the code is optionally further configured to receive a value count corresponding to at least one characteristic. With respect to the example system above, the code is optionally further configured to receive a remapping indication from the user that maps a first characteristic value to a second characteristic value.

An example embodiment provides a system for estimating demand, the system comprising code stored in computer readable memory configured to: store in computer readable memory a first demand estimate for a first event from a first source; store in computer readable memory a second demand estimate for the first event from a second source; access a first weighting and a second weighting from computer readable memory; and calculate a third demand estimate using the first demand estimate, the second demand estimate, the first weighting and the second weighting.

An example embodiment provides a system for providing demand estimating information, the system comprising code stored in computer readable memory configured to: generate a graphical display including: demand rate data for a plurality of historical events; predicted demand rate data for a future event, wherein in the predicted demand rate data is at least partly based on at least a portion of the demand rate data for the plurality of historical events.

With respect to the example system above, the system optionally further comprises code stored in computer readable memory configured to: enable a user to select a subset of the graphically displayed demand rate data for the plurality of historical events; and generate a graphical display related to event characteristics associated with the selected subset.

An example embodiment provides a system for providing cash flow information, the system comprising code stored in computer readable memory configured to: display a plurality of rule inputs and corresponding rule types; and providing pessimistic estimated cash flows, optimistic estimated cash flows, and/or estimated cash flows with a cash flow value between the pessimistic estimated cash flow and the optimistic cash flow, corresponding to the plurality of rule inputs.

An example embodiment provides a system for selecting ticket prices to enhance revenues, the system comprising code stored in computer readable memory configured to: receive user cash flow enhancement instructions, wherein the user can select from a plurality of event demand scenarios, and the user can indicate which cost and income items are to be used in generating a cash flow enhancement process; and present to the user at least a first ticket price, wherein the first ticket price was generated at least in part by the cash flow enhancement process.

Embodiments described above can be implemented using computer code stored in computer readable memory. The computer code can be executed by one or more systems, such as ticketing and/or yield management systems. Aspects of two or more of the above embodiments can be combined.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIG. 4 illustrates an example estimated valuation characteristics for a variety of population groups.

FIGS. 8A-C illustrate example auction user interfaces.

FIG. 10 illustrates an example notification request user interface.

FIG. 11 illustrates an example survey form.

FIG. 12 illustrates an example presale opt-in user interface.

FIGS. 15A-C illustrates example user interfaces for defining and selecting characteristics.

FIGS. 16A-B illustrate example user interfaces for defining a characteristic value.

FIG. 17 illustrates an example user interface for defining relative area values.

FIG. 18 illustrates an example user interface for defining a filter.

FIG. 19 illustrates an example characteristic override user interface.

FIG. 22 illustrates an example user interface for setting up a cash flow analysis.

FIG. 23 illustrates an example cash flow schedule user interface.

DETAILED DESCRIPTION OF PREFERRED EMBODIMENTS

Figures 1, 1A:
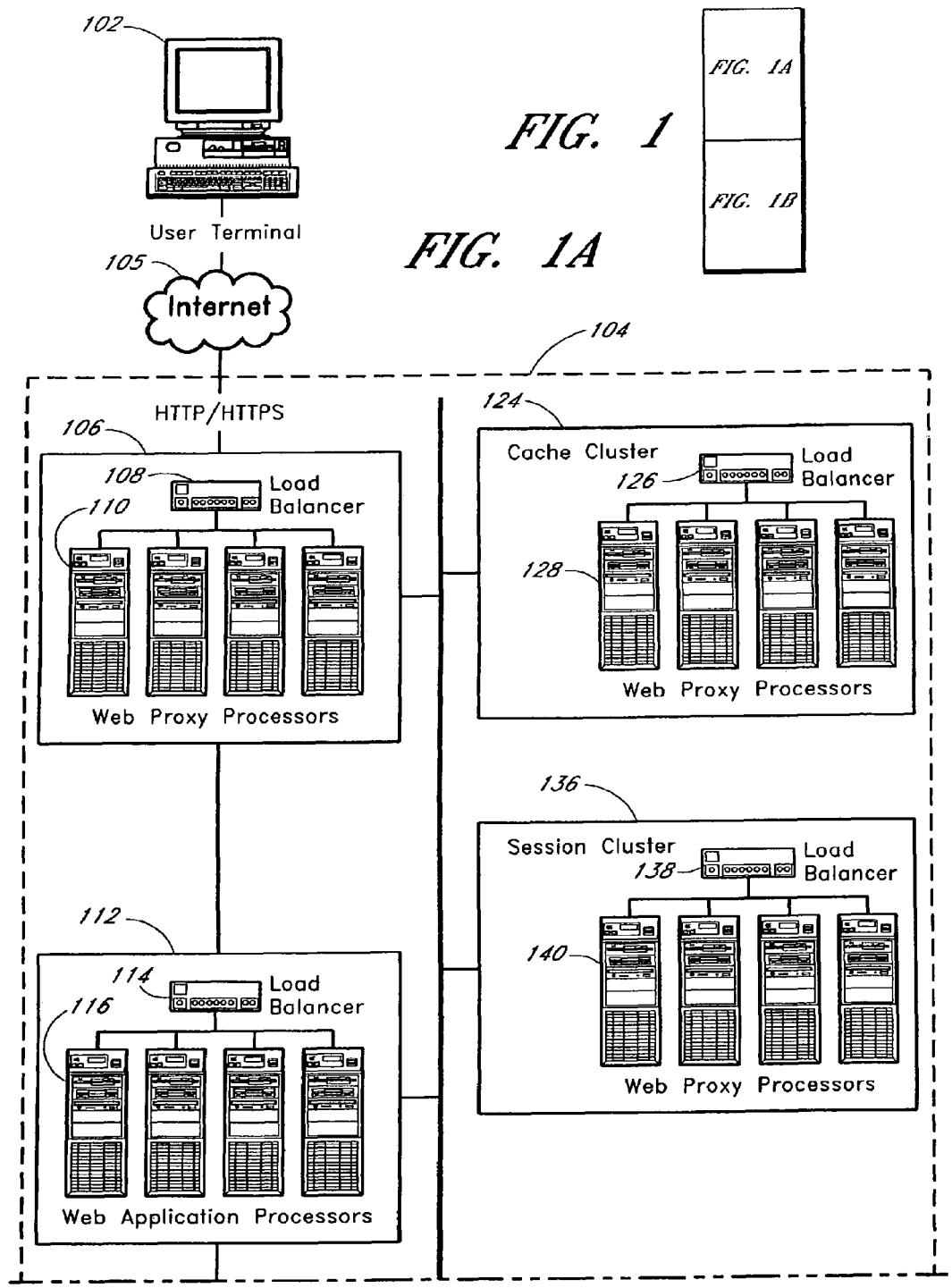
FIGS. 1A-B illustrate an example system embodiment that can be used in conjunction with processes described herein.

The present invention is related to resource allocation, and in particular, to apparatus and processes for electronically allocating finite or limited resources.

Throughout the following description, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically-distributed computer systems that are appropriately linked together. Furthermore, while the following description relates to an embodiment utilizing the Internet and related protocols, other networks, such as networked interactive televisions, and other protocols may be used as well.

In addition, unless otherwise indicated, the functions described herein may be performed by software modules including executable code and instructions running on one or more general-purpose computers. The computers can include one or more central processing units (CPUs) that execute program code and process data, memory, including one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," and a wired and/or wireless network interface for accessing an intranet and/or Internet. In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the present invention can also be implemented using special purpose computers, terminals, state machines, and/or hardwired electronic circuits.

In addition, the example processes described herein do not necessarily have to be performed in the described sequence, and not all states have to be reached or performed. Further, certain process states that are illustrated as being serially performed can be performed in parallel.

The processes and systems described below relate to systems and processes that enable system users to sell, license, or acquire specified quantities of units (each, a "Unit"), which may be in inventory, using a dynamic pricing process. Each Unit may be unique or identical to other Units that are being offered. Each Unit may be comprised of one or more elements.

One example of a "Unit" may be a single event ticket. Another example of a "Unit" may be a group of event tickets. Another example of a "Unit" may be a group of event tickets and pieces of related merchandise. However, a Unit need not consist of or include one or more event tickets, and may instead consist of another item or items, such as airline tickets.

In one example embodiment, user terminals access a ticketing computer system via a network, such as the Internet, using a broadband network interface, dial-up modem, or the like. By way of example, a user terminal can be a personal computer, an interactive television, a networkable programmable digital assistant, a computer networkable wireless phone, and the like. The user terminal can include a display, keyboard, mouse, trackball, electronic pen, microphone (which can accept voice commands), other user interfaces, printer, speakers, as well as semiconductor, magnetic, and/or optical storage devices.

An example user terminal includes a browser or other network access software capable of performing basic network or Internet functionality, such as rendering HTML or other formatting code and accepting user input. The browser optionally stores small pieces of information, such as digital cookies, in user terminal non-volatile memory. The information can be accessed and included in future requests made via the browser. By way of example, a cookie can store customer, session, and/or browser identification information which can be accessed by a ticket application executing on a remote ticketing computer system.

The user can access information on Units that are available for purchase or licensing, submit purchase requests for the Units, and purchase Units. Similarly, other users can submit Units to be sold via a user terminal browser or otherwise.

By way of example, a Web page or other user interface can be presented to a user, listing some or all of the following: the event for which Units are being sold, an event venue, event ticket groups for which tickets are being sold, the current ticket price for a specific seat or for seats in one or more ticket groups, a quantity field, wherein the user can enter the quantity of Units (e.g., tickets) that the user is bidding on, is interested in purchasing, offering to purchase, etc.

The ticketing computer system can include ticketing servers, account manager servers, a credit card authorization system, an internal network, request routers, ticket request, data and status queues, and an interface to the Internet. The ticketing computer system can host a Web site, accessible by users, for selling Units, such as tickets or other resources or inventory. The ticketing computer system can include one or more databases whose data can be accessed as needed. For example, the databases can include a user account database, that stores user contact information, billing information, preferences, account status, and the like, that can be accessed by other portions of the ticketing computer system, such as by account manager servers. A survey database can also be provided that stores survey results from consumers related to, by way of example, ticket pricing and/or seat or section ranking. The survey database can also store survey results from consumers related to, by way of example, ticket pricing and/or seat or section ranking. Optionally, the survey or other database stores some or all of the following characteristics of the ticket buying population: population size of relevant ticket buying population, income, predicted or estimated patience, the ticket price that would cause an estimated percentage of the relevant population not to buy a ticket, and the ticket price that would cause an estimated percentage of the relevant population not buy a ticket. Once or more of the databases can store information received from one or more users via various user interfaces, such as those disclosed herein.

The ticketing computer system can optionally include a front end switching network, a state and information data cache which can be stored in a set of servers that forms a high capacity front end, a set of servers that includes application servers, a set of servers responsible for controlling queues of transactional customers, and a core ticketing server system. For example there can be request queues for Internet users and/or for phone users.

Where the Units include tickets, one or more ticket databases accessible by the ticketing computer system are provided that store ticket information records for tickets, including, for example, barcode information, event name, event date, seat identifier, ticket holder name or other identifier of a current ticket holder, names or other identifiers of past holders of the ticket, a ticket valid/invalid indicator, and an indicator that as to whether the ticket has been used. In addition, an event database can be provided that stores information regarding events, including the venue, artist, date, time, and the like. Not all of the foregoing systems and components need to be included in the ticketing system and other systems and architectures can be used as well.

Figure 1B:
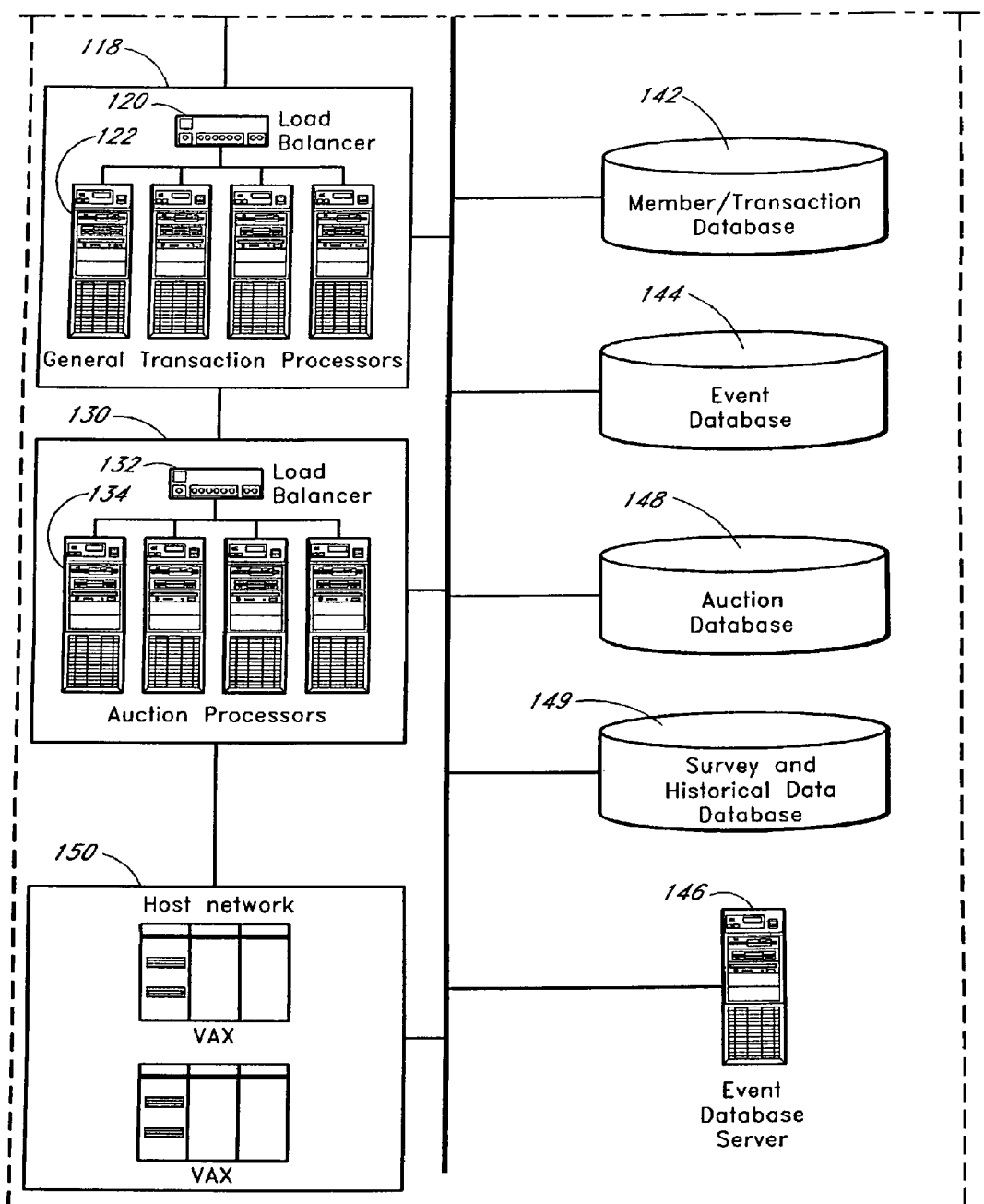

FIGS. 1A-B illustrates an example system embodiment that can be used in conjunction with the pricing and/or ticket sale processes described herein. Not all of the illustrated systems and components need to be included in the system and other systems and architectures can be used as well. With reference to FIGS. 1A-B, a user terminal 102 is coupled to an example Unit distribution system (e.g., a ticketing system) 104 over the Internet 105 using HTTP/HTTPS. An example web proxy system 106 includes an optional load balancer 108 and web proxy processors 110, and can selectively block or route an inbound request from a user browser executing on the terminal 102 to an appropriate internal destination, which can be a queue or other destination server.

The illustrated example system 104 includes an example Web application system 112, which includes an optional load balancer 114 and Web application processors 116. A general transaction system 118 includes an optional load balancer 120 and transaction processors 122 that are used to generate transactional pages (such as some or all of the user interfaces described herein), populate data caches, provide logic and/or rules for the transaction flows, provide users with queue related messaging based on the queue position of a resource request, and to sequence requests. A cache cluster system 124 includes an optional load balancer 126 and processors 128. The cache cluster system 124 caches data and states for quick access by other system components.

An example processor system 130 is provided that includes an optional load balancer 132 and Unit (e.g., ticket) sales processors 134. Optionally, the processors 134 can be used for a variety of types of sales, including, by way of illustration and not limitation, auctions, fixed/static price ticket sales, and/or dynamic pricing of tickets. The example processors 134 conduct and/or manage the sales, keep track of items or sets of items being sold, the status of sales, and in the case of auctions, the type of auction current bidders, the current bid amounts, the minimum bid increments, the current lowest bid prices needed to potentially win auctions, the number of items in a set being auctioned off, and so on.

By way of example, the types of auctions can include one or more of the following:

1. Pay what you bid auction, where an auction winner pays the amount the winner bid
2. Uniform pricing auction, where auction winners for a given category of tickets/seats pay the lowest winning bid in the given category
3. A reverse auction, where the user specifies the quantity and quality of seats for an event and how much the user is willing to pay for corresponding tickets, and one or more Sellers can choose whether or not they are willing to sell those tickets at those prices. For example, the Seller can be a ticket broker or other ticket purchaser.

The processors 134, or another system, can be used to host yield management software which forecasts event demand using historical data, cost data, and/or other data. In addition, the yield management software can set initial ticket prices (or initial minimum bids in the case of auctions), adjust ticket prices (or minimum bids), schedule ticket price adjustments, and/or control the release of event seats.

The use of load balancers and multiple ticket sales processors can enable the sale/auction to continue, potentially with little or no performance impact, even if a system component (e.g., a processor 134) fails. For example, if a sales processor fails, processes that were performed by the failed processor are optionally directed via the load balancer to another sales processor. A session cluster system 136 includes an optional load balancer 138 and a plurality of processors 140 and is used to manage sessions.

A member transaction repository database 142 stores user contact information, billing information, preferences, account status, and the like, that can be accessed by other portions of the system 104. In addition, the database 142 can store an opt-in indication, wherein, with respect to auctions, the user has agreed to have their bid automatically increased by a certain amount and/or up to a maximum amount in order to attempt to ensure that they win a given auction. The database 142 can also store a user opt-in for notifications regarding auctions, auction status, and/or change in the user's bid status from losing to winning bid or from winning to losing.

The database 142 can also store a user opt-in for notifications regarding non-auctions, such as for notifications when ticket prices have been decreased in a price decay sale. Optionally, the database 142 stores a user indication that a user will purchase a ticket for a given event for a given seating area (or areas) if the ticket price is at or below a specified amount, wherein if the ticket price meets the user price criteria, the system automatically completes the purchase and charges the user. By way of example, the user can specify such purchase criteria via a web page hosted by the system 104.

Optionally, the database can store a user opt-in for notifications regarding the release of additional seat tickets for an event. For example, a notification can be transmitted to the user each time seat tickets are provided for sale or auction for a given event. Optionally, the opt-in can be limited to notifications for the release of seat tickets in selected venue areas or ticket price bands.

An event database 144 stores information regarding events, including, by way of example, the venue, artist/team, date, time, and the like. The event database 144, or a separate database, includes ticket information records, including one or more of barcode information, event name, event date, seat identifier, ticket holder name or other identifier of a current ticket holder, names or other identifiers of past holders of the ticket, a ticket valid/invalid indicator, and/or an indicator that as to whether the ticket has been used. An event database server 146 is used to provide event database access to other portions of the system.

An example database 148 is provided that stores one or more of Seller ticket sales rules. For example, with respect to auctions, the sales rules can include auction rules (e.g., criteria for what a winning bid actually pays, when the auction will start, when the auction will end), auction operator rules, bidder eligibility criteria, information on the Units being auctioned, including a description, the reserve price (if any) the minimum bid price (if any), the minimum bid increment (if any), the maximum bid increment (if any), the quantity available, the minimum quantity of Units that can be bid on by a given user, the maximum quantity of Units a given user can bid on (if any), the date the auction ends for the corresponding Units, the current bids, the current bid ranking, corresponding bidder identifiers, bid ranking criteria, Unit categories, and/or the like.

The database 148, or another database, can also store information regarding non-auction Unit sales (e.g., ticket sales for an event), such as a presale beginning date, where selected users (e.g., members of one or more specified fan clubs, season ticket holders, holders of certain types of financial instruments, such as a credit card associated with a specified brand or issuer, frequent ticket buyers, etc.) can purchase tickets at set prices before the general public can, a presale end date, an onsale beginning date, where the general public can purchase event tickets at set prices, an onsale end date, the maximum quantity of Units a user can purchase, and so on. With respect to a non-auction sale where the price of certain Units are adjusted during a sales period (e.g., wherein a ticket price is increased or decreased over the course of a ticket sales period to enhance total revenues), the database 148 can further store some or all of the following: information regarding a minimum Unit sales price, a maximum Unit sales price, a minimum dollar increment with respect to increasing a Unit sales price, a minimum dollar decrement with respect to decreasing a Unit sales price, a maximum dollar increment with respect to increasing a Unit sales price, a maximum dollar decrement with respect to decreasing a Unit sales price, the data and/or time when price increments or decrements are to take place, and a limit on the number of Unit price changes within a specified period (e.g., no more than one price change every four hours, no more than one price change every twenty four hours, etc.).

A survey and historical information database 149 can also be provided that stores survey results from consumers related to, by way of example, ticket pricing and/or seat, area, or section ranking. In addition, the database 149 optionally includes historical sales information (e.g., rate of ticket sales per section or area for one or more historical events, total ticket sales per section for one or more historical events, rate of ticket sales per price band for one or more historical events, total ticket sales per price band for one or more historical events, etc.). The database 149 can also include actual/estimated cost and revenue data.

A host network system 150 is provided that stores bids (e.g., winning and optionally losing bids), event, sales, and auction set-up information, section and seat information (e.g., quality or ranking information), seat to bidder allocations in the case of auctions, and credit card processing.

By way of example, the ticketing system enables a user (the "Seller") to sell (e.g., on behalf of himself or a principal) Units to multiple users. Thus, for example, the Seller can optionally be acting as a ticket issuer (such as an artist, sports team, event producer, or venue), or an agent for the issuer, rather than as a reseller. Thus, the Seller can be a primary market ticket seller, rather than a potentially less reliable secondary market reseller. The Seller can also be a reseller, such as a secondary market reseller where the seller had purchased the tickets from a source, such as a primary market ticket seller, and is reselling the purchased tickets to others.

By way of example, the ticketing system enables the Seller to sell Units to multiple users over a network at the same time or over a period of time. The Seller optionally determines whether or not to impose either or both a Unit quantity maximum level and a Unit quantity minimum level, which can be stored in a system database, as previously discussed. For example, the Unit quantity maximum level can be set to a value that is less than the total quantity of Units being sold for an event. If both a Unit quantity maximum level and a minimum level are set, then a user can be prevented from purchasing a quantity of Units offered by the Seller that is less than any Unit quantity minimum level or greater than any Unit quantity maximum level.

Instead of a minimum or maximum level as just described, the Seller may instead offer users several specified choices when determining the quantity of Units to purchase. For example, the Seller may optionally only offer users the chance to purchase a Unit quantity that is a multiple of two, is an odd number, or is the number five, seven, eight, or other determined number. The foregoing bidding or purchase limitations or requirements can be stored in computer readable databases, such as those previously described.

The ticketing system may condition a potential user's eligibility to purchase or bid for tickets, or specific ticket group for an event based on certain user or other characteristics, which may include, without limitation, whether the user has purchased or registered for a certain type of membership, the user's past purchase history with respect other items sold or offered for sale by the Seller or a third party, where the user lives (for example, bidders may be required to be within a particular geographic region, within a particular governmental entity, such as a particular state or states, city or cities, zip code or zip codes, or within a certain distance from a given location, such as a venue or the like), and/or whether the user meets certain financial qualifications.

As will be described below, the system described above (or other computer system) can use some or all of the following information to set prices dynamically (e.g., where the ticket price is varied based on changing conditions) and/or statically (e.g., wherein a ticket price is set once based on certain parameters). For example, the price can be set based on historical sales data, current sales data/patterns, actual and/or predicted costs, actual and/or predicted revenues, characteristics of the relevant ticket-buying population, venue seating characteristics, the desirability of packing venue seats, minimum price constraints, maximum price constraints, and/or limits on the ability to vary prices more than a certain number of times in a specified period. In addition, ticket limits (e.g., a limit on the maximum number of tickets a user can buy) can optionally be set to increase the number of transactions to sell a given number of seats, hence providing more opportunities to collect data relevant to adjusting ticket prices and to adjust ticket pricing. Further, with respect to an auction, some or all of the foregoing information can to be used to set initial minimum bids, minimum bid increments, and maximum bid increments.

Thus, for example, optionally, a ticket price (for one or more tickets) can be dynamically set using a software model that determines a "Market Value" based, in part, on maximizing or enhancing venue revenue based on inventory left to sell and on the pattern or rate of sales up to the current time or other designated time (e.g., rate of ticket sales per section, total ticket sales per section to date, rate of ticket sales per price band, total ticket sales per price band to date, etc.).

For example, during a ticket sale a set of 2D sales curves can be generated and stored, wherein the curves are associated with the venue, performer, etc. The x-axis of a curve corresponds to time (e.g., relative to the beginning of the ticket sale). The y-axis corresponds to the percentage of sellable inventory (e.g., seat tickets) sold for the event (or, optionally, the percentage of sellable inventory still unsold). Sellable inventory can correspond to the seat tickets allocated to the ticket seller to sell, rather than all the seat tickets for the event. In a future ticket sale, one or more of the previously generated curves can be retrieved and pattern matching is performed (e.g., to locate a curve that is similar to the sales pattern of the current ticket sale). Based on the curve of the current sale, the system locates a similar or matching curve from a past event sale, or the system attempts to make (e.g., by adjusting ticket prices up or own) the current sale curve match or be more similar to a sale curve from a previous ticket sale. The phrase "match" is intended to include those curves who similarly meet predefined criteria, even if the matching curves are not identical.

By way of example, on detection of a match, or on detection of variance from a previous sales curve that that the system is attempting to match, one or more actions are taken or triggered that are expected to affect ticket sales.

Examples of triggered actions include (but are not limited to) the following actions which can affect short term and/or long term yield:
  changing ticket prices up or down
  recommending promotions to the seller
  releasing additional seats Optionally, sales curves for current and previous ticket sales can be manually analyzed, at least in part, in order recommendations on future strategies to one or more Sellers.

Optionally, target or desired sales curves are generated and stored in computer readable memory, and a dynamic pricing process, running during a ticket sale, attempts to match that target curve by adjusting ticket prices, releasing seats, and/or using other techniques.

An example system executes pricing processes that take into account some or all of the following:

1) The demand for an event can be estimated or determined based on daily sale patterns compared to historical templates for similar events, or other selected events. For example, if an event at a given venue involves the performance of a given artist, the comparison can be made relative to the last performance by the artist at that venue and/or at a similarly sized venue in a similar market (e.g., in a venue in a city of a similar size with a similar demographic), within a relatively recent time period (e.g., the last 3 months, 6 months, year, or 2 years). Thus, for example, if an artist sold out at a venue in a first city within 24 hours, the system can estimate that the artist will quickly sell out a venue in second city, where the artist is performing in the second city within 12 months (or other selected period) of the performance in the first city.

2) Based, at least in part, on these sale patterns, an estimate can be made of the number of seats that will be sold up to the time of event performance at different ticket price levels for a given seat or venue area (or in the case of an auction, at different minimum bid levels and/or different minimum/maximum bid increments). For example, an estimate can be made that at a first, relatively low ticket price, a venue section is likely to be sold out. An estimate can be made that at a second, relatively higher ticket price, tickets for about 66% of seats in a venue section are likely to be sold.

3) Often, the total value of tickets purchased to an event exceeds that of ticket sales (e.g., the sum (face value of the tickets sold)). For example, ticket value (e.g., for a venue operator, artist, team, and/or other Seller) may include per capita income from concessions, merchandise, parking, etc., which will be referred to herein as ancillary revenues. By way of illustration, tickets sold at a relatively higher price may also be expected to have relatively higher ancillary revenues associated therewith as the ticket purchaser may have a relatively higher income and relatively more disposable income. In order to enhance or maximize total revenue (e.g., total ticket sales+total ancillary revenues), it may be desirable to set ticket prices low enough to better ensure that a first desired amount of tickets are sold, even though the resulting dollar value of the ticket sales may not be maximized.

By way of further example, if a given artist (or several artists that perform in the same genre) has performed at several different venues, with correspondingly different ticket prices, within a certain period of time (e.g., one year), if there are substantially different patterns of sales, an inference can be made by the system that the different is at least partly attributable to the different ticket prices. Thus, for example, if a certain rate of sales or total sales is desired in order to enhance or maximize total revenue, a ticket price can be set that corresponds to that of one or more previous events that had the desired rate of sales or total sales.

In an example embodiment, a computer system, for example the ticketing system described above, receives, automatically (e.g., from a database in response to a request or from another computer system) or manually (e.g. from operations personnel), information regarding costs and/or revenue streams. For example, the cost information can include some or all of the following:
  maintenance costs
  employee/contractor costs (e.g., guards, maintenance crews, ushers, ticketing personnel)
  energy costs (e.g., for electricity, natural gas, coal, etc.)
  governmental fees (e.g., permit fees)
  facility rental fees (if the facility is being rented for an event)
  equipment rental fees
  guaranteed revenues to performer or other entity For example, the revenue streams can include some or all of the following
  ticket sales
  concessions
  merchandise
  parking
  advertising Some of the costs and fees associated with an event may be known prior to the event, and some costs and fees may be estimated or predicted (with greater or lesser accuracy). For example, facility and/or equipment rental fees may be known prior to an event, while energy costs may be predicted. By way of further example, advertising revenues may be known prior to an event (e.g., because they may be fixed in on or more contracts), while merchandising revenues may be predicted.

A cost can be a fixed cost, a cost can be associated with the venue or event capacity, a cost can be assigned to a price level, and/or a cost can be related to the attendance. By way of illustration, with respect to janitorial costs, in some instances the cost may be a fixed cost, while in other instances the cost can be at least party based on capacity or a price level. Some types of revenues have an associated offsetting cost and some revenues have little or no incremental cost (e.g., service fees in certain situations) or may have costs which are related to price and attendance.

The ticketing system can use the costs and/or revenues associated with an event to determine or predict/estimate the incremental value of tickets sold. Optionally, based on current, substantially real time information on tickets sold, the daily pattern of sales as compared to historical norms (including sales information for one or more selected prior events), and remaining capacity (e.g., unsold tickets for the event, unsold tickets for the event and one or more other events, such as where there are multiple performances by a given performed at a given venue), the system determines whether prices should be increased or decreased at a given point in time or within a time period to enhance or maximize revenue. For example, the minimum price or minimum bid amount of a ticket can optionally be set not to be less than the incremental cost of having another attendee. Optionally, the minimum price of a ticket can be set not to be less than the incremental cost of having another attendee plus the anticipated ancillary revenues associated with an additional attendee buying a ticket at that price level.

Optionally, the ticket price increase and/or decrease can be limited so that the price will not increase or decrease more than a certain amount. The system can optionally vary the ticket prices without any time restraints, or the system may be constrained via software as to how often the ticket prices can be raised or lowered (e.g., once a day, once a week, once every two weeks, etc.), and when the first price adjustment will take place. Optionally, the system may vary the ticket price more often as the event date approaches. For example, ticket prices may be reduced with greater frequency as the event date approaches if a certain amount or percentage of seat tickets remain unsold. By way of illustration, the ticket inventory can be offered at a first price initially, until a certain number of days or time prior to the event date. If a specified percentage of the ticket inventory remains unsold (e.g., for the venue as a whole or for certain seat categories), then price adjustments will begin, wherein the closer to the event date, the lower the price of the tickets.

An example embodiment of managing event revenue yields will now be described. For example, the yield management processes and techniques can be used to enhance the yield from ticket sales and/or enhance ancillary revenues, for an event. However, different or modified techniques and parameters can also be used.

Short-Term Yield Management

The example processes described herein can be used for short-term yield management, such as by price and capacity adjustments during an event sales period and/or slightly before a general sales period. For example, real-time adjustment of prices or allocation of seats can be performed. Price adjustment is optionally based, at least in part, on the characteristics of the ticket buying population (e.g., population size of relevant ticket buying population, income, predicted or estimated patience, the ticket price that would cause an estimated percentage of the relevant population not to buy a ticket, the ticket price that would cause an estimated percentage of the relevant population to buy a ticket or an additional ticket, etc.), and the venue configuration (e.g., the number and type of seating areas, and/or the number of price levels and the capacity for each price level). Capacity can be dynamically shifted between price levels to enhance revenues and/or profits.

A. Ticket-Buying Population

In this example, the ticket-buying population for a given event is assumed to consist of various groups or categories whose purchasing patterns are based at least partly on disposable income and on their purpose for attending an event. Thus, the price tolerance of different subdistributions of potential ticket purchasers can be identified for use in estimating demand at different pricing levels and to set ticket prices. Below are illustrative sample groups that might compose the audience for a baseball event (or other event, such as a concert), although other groupings and grouping characterizations can be used as well, such as for a baseball event or for other event types:

Showoffs: These individuals have the purpose of being seen at the event, as opposed to enjoying the event itself. They are willing to pay high premiums for the best seats and have no desire for anything less than superior seating.

High income fans: These individuals are truly interested in the event and have the means (e.g., are in the top 10%, 5%, 3%, 1%, 0.5%, or other selected percentage of the population with respect to income) to purchase expensive seats. They are not willing to pay ludicrously high prices and are willing to accept seats of moderate quality.

Middle income fans: (e.g., with incomes between the high income fans and the low income fans) These individuals are truly interested in the event but are not capable of purchasing the highest-priced tickets. They are willing to accept seats of fair quality.

Low income fans: This group is similar to the middle income group, but with a more limited capacity for purchasing moderately-priced seats (e.g., are in the bottom 40%, 30%, 20%, 10%, 5%, 3%, 1%, 0.5%, or other selected percentage of the population with respect to income).

Socially oriented: This group (sometimes referred to as "party animals") is interested in the social interaction related to the event and have a lesser or no interest in the event itself. They therefore want to purchase the least-expensive seats, away from the general population.

Brokers: Members of this group are not interested in attending the event but are attempting to derive income by reselling high quality seats to individuals of middle income or above.

1. Population Size and Market Inefficiency

For the purposes of yield management, such as short-term yield management, optionally the size of the population (e.g., the population of potentially or likely interested consumers in the event) is assumed to be substantially fixed and dependent on the nature (e.g., artist, venue, date, time, and/or other event characteristics) of the event. The changing of prices can affect demand as far as the number of tickets an individual is willing to purchase. Other embodiments can take into account that the population size may vary. Additional factors, such as the time of year, the weather, such as temperature, rainfall, snowfall, humidity, (e.g., the weather in a period preceding a ticket sale or event, current weather, and/or anticipated weather), the current and/or anticipated economic conditions (e.g., consumer confidence, whether the economy is in a recession, whether the economy is growing at a certain rate, trend on consumer spending on entertainment, etc.), and/or the occurrence of natural or man-made disasters (e.g., an earthquake, a large scale flood, a large scale fire, a hurricane, an act of terrorism), can be taken into account when setting ticket prices.

2. Population Group Parameters

For the purposes of a modeling example, each of the population sub-groups can be characterized by a set of parameters. The following are example parameters, one or more of which can be used in the model:

U: the total size of the estimated interested population p: the population proportion. This is defined as the number of individuals in the group divided by U.

$\lambda$: the patience parameter. This parameter describes the probability of the individual attempting another transaction if a transaction fails because either pricing is too high or capacity is temporarily unavailable (which can be determined, for example, via surveys and/or by examining historical ticket sales information). To enhance the efficiency of the determinations herein, it is assumed that the patience parameter decays geometrically over time, although are decay progressions can be used as appropriate. Thus, the parameter for a second attempt is $\lambda$ and the parameter for a third attempt is ($\lambda \cdot \lambda$). Other decay formulas can be used as well.

$\alpha$: the ticket increase parameter. It is assumed that most individuals in an applicable population will buy a predetermined number of tickets. They will either buy no tickets, if pricing is above a certain maximum value, or add tickets to their order if pricing is significantly below this maximum threshold. The parameter $\alpha$ describes the price as a percentage of the maximum threshold that would or is likely to strongly encourage an individual to add a ticket to his order (although the individual may still elect not to purchase such ticket). To enhance the efficiency of the determinations herein, it is assumed that a ticket would be added to the order if the price dropped below (α·α) times the threshold value, although this might not be the case in actual practice. Optionally, an assumption can be made that most users will either buy no tickets or at least two tickets as many people do not want to attend an event alone. Thus, a prediction or assumption that a third ticket would be added to the order if the price dropped below (α·α) times the threshold value.

3. Area Parameters

Each group may have a different set of purchasing parameters for each area of the venue.

t: The number of tickets in an order.

m: The predicted maximum price individuals are willing to pay for tickets in the area. In an example embodiment, the m parameter is defined via the lognormal probability distribution.

$$\left\{ \begin{array}{ll} \frac{1}{\sqrt{2\pi}\,\sigma x} e^{-\frac{1}{2\sigma^2}[\ln(x)-\mu]^2} & x >= 0 \\ 0 & x < 0 \end{array} \right\}$$

The basis for this predicted distribution is as follows: While logically permissible, negative prices would rarely be practical, and such events are optionally not considered in this model, although other models can consider the relationship between how much an individual is being offered to attend an event and the likelihood they would attend at different offered amounts (such as may be done to help fill an event venue or as a reward or prize). In this example, an individual's subjective comparison of two prices is optionally assumed to be driven more by percentage difference than absolute difference. For example, $5 added to a $600 ticket is relatively less meaningful (e.g., is less likely to affect a purchase decision) compared to $5 added to a $10 ticket. However, other models can take into account that, for some individuals, the absolute difference is as important, or is more important than the percentage difference.

Model data is optionally accessed by retrieving from a database or other data store, or by a user manually entering the model data. The model data can include the median ticket price (or other statistical value, such as the mean ticket price) in the distribution, and the threshold price at which it is estimated that about 75% (or other specified percentage) of given group or category of potential ticket purchasers would be deterred from purchasing tickets. This estimate regarding the threshold price which would deter potential purchasers can be derived from surveys regarding such threshold price and/or from historical results for ticket sales at different price points.

Figure 5:
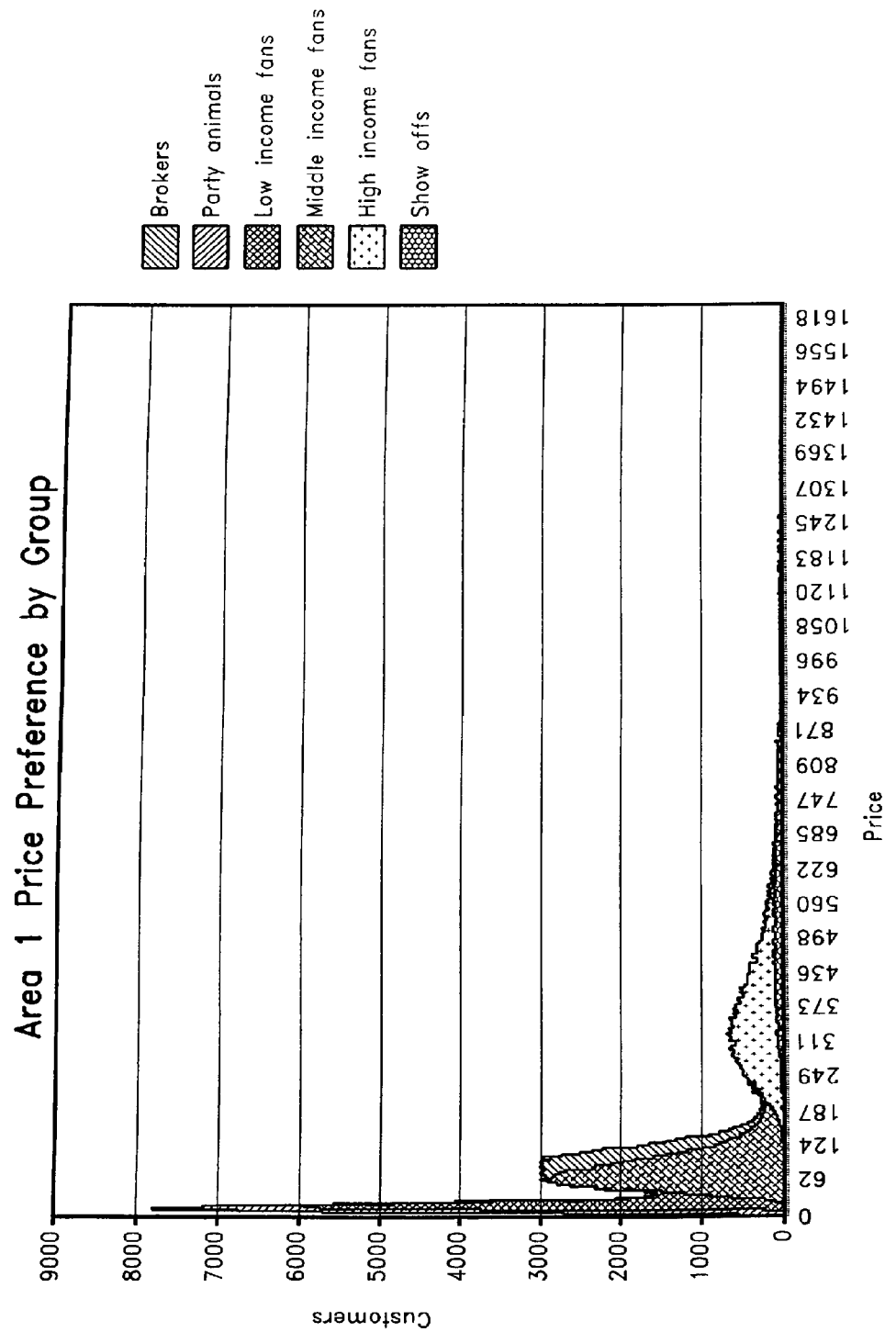
FIG. 5 graphically illustrates example estimated valuation patterns for a variety of population groups.

An example estimated population distribution for a given event or event-type is illustrated in FIG. 4. For a variety of potential purchaser types the following information is provided for different seat sections or categories of seats (e.g., Seat Category 1, Seat Category 2, Seat Category 3, Seat Category 4: an estimate as to the percentage the purchaser type represents of the entire relevant potential purchaser population; the estimated patience parameter; the estimated median ticket price the purchaser would be willing to pay; the estimated threshold price; and the estimated number of tickets that the average potential purchaser type will buy when the tickets are at the corresponding median price. In this example, certain types of potential purchasers, such as "Show Offs" or ticket brokers are unlikely to be interested in relatively poor/less expensive seats, such as those in Seat Categories 3 and 4, even if the ticket price was set to 0. Other types of potential purchasers, such as middle level, low income, and socially oriented fans are likely to purchase more tickets as the price decreases. FIG. 5 illustrates graphically the number of potential customers of a given potential purchaser type that is estimated would by a ticket for a given venue area at a given price.

B. Venues

1. Areas

Ticketed venues for non-general admission events can be considered to be divided into areas. The boundaries defining these areas can be determined by physical separation of sections (e.g., aisles or venue levels), by the innate desirability of seats (e.g. front row, row behind the stage, center row seats, obstructed view seats, etc.) which are optionally determined via surveys, experience, and/or intuition, or via other seat properties. From the perspective of short term yield management, these "separations" provide an opportunity to distinguish seats by value, collect demand information, and encourage customer purchase decisions. Thus, for example, different prices can be dynamically set for different venue areas. Further, the frequency and/or percentage or dollar amount in price change can be different for tickets associated with corresponding different venue areas.

2. Ticket Limits

Venues or other Sellers can also impose ticket limits by area. Ticket limits restrict the maximum number of tickets a customer (e.g., as identified via a user identifier, password, mailing address, billing address, credit card number, bank account number, etc.) can purchase for a given event or across multiple events. These limits can optionally be imposed to better ensure fair access to quality seats, preventing certain groups (e.g., ticket scalpers) from monopolizing prime seating for resale purposes.

Ticket limits can be incorporated into the yield management analysis. For example, smaller ticket limits increases the number of transactions needed to fill a venue area, creating more opportunity to adjust pricing and collect data. Thus, for example, a ticket limit can be set so as to increase the opportunity to adjust pricing and collect data. Also, ticket limits can force customers to decrease a desired order size or choose different venue areas to fulfill a larger order. Thus, for example, different venue areas may be associated with different ticket limits. By way of illustration, the ticket limit for a relatively more desirable area (e.g., orchestra) may be set to 2 or 4, while the ticket limit for a relatively less desirable area may be set to 8 or 12. Further, a purchaser may be allowed to purchase up to the ticket limit for two or more areas. For example, a purchaser may be allowed to purchase up to 12 tickets, including up to 4 tickets in a first area and up to 8 tickets in a second area. In an example embodiment, a ticket limit for a performer can include two or more performances. For example, the ticket limit can restrict a purchaser to a total of 8 tickets across two (or other number) of performances. Thus, the purchaser can purchase 6 tickets for a first show by a performer, and 2 tickets for a second show by the performer, for a total of 8 tickets.

3. Minimum Pricing

An example dynamic pricing process takes venue (or other Seller) imposed minimum pricing (e.g., where a ticket for a venue area is not to be sold for less than a specified amount) into account. A minimum price may be set for a variety of reasons, such as not to set a precedent of very low ticket prices, not to embarrass a performer, and/or to make sure the ticket price (or a designated portion thereof) is sufficient to cover the incremental costs associated with an additional event attendee.

By way of illustration, the economic model used by promoters sometimes guarantees certain revenue to the performer. If dynamic pricing were to set too low on a per seat price, the event may not generate sufficient revenue to cover this guarantee. Often, there is a certain component of a ticket price which is used to cover the cost of facility management and operations, such as air conditioning and janitorial services. Ticket prices may optionally be set so as to be maintained at or above a minimum threshold so as to cover such costs.

4. Maximum Pricing

In a dynamic pricing model, a venue (or other Seller) may impose a maximum price for tickets in certain areas. Such limits may be motivated by a desire for public perception of fair access (such that not only the very wealthy can afford event tickets). Such maximum price constraints can be used to limit or bound prices set by the dynamic pricing process.

5. Discount Pricing and Ticket Types

A Seller (e.g., a venue and/or event) can release discounted tickets based on customer type (e.g. children, seniors, students) or as a result of special promotions. Optionally, these event tickets may be excluded from dynamic pricing, although they can optionally be dynamically priced as well. Further, the size of the discount for a given customer type is optionally dynamically varied based on some or all of the factors that are used to set price.

6. Contiguous Seat Problem

When assigning specific seats to ticket purchasers, the problem of contiguous seats becomes an issue. As an individual row fills, it is possible that an order needs to be shifted to a different row with inferior seating, because insufficient contiguous seats are available in the current row. The dynamic pricing process can optionally take this effect into account based on data collected over time.

For example, the contiguous seat problem presents an opportunity for another form of optimization. Optionally, during normal sales, the ticket system attempts to provide the consumers the best (e.g. highest ranked, or highest ranked within a requested ticket group or venue area) available seats that fulfill the order (taking into account the quantity of sets requested by a given consumer) at a given instant of time. This can leave single seats at the ends of rows or in areas where prior orders have been abandoned. These single seats often take time to sell, and may not sell at all, as demand for lone seats is relatively low. Thus, even though there may be unsold seats in a given venue area, some customers interested in purchasing tickets for contiguous seats in that area cannot be satisfied. The short-term yield management process optionally allows orders to be sorted so as to provide the possibility of tighter packing of seats. This packing would provide a relatively higher yield.

For example, a lower ranked bid may be assigned tickets (or other Units) that are ranked higher than tickets assigned to a higher ranked bid if such lower ranked bid is for a quantity of tickets that either or both (a) enables all (or most) tickets for seats in the same vicinity to be sold while ensuring that tickets sold in a given transaction with a purchaser are for seats that are next to each other (unless the purchaser requests that the seats not be contiguous or next to each other) or (b) relatively increases or maximizes the total aggregate dollar value of ticket sales and/or ancillary revenues while ensuring that tickets sold in a given transaction with a purchaser are for seats that are next to each other (unless the purchaser requests that the seats not be contiguous or next to each other).

Optionally, when attempting to reduce the number of single seats, lower priced tickets (e.g., tickets being sold for a relatively price or auction bid) will still be assigned seat tickets that are ranked lower than the seats assigned to tickets sold for relatively higher prices (or assigned to higher ranked bids in an auction), even if, as a result, tickets for some seats remain unsold.

7. Other Revenue Sources

As discussed above, in many instances, in addition to ticket revenue, there may be other sources of income for a venue. Often, concessions and merchandise sales contribute significantly to final yield. Thus, certain example short-term yield management algorithms and processes optionally consider occupied capacity as a component of yield. Thus, for example, the ticket price may be set to increase the number of tickets sold, even if the ticket price(s) selected does not maximize revenues from ticket sales. Optionally, the ticket price(s) are set so that the expected total revenue or total profit from the combined sale of tickets and ancillaries (e.g. concessions, merchandise, parking, etc.) is enhanced or maximized.

By way of example and not limitation, setting and adjusting ticket prices can be treated as a linear programming problem, and linear programming, which is well known in the art, can be used to mathematically optimize or select the ticket price using the related variables. A linear programming problem is generally an optimization problem in which an objective function (e.g., total revenue maximization or total ticket sale maximization) and the constraints (pricing thresholds at which ticket sales and ancillary revenues drop, or drop more than a specified amount) are linear. In an example embodiment, rather than just optimizing tickets sales or filing seats, yield optimization is performed to enhance or maximize total revenue to the venue, the event/promoter, the performer and/or other entity from ticket sales and ancillary revenues, even if the ancillary revenues are the result of sales from entities other than the ticket seller.

8. Venue Parameters

Example venue parameters can include some or all of the following parameters:

c: the capacity of each area of the venue for which tickets are being sold
l: the ticket limit in each area
i: the minimum allowed price in each area
a: the maximum allowed price in each area
o: the contiguous seat effect. A measured factor which when multiplied by model generated yield provides a yield closer to what would be observed in practice. For example, the measured factor can be related to the average number of seats consumers are expected to request for a given inventory. The number can be derived from sales models and/or historical data taken from previous sales of the same artist or venue and/or for similar artists (e.g., similar demographic appeal and/or album/song/ticket sales).
$n_f$: Fixed cost or revenue per seat external to ticket price.
$n_v$: Variable cost or revenue per seat as a percentage of ticket price.

By way of illustration, the price of tickets affects the average number of seats consumers will ask for. The average number of seats consumers ask for affects the packing efficiency of seats (e.g., how many orphaned seats are left where the system could not find a desired number of seats in a row together for a ticket requester). In certain instances, the desired yield of a section is when 100% of the seats are sold. When packing efficiency goes down, the yield often goes down because seats are left unsold. There is a measurable relationship between the ticket price and the packing efficiency. As ticket pricing goes up or down, so do the number of unsold seats. As a consequence, there will be thresholds at which a change in ticket price (upwards or downwards) will cause ticket revenues to decrease as a result of more seats remaining unsold. Thus, there is a balance between setting ticket prices and enhancing the number of tickets sold. Less expensive tickets may result in lower overall ticket sales even though more tickets may be sold. It may be more profitable and the dollar value of ticket sales may be higher if ticket prices are raised and if buyers can only request or buy relatively smaller blocks of tickets or are discouraged from buying large blocks of tickets.

Ticket price is a deterministic predictor of the average number of contiguous seats consumers will ask for. Thus, if the ticket price is relatively higher, buyers will tend to purchase smaller tickets for smaller blocks of seats, making it easier to reduce the number of orphaned seats by packing the rows more efficiently, and hence revenues are increased. If consumer buying patterns do not adequately match the predicted buying patterns, at least partly based on real time sales data, the ticket price can be dynamically adjusted (e.g., in real time) to obtain the desired yield and/or to reduce the average or median size of seat blocks being purchased by consumers.

C. Distribution Channels

Tickets sold through the example ticket system are optionally distributed through one or more channels, such as: physical ticket outlets, phones, box-office, the Internet, interactive televisions, and voice response units. A given distribution channel may have an associated a set of characteristics which may be significant from the perspective of yield management.

1. Abandonment Rates $A$, $\sigma_A$: Measures of the average and standard deviation of length of time a customer is willing to wait in queue before deciding to forego purchasing tickets, although other statistical measurements may be used. With appropriate messaging, this parameter can potentially be altered for a given channel. The abandonment rates can be estimated at least partly based on historical abandonment rates for different messaging.

For example, the queue abandonment rate can be influenced by controlling the messaging or notification provided to the consumer in a ticketing-related queue which estimates the associated wait time (e.g., the time until the consumer's ticket request or ticket information request is serviced). By way of example, when the request is serviced, the system can determine if there are seats available that correspond to the user's request for tickets (e.g., the system can determine if there are seats available that match the quantity and quality of requested seat tickets).

By way of illustration, consumers may be frustrated, and more likely to abandon their place in the queue (e.g., by navigating to a different Web page, by closing their browser, or otherwise), if the time estimate provided in the notification is inaccurate and underestimates the queue wait time. For example, if the notification provides an estimate with one second resolution, it is possible during the wait in the queue, a first notification may provide a 90 second wait time notification, and a second, later notification may provide a higher wait time (96 seconds). This increase in time may result from factors that are causing the queue processing system to slow down (e.g., if a technical problem results in a temporary reduction in throughput capacity). If instead, the notification provides a wait estimate rounded up or down to the nearest minute (or two, or three), it is less likely that the wait time displayed to the consumer with change, and hence consumers are likely to be less frustrated and less likely to abandon their place in the queue.

Optionally, the wait time estimate can be in a "less than" format (e.g., "the wait time is less than [specified time period]"), where the specified time period is selected so that it is highly likely that the consumer's request will be serviced before the time period expires. For example, the time period can be selected so that 90%, 95%, or at least 99% of the time the consumer's request will be serviced before the time period expires.

Further, if the consumer were not provided with a time estimate with respect to expected wait period, in certain instances, such as when the queue is of a medium length (e.g., 45-60 seconds) the abandonment rate may increase. In certain other instances, such as when the queue is long (e.g., 3-4 minutes), the abandonment rate may decrease if no time estimates were provided. In other instances, such as when the queue is short (e.g., less than 10 seconds or less than 20 seconds), the presence or absence of a time estimate may not significantly affect the abandonment rate.

Optionally, if a consumer's place in a ticket purchase queue (e.g., where the consumer's place is far back in line, based on a determination or estimate of the consumer's place or relative place in the queue) makes it unlikely that there will be an available ticket that meets the consumer's ticket request once the consumer's request is serviced, the consumer can be so informed. If available, the system can notify the consumer regarding alternate performances for the event in which the consumer is interested (e.g., additional performance times/dates by the performer, such as for a concert, a play, a sporting event, or movie). Optionally, one or more links can be presented for such alternate performances, which, when activated by the consumer, will cause a ticket selection and/or purchase process to be initiated (e.g., the consumer will be provided an interface via which the consumer can select a desired ticket price category/section, the system will inform the consumer if such tickets are available, and if so, the consumer can purchase the tickets). Optionally, the consumer can also be informed via a web page or otherwise of other events the consumer might be interested in based on the initial event the consumer attempted to purchase tickets for and/or the consumer's past purchase history.

In an example embodiment, a prediction or inference is automatically made by the system regarding the consumer's interest in other events using collaborative filtering. The predication can be based, in whole or in part, on the ticket purchases made by other consumers who have also purchased tickets for the performer/event associated with the initial event. The recommendations can also be based on the ticket purchases of other consumers whose interests (e.g., as indicated via an online survey or by event ratings provided by the consumers) are similar (e.g., like the same music if the event is a musical performance, like the same type of plays) to those of the consumer of interest.

Thus, the notification selection (e.g., whether a time estimate is given, the resolution of the time estimate, the time estimate accuracy, whether the consumer is provided information indicating the likelihood that there will be suitable tickets available once the consumer's ticket request is serviced, etc.) can optionally be manually or automatically selected so as to reduce or increase the abandonment rate to enhance or optimize tickets sales and/or total revenues for an event, for related events (e.g., events with the same performer), or for the ticketing Web site. The selection can be made prior to an event sale beginning, and the selection can optionally be changed during a sale in response to real time conditions (e.g., queue length). By way of example, it may be advantageous to increase the abandonment rate for certain users whose queued ticket requests are unlikely to be met (e.g., where it is likely the event will be sold out by the time their request is serviced) so as to encourage such users to purchase tickets for a different event.

2. Transaction Rates

T, $\sigma_T$: The average and standard deviation of the length of time is takes to complete a transaction for each distribution channel, although other statistical measurements may be used.

3. Simultaneous Transactions

P: The number of simultaneous transactions each distribution channel can support.

4. Seat Desertion Rate

S: The probability a customer will cancel a transaction (e.g., after the customer is presented with one or more available seats, such as those presented to the customer as best seats currently available) and will attempt another transaction hoping to get a better seat ("seat desertion rate"). Optionally, this parameter is defined for the Internet and not the other channels as other channels tend to have relatively low seat desertion rates. However, this parameter can be defined for one or more other channels as well.

5. Transitional Seats

The combination of simultaneous transactions, transaction rate, and seat desertion rate can be useful, although not required, in the yield management process. When the ticket system offers specific reserved seats for sale to a given customer, these seats are optionally held or reserved for a predetermined period of time (e.g., one minute, two minutes, three minutes, etc.) and are not available for other customers until the tickets are abandoned by the customer (e.g., the customer failed to complete the purchase transaction within the predetermined time). This has the effect of reducing available inventory over a span of time, such as several minutes, which can impact price adjustment decisions.

Thus, seats in transition include seats that have been requested and put on hold for a consumer but which have not been sold to that consumer. The existence of seats in the transitional state implies interest in the tickets at their current price. This is therefore a good measure or indication of demand and acceptance of a given set of prices.

Knowing that people are interested enough to request seats at that price at least partly validates that the current price is not set to high and may indicate room for upward adjustment of the ticket price. Optionally, the system can increase ticket prices in relatively small percentage increments (e.g., 2%, 5%, 10%) until the ratio of transitional seats vs. total sellable inventory drops by an undesirable amount.

In addition, an abandonment rate can be tracked with respect to how many people who requested seats be put in the transitional state decided not to buy tickets for those seats. If the abandonment rate of transitional seats is higher than a certain or specified threshold, this can provide a reliable indication that the ticket price may be set too high and the abandonment rate can be used to make decisions on price reductions.

6. Sale Cost $C_S$: The cost (if any) per second of time (or other time period) a customer is using a channel. For example, certain channels such as the phones have a cost associated with holding a customer in queue.

$C_T$: The cost per ticket sold through a channel.

7. Rolls

A promoter or other entity may decide to add an extra event to a performer's appearance in the same area (e.g., the same city, town, within a certain distance of the original venue, etc.) in the same or different venue. The decision to add an extra event may be based on demand shown for a prior event. Optionally, the optimization process can set ticket prices so as not to substantially reduce demand, and to provide accurate information so the roll decisions can be intelligently made.

8. Visibility of Venue Data

In order for customers to make informed purchase decisions a customer may be provided with information as to the quality of seat in each area. For example, each seat or section may be provided with a ranking displayed to the user (e.g., via a Web page or otherwise). The ranking may be based on surveys (e.g., ratings) of potential purchasers and/or on objective facts (e.g., the distance of a seat from a stage or performance area, whether the seat is directly in front of a stage or performance area or is off to one side, whether a seat has obstructed or unobstructed sightlines to the performance area, etc.). The ranking may be provided in the form of a number ranking, a star ranking, a text ranking, a color-coded ranking, or other ranking representation. Optionally, a user can request that seats having a certain ranking (e.g., seats having a specified ranking, a specified ranking or better, a specified ranking or worse, etc.) be highlighted in a display (e.g., shown in a specific color code, shown in bold, shown blinking, etc.). Optionally, different users may be provided the same or a different level of visibility with regard to this information. For example, optionally users having logged into a system account may be provided with seat rankings, while other users are not provided with seat rankings.

9. Visibility of Consumer Demand

Each channel may have different attributes with respect to gathering customer demand information. Some channels, such as the Internet, are highly interactive making it easier for the customer to enter ticket preferences thoroughly. Other channels, such as the voice response unit, optionally gather only a portion of the customer's preference on any given transaction so as not to unduly burden the customer and/or the voice response unit.

Example relative ranking of distribution channels on a scale of 1 to 10, with 1 being the worst ranking or the lowest rate (these rankings may change over time or be different for different types of events) are illustrated in the table below.

| Measure | Ticket Outlets | Phone Sales | Box Office | Internet | Voice Response |
| --- | --- | --- | --- | --- | --- |
| Abandonment rate | 1 | 6 | 1 | 10 | 6 |
| Transaction rate | 1 | 10 | 2 | 7 | 9 |
| Simultaneous transactions | 5 | 3 | 10 | 1 | 3 |
| Seat desertion rate | 1 | 1 | 1 | 10 | 1 |
| CS Sale cost | 2 | 10 | 1 | 1 | 10 |
| CT Transaction cost | 6 | 10 | 1 | 3 | 10 |
| Venue visibility | 7 | 6 | 4 | 1 | 10 |
| Visibility of customer demand | 8 | 6 | 3 | 1 | 10 |

The distribution channel ranking is optionally used as a weighting factor. For example, the weighting factor can be used to weight or modify other variables in price setting equations and process. By way of illustration, the online abandonment rate can be weighted, based at least in part on the Internet channel ranking, more heavily than the phone abandonment rate.

Optionally, the ranking can be expressed as a percentage or fractional factor that is multiplied against that channel's contribution to the value of a variable in a price setting or other equation. For example, the rankings can be on a scale of 0% to 100% or 0.1 to 1.0

By way of illustration, assume phones are given a ranking corresponding to 0.2, and the phone distribution channel has a transaction rate of 10 per min. If the transaction rate across all channels were totaled, the weighted contribution by the phone distribution channel would be 2 per minute (0.2×10). Thus, for example the total transaction rate can be calculated using the following formula:

Total transaction rate=sum($r_1$TicketOutlets+ $r_2$PhoneSales+$r_3$BoxOffice+$r_4$Internet+ $r_5$VoiceResponse)

where:

$r_1$ is the ranking for the Ticket Outlets Distribution Channel
$r_2$ is the ranking for the Phone Sales Distribution Channel
$r_3$ is the ranking for the Box Office Distribution Channel
$r_4$ is the ranking for the Internet (online) Distribution Channel
$r_5$ is the ranking for the Voice Response Distribution Channel For example, the sales price increase can be related to the weighted total transaction rate or the weighted average transaction rate.

II. Pricing Algorithms

One or more pricing algorithms or processes can be used. Such as, by way of example:

Static pricing assigned based on historical data
Pre-sale algorithms that sort customer bids for an early phase of ticket sales
Time-of-sale algorithms that adjust ticket prices in real time
Pre-Sale (Scale the House)

With respect to ticket auctions, in an example embodiment, a ticket pre-sale scales the house based on customer bids for tickets. In this category there can be one or more subcategories, each optionally having the same variants. For example there can be three subcategories, each having three variants, forming a nine-by-nine matrix, although fewer, additional, or different subcategories and variants can be used.

Subcategories:
One-shot scale-the-house
Olympic scale-the-house
Mercenary Olympic scale-the-house
Variants:
Flat
Stratified
Continuous

1. One-Shot Scale-the-House

Under this approach, a customer makes a single bid indicating an area within the venue, a number of tickets, and a price per ticket. For example: Area 1, 2 tickets, $100 per ticket.

The algorithm sorts the relevant bids from highest to lowest and assigns seats in order, highest bid first, until an area is filled or all bids are accepted.

2. Olympic Scale-the-House

Under this approach, named for the way ticket for the Olympic Games are sold, a customer makes bids, including price per ticket and number of tickets, for each area or for a subset of the areas within the venue. For example: Area 1, $100 per ticket, 3 tickets; Area 2, $50 per ticket, 4 tickets; Area 3, $0 per ticket, 0 tickets.

Bids for seats in the best area are sorted from highest to lowest and assigned in order, highest bid first, until the area is filled or all bids for that area are accepted. Customers' assigned seats in that area are removed from the pool of bids, and the process is repeated for the next area. The process iterates until seats in the last area are assigned.

3. Mercenary Olympic Scale-the-House

Under this approach, bids are accepted as for Olympic Scale-the-House. However, the algorithm assigns seats based not on highest bid but on the highest premium that each bidder is willing to pay. By way of example:

Each customer's bids for each area are compared to the average bid for that area. The difference is considered the premium the customer is willing to pay. For example:

|  | Average Bid | Customer A Bid | Customer A Premium | Customer B Bid | Customer B Premium |
|---|---|---|---|---|---|
| Area 1 | $250 | $300 | $ 50 | $250 | $0 |
| Area 2 | $ 50 | $200 | $150 | $ 40 | −$10 |

In this example, Customer A bids more than Customer B bids for seats in Area 1; however, because seats are assigned based on premiums, Customer A might get seats in Area 2 and Customer B in Area 1.

4. Variants

Example variants for each pre-sale subcategory include:

Flat: The price that all customers in an area pay is the lowest bid for the area.

Stratified: Each area is subdivided into predetermined strata. The price that all customers in a stratum pay is the lowest bid for that stratum.

Continuous: A customer pays what the customer bid.

Figure 7:
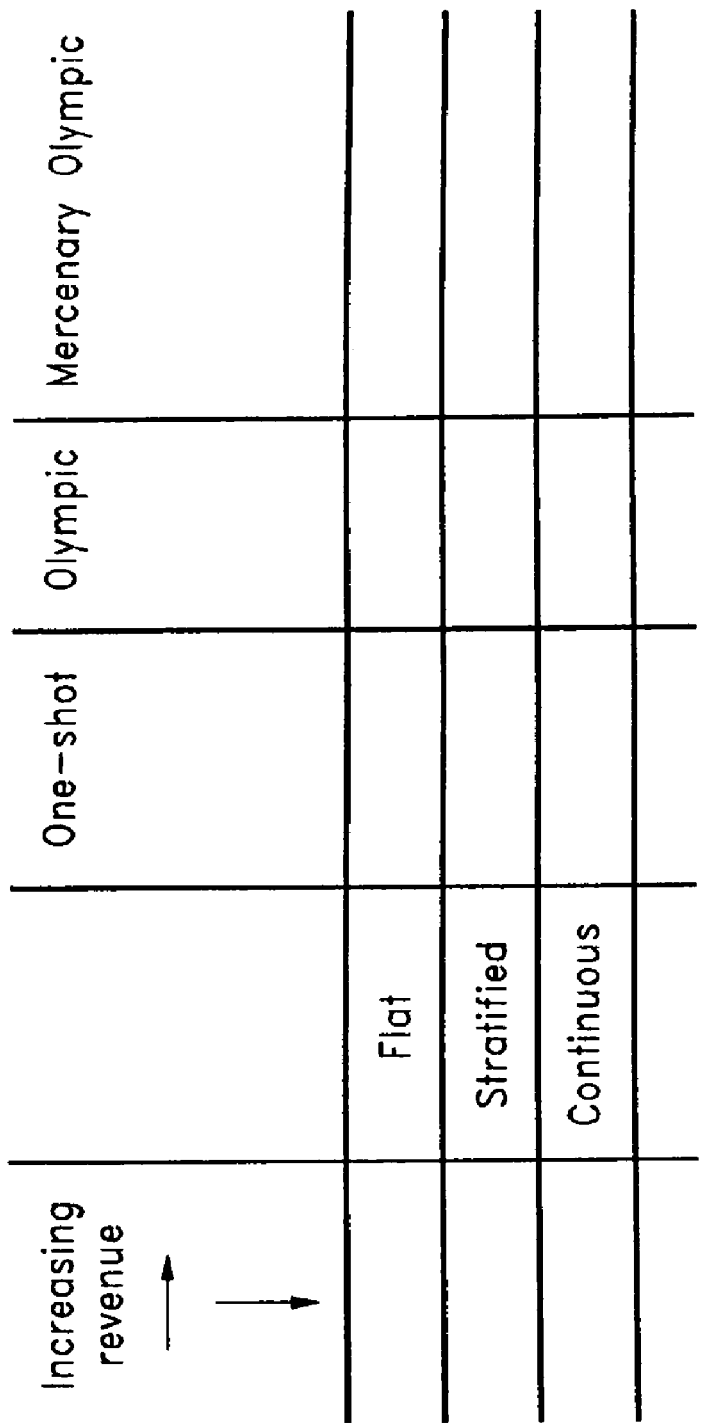
FIG. 7 illustrates an example table illustrating how revenues are affected using different pricing approaches.

With reference to FIG. 7, which illustrates the estimated revenue effect for different subcategories and variances, the Continuous variant of the Mercenary Olympic Scale-the-House approach may maximize revenue relative to the other approaches, although if users find it unfair for a given event, event-type, or all events, other approaches may be used. Thus, for example, in certain instances, the Flat variant of the One-shot approach may be selected.

B. Time-of-Sale

A time-of-sale approach adjusts prices in real time. In this category are three subcategories:

Price decay
Simultaneous boundary sellout
Market maker

1. Price Decay

With this approach, tickets are priced high and sold. At predetermined intervals, prices drop and sales continue, until a minimum price is reached or tickets sell out.

2. Simultaneous Boundary Sellout

This approach utilizes information about the number of potential buyers enqueued for an opportunity to buy tickets on the Web. Prices for all areas of the venue are rapidly adjusted to ensure the following outcome: All (or selected) areas sell out at the point where all customers have tried to buy tickets.

Optionally, a given ticket price can be based on an estimated ticket market value. For example, the ticket price can be determined based on consumers purchasing at a particular price with the understanding that consumers have knowledge of future pricing and the current best available seats (e.g., the best available seats in the venue as a whole or in a venue area specified by the potential buyer). The system optionally operates on one or more of the following understandings:

1) The standard face value of tickets is typically below free market price for high demand events.

2) Consumers have a preconceived notion of the approximate "true" or perceived value of tickets, and in general will not pay prices above this value.

3) In a dynamic environment, consumers have an incentive to pay near their preconceived value for seats that they are interested in as early as possible in order to purchase tickets in prime or preferred locations ahead of other consumers.

By way of illustration, an example embodiment can place tickets for an event or sections (e.g., including one or more seats, rows of seats, other groupings of seats) of an event up for sale at a particular price for a certain period of time. For example, a consumer can access a Web site hosted by the ticket system. The consumer can search for or request information regarding an event. The system can cause a user interface to be presented on one or more consumer terminals (e.g. via a Web page transmitted via the ticket system to a browser), via which the consumer(s) are informed of one or more of the current ticket price (e.g. for a given section or category of seat; or, for a general admission event, the current general admission ticket price), the time at which ticket prices will be lowered, and/or the current best available seats overall and/or within a specified section or sections.

By way of further example, the user interface can include the timing of only the next price reduction (e.g. "the next price reduction to $200 will take place on Apr. 1, 2005), or provide a schedule for price deductions (e.g. "the next price reduction to $200 will take place on Apr. 1, 2005, the following price reduction to $150 will take place on April 15, and the last price reduction to $90 will take place on April 30"). Consumers can then chose to purchase at the current price with the opportunity to acquire higher quality seats or wait until the price falls knowing that available seats at that time are likely to be of lower quality. The process is optionally repeated until the event (or a selected set of event seats) is sold-out or optionally, until the price has reached a predetermined minimum price (e.g., face value) threshold.

Figure 6:
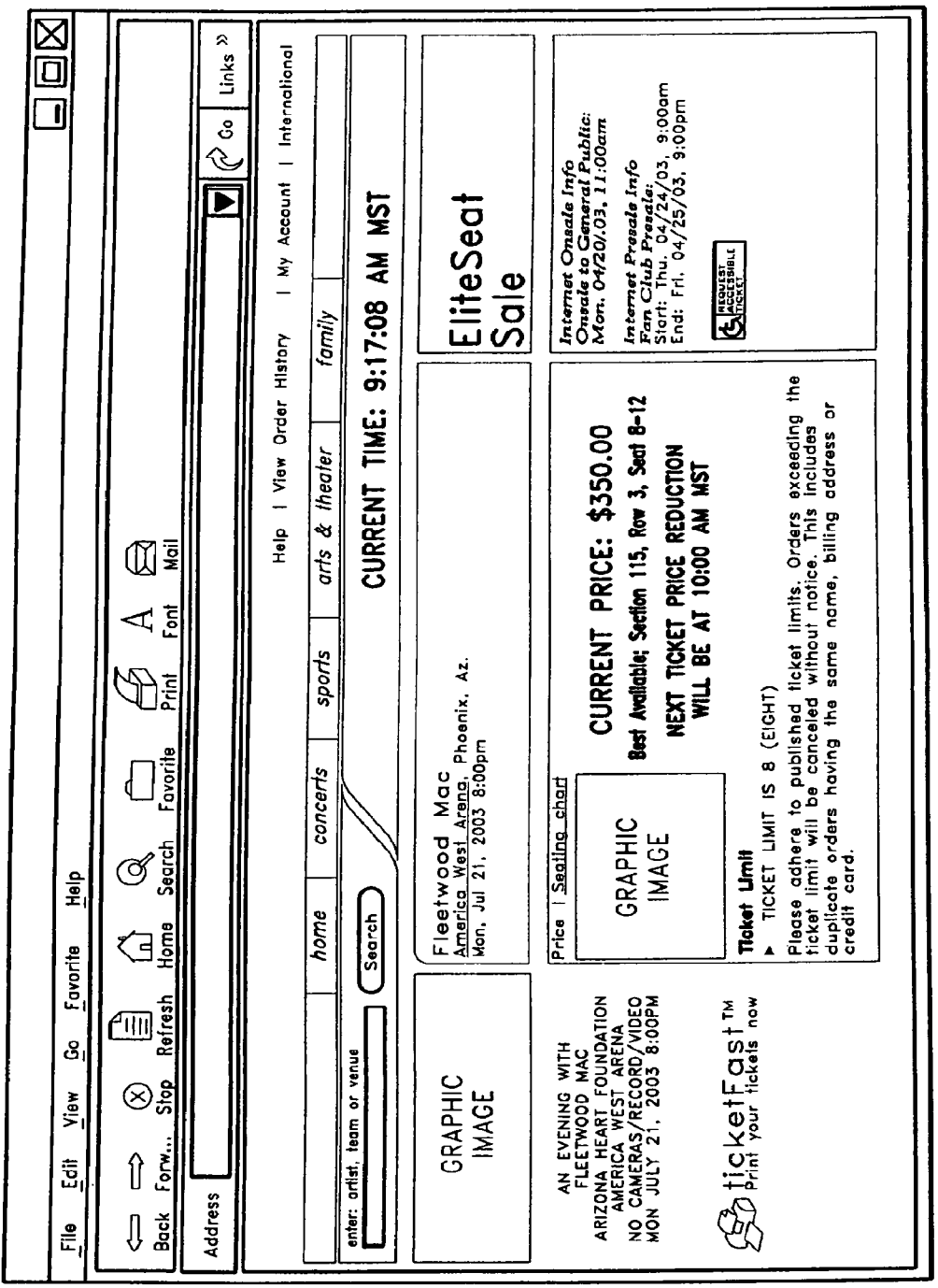
FIG. 6 illustrates an example user interface that includes information regarding declining prices.

FIG. 6 illustrates an example user interface. The example user interface lists the event name, the event date, the current best available seat(s), the current corresponding seat price, the timing of the next price reduction, the limit on the quantity of tickets a user can purchase for the event.

By way of example, the timing, rate and/or amount of price reduction can be based on one or more of the following:
1. how many sellable seats are in the venue
2. ticket sale history (e.g., ticket prices, ticket sale rate, etc.) for comparable events (e.g. events having the same artist as the current event)
3. the remaining time until the event
4. the rate of ticket sales for the event
5. the current and/or prior ticket requests Thus, an example pricing process enables a pre-selected number of seats to be sold starting at a pre-defined premium or relatively higher price determined by the venue, event artist/performer, and/or ticket system operator. Ticket prices can be reduced on a sliding scale in increments over an allotted time frame, thereby giving consumers the option to purchase tickets immediately or risk the wait, wherein the ticket price will be less, but the available tickets may be of lower quality. The ticket availability and pricing information presented to the consumer is provided in substantially real time, so that consumers will know what is currently available. In addition, variables within this process can optionally be adjusted in substantially real-time with the changes being reflected substantially immediately. The ticket seller/ticket system operator can optionally charge a percentage base or flat fee, by way of example, for ticket sales.

Optionally, during a sale or auction, if there is a single (rather than two or more) unsold seat at the end of a row, or a single unsold seat with sold seats on either side, such single seats may have their prices decreased further and/faster than the price reductions for seats where there are two or more unsold contiguous seats.

Optionally, a ticket price (for one or more tickets) can be dynamically set using a software model that determines a "Market Value" based, in part, on feedback from consumers and facility staff regarding the relative value of seats within a venue.

FIG. 17 illustrates an example user interface used to obtain an estimated value of seats in various price levels compared to the seats in price level 1. The user interface includes a relative price guess matrix, wherein the size of the matrix may correspond to the number of price levels or seating areas. In the illustrated example, the matrix size is 5 by 5 corresponding to 5 price levels. The user enters numbers in the matrix (the "Guessed relative price level values"). These numbers are guesses or estimates of how good seats in a specific price level are relative to the seats in another price level. Based on the provided relative values, the program calculates an estimated value for seats in each price level relative to the seats in price level 1 which are automatically inserted into the estimated relative values matrix.

The elements of the illustrated matrix are numbers representing a relationship between different price levels. The elements representing relationships between the same price level (elements in positions (1,1), (2,2), (3,3), (4,4) and (5,5), in this example) will have a value of one. In this example, when a user enters a value in cell (1,4) representing the value of price level one relative to price level 4, using that value, n, the program assigns a number to the cell (4,1), value of price level 4 compared to price level 1 which is the reciprocal of the value entered in the cell (1,4), 1/n.

With respect to the following scenario, the information entered in the matrix so far indicates: Price Level (PL) 1 is twice as good as PL 2, three times better then PL 3, four times better than PL 4, and 5 times better than PL 5. The second column indicates that PL 2 is twice as good as PL3, which is not completely consistent with the first column's values. According to the first column, PL 2 is one and a half times better than PL 3. The system can automatically adjust the relative values so that they correspond (e.g., by using an average value, a geometric mean, a logistic regression, (take log of ratios, then perform regression and exponentiate the results), or other value) or provides a discrepancy notification to the user so that the user can adjust one or more values. For example, the ratio of PL3 to PL2 can be automatically adjusted from 0.5 to 0.46. The adjusted ratio values are automatically inserted into the estimated relative values matrix.

|  | PL1 | PL2 | PL3 | PL4 | PL5 |
| --- | --- | --- | --- | --- | --- |
| PL1 |  |  |  |  |  |
| PL2 | 2 |  |  |  |  |
| PL3 | 3 | 2 |  |  |  |
| PL4 | 4 |  |  |  |  |
| PL5 | 5 |  |  |  |  |

Instead of, or in addition to using the matrix cells, optionally a user can enter estimates using the fields in the text "I consider the value of seats in price level _____ to be _____ times better than those in price level _____", towards the bottom of the user interface. Advantageously, this is particularly helpful for users that find using the matrix to enter guesses conceptually difficult as the text that accompanies the fields clearly state what the numbers being entered represent. Once the user enters the desired numbers, the user can click the "add guess" control, and the user defined value is automatically inserted into the appropriate matrix field.

Clicking the "Initialize Guesses" control button initializes the cells to a default value, such as zero. Clicking the "Transfer from Prices to Guesses" control causes the current seat ticket prices to be converted into ratios (e.g., (current seat ticket price for PL1)/(current seat ticket price for PL1)) and then displayed in association with the user relative price guesses so the user can compare the two ratios, and adjust the user guesses and/or ticket prices as appropriate. Clicking the Transfer from Estimates to Guesses button takes the estimates generated by the system (e.g., the adjusted rations as discussed above) and substitute them into the Guesses matrix.

It is often difficult to establish the "fair market" price of seats in advance of a sale. For example, the fair market value for a ticket to a baseball game may vary on the current performance of one or both teams in the game. Similarly, the fair market price of seats to a concert may suddenly increase based on a television appearance by the performed, or a record release. Further, facility staff members often have difficulty setting appropriate prices breaks within a venue so as to maximize or adequately enhance revenues. However, in order to better price seat tickets, consumers can provide feedback regarding the relative value of seats based on location, where the feedback can be used to at least partly set ticket prices.

In an example embodiment, a ticket pricing process uses feedback from a pre-sale with or without dynamic pricing to establish the general pricing for use during a sale to the general public. For example, a sample embodiment might display (e.g. via a Web page transmitted from the ticket system to a consumer computer web browser) a survey to consumers requesting input regarding the relative value of seats in various areas of a venue.

By way of illustration, consumers are optionally asked to provide the relative value for first row seats vs. third row seats, or side seats as compared to center seats. The relative value can be specified one or more ways. For example, consumers may be asked to rank one row (or section) as compared to another row (or section), or the user may asked, that if tickets for a certain row (or section) have a first price, how much more would the consumers pay for a different, better row (or section). Consumers can also be asked how much they would pay for a certain row (or section) and how much consumers would pay for a specified better row (or section). The survey results can be electronically received by the ticket system, and the results can be stored in a survey database, and later retrieved for analysis and ticket price and/or minimum bid setting. Survey questions can optionally be varied, so that certain consumers receive different survey questions that certain other consumers. The survey questions can be transmitted to users prior to the pre-sale, during the pre-sale, prior to the sale to the general public, during the sale to the general public, and after all ticket sales for the event have concluded.

After an accumulation of such relative value statistics based on consumer feedback, a software model for the relative pricing structure of a venue and/or event is established. Using one or more dynamic pricing methods, a subset, which is optionally a relatively small subset (e.g., 10% or 20% of seats) so as to provide the opportunity to gain ticket sales information and better determine the value of tickets not yet sold, of a venue's available inventory is put on sale to consumers belonging to all or a selected subset of the population. Thus, the surveys can be used to set initial ticket prices and initial minimum bids, and to dynamically set ticket prices during an event ticket sale and minimum bids in an auction.

In an auction, the "average" ticket price can be calculated one or more ways. The average ticket price can be used to set future minimum bids. By way of example and not limitation, one or more of the following calculations can be used:
- pure average (total per seat dollar value of all bids/number of bidders/seats);
- pure average but throw away top and bottom x % (to avoid a misleading skew) and/or throw away unreliable or untrustworthy sources;
- utilizing the standard deviation or curve of original bid values;
- breaking up seats into quality based blocks and performing the average calculation within each block rather than across all seats in the auction.

Optionally, the tickets are auctioned of to the subset population. Optionally, auction winners are selected by allocating seats according to the bid amount (e.g., the highest bid is assigned to a best seat, a next highest bid is assigned to a next best seat, etc., until there are no more seats left). Optionally, the auction winners can pay what they bid, or in another embodiment, the price the auction winners pay is not what they bid but rather a calculated "average" (or other statistical measurement) across their bid values. Thus, winning bidders within a given section or block of seats (or, optionally the venue as a whole) will pay the same price, even if they bid different amounts. In addition to the ticket price for purchased tickets, winning bidders are optionally charged delivery, service, and/or other fees.

The selected subset members optionally have a common characteristic, for example fan club members or consumers that purchase a certain number (e.g. 5-10) tickets a year. The average or median (or other statistical measurement) price paid for seats can then be used as a fixed point around which (e.g., within a certain range, wherein the range can be 0, or can extend above and/or below the average) the remaining inventory can be priced to other consumers.

Optionally, a ticket price (for one or more tickets) can be dynamically set using a software model that determines a "Market Value" based on consumer offers to receive presale priority. An example embodiment of the system operates on one or more of the following principles:

1) The standard face value of tickets (e.g., set by the venue and/or the artist) is below free market price for some or all of the available seats for high demand events. For example, the face value of a front row ticket for a very popular artist is often far below the market value, and hence such a ticket is often resold for many times its face value.

2) In the ticket sales environment, consumers have an incentive to pay near "market value" for seats as early as possible in order to purchase tickets in prime or preferred locations ahead of other consumers.

3) income for an event can be enhanced by allowing customers, who attribute the highest or relatively higher value for seats, to be given priority access to the event inventory.

By way example, a sample embodiment optionally accepts offers from the public for prime venue seats prior to the actual public sale period. Associated with a valid offer is a count of tickets requested. The presale price for the event is chosen so as to enhance or maximize the revenue for seats sold assuming that if the presale price is below a certain offer, the associated consumer will likely purchase seats.

Optionally, consumers offering a premium, such as offering to pay a certain predetermined percentage or greater of the chosen pre-sale price (or, optionally a certain dollar value) will be given passwords or other access device (e.g., a link) allowing access to the inventory before the general public. Optionally, this premium will be charged to the offering consumer whether or not the consumer later elects to buy a ticket during the presale discussed below. Optionally, instead, the premium may be refunded or not charged if the consumer does not elect to buy a ticket. Optionally, different fee amounts are charged for the ability to participate in corresponding different presale events (e.g., a presale for a fixed price sale or participation in a presale auction). For example, a consumer may be charged a relatively higher fee to participate in the first day of a presale, and a relatively lower fee to participate in days 2-7 of the presale. Optionally, the system determines how many seats are to be made available during the presale based at least in part on the number of users that paid a presale participation fee or other premium.

Consumers using these passwords (or other access device) can then optionally compete amongst themselves for inventory as would happen during a public sale. For example, the tickets may optionally be sold based in part on a first come first served basis. Via a purchase request Web page transmitted by the ticket system, an eligible consumer requests seats at the presale price. The consumer is provided with the best available seats meeting the consumer's criteria, and is given the opportunity to accept (e.g. purchase) or reject those seats. After completion of the presale (e.g., after a predetermined presale period), the remaining event inventory, or a selected portion thereof, is placed on sale for the general public.

Figure 2:
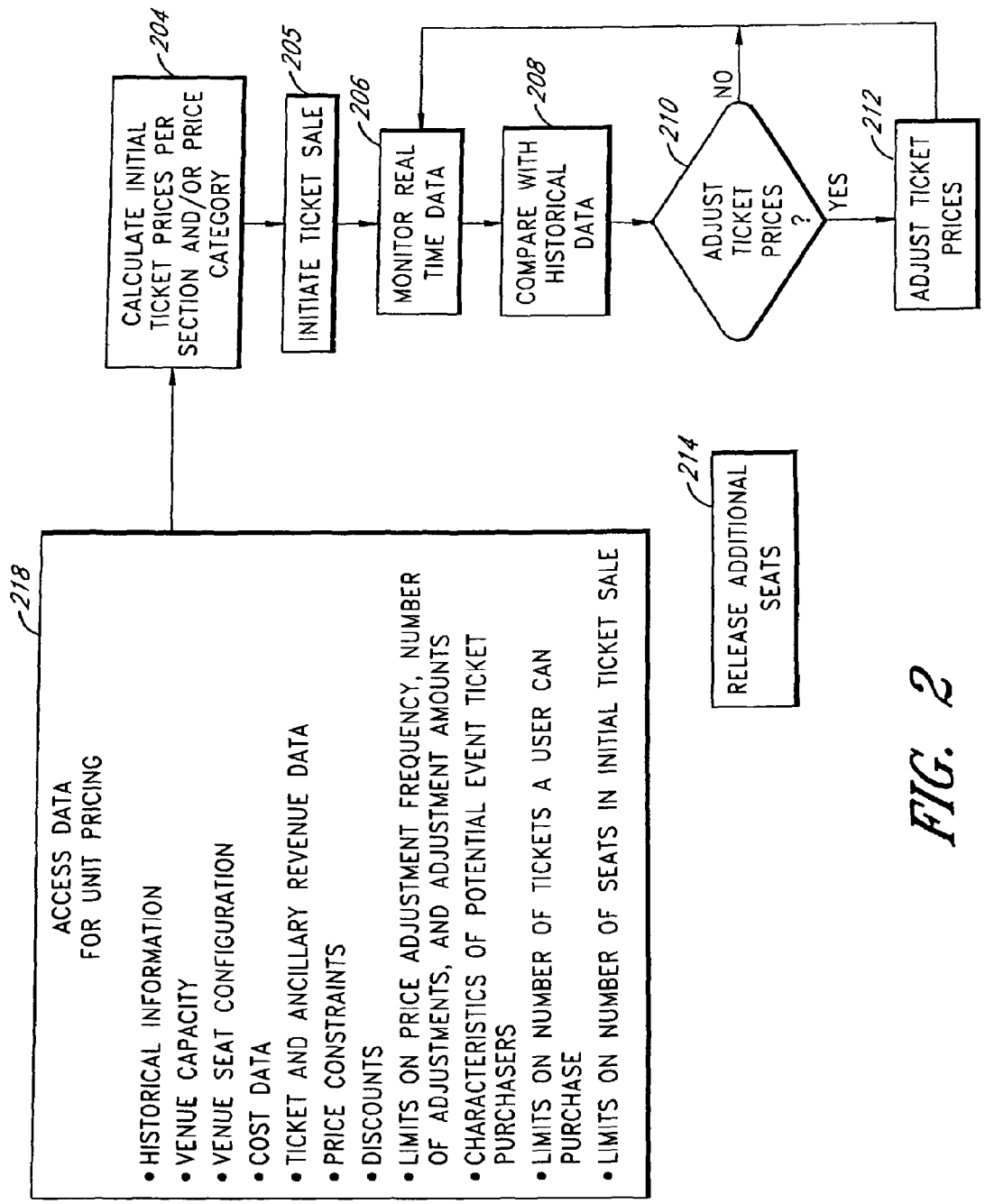
FIG. 2 illustrates a first example process.

Several example processes will now be discussed with reference to the figures. FIG. 2 illustrates an example process that sets Unit (e.g., ticket) prices. Prior to an event ticket sale beginning, initial ticket prices are set. In this example, at state 202, data that will be used for setting initial ticket prices is read from a database or is otherwise received from a data source by a computer system, such as the system 104 discussed above. For example, historical data and ticket sales set-up data can be used to set ticket prices. In this example, some or all of the following data is accessed:

Historical sales data (e.g., rate of ticket sales per price band/seating area for one or more historical events, total ticket sales per price band/seating area for one or more historical events, ancillary revenues for one or more historical events, ratio of ancillary revenues to tickets sold for one or more historical events, what ticket brokers have sold tickets for similar events);

Venue capacity (e.g., total seating capacity for event for which tickets are being priced);

Venue seat configuration (e.g., the number and types of seating areas, the capacity of different seating areas, seat rankings, seating area rankings, etc.);

Cost data;

Price constraints (e.g., maximum ticket price for each seating area and/or the venue as a whole, minimum ticket price for each seating area and/or the venue as a whole);

Ticket discounts being offered to certain groups or types of potential purchasers;

Discounts being offered to certain groups or types of potential purchasers for ancillary items (concessions, merchandise, parking);

Limits on price adjustment frequency (e.g., once every 24 hours, twice every seven days, three times a month, etc.);

Limits on the total number of price adjustments per event (e.g., three times, four times, etc.);

Limits on the price decrease per price adjustment (e.g., $5, $7, or a percentage of the initial ticket price);

Limits on the total price decrease (e.g., $15, $21, or a percentage of the initial ticket price);

Limits on the price increase per price adjustment (e.g., $4, $6, or a percentage of the initial ticket price);

Limits on the total price increase (e.g., $12, $18, or a percentage of the initial ticket price);

Limits on the maximum number of tickets a user can purchase per event or for multiple related events;

Limits on the minimum number of tickets a user can purchase;

Limits on the multiple of tickets a user can purchase (e.g., multiples of two);

Characteristics of potential ticket purchaser population (e.g., population size of relevant ticket buying population, motivation for attending event, income, predicted or estimated patience, the ticket price that would cause an estimated percentage of the relevant population not to buy a ticket, and the ticket price that would cause an estimated percentage of the relevant population to buy a ticket);

Limits on the minimum and/or maximum number of seats and/or specified venue areas for which tickets are to be offered in the initial ticket offering (e.g., a Seller may specify that at least half the seats and no more than 66% of the seats are to be offered during the initial ticket sale);

Designation of which seats are to be offered during the initial ticket sale.

Some or all of the above sales setup instructions (e.g., the limits referenced above, the seats that are to be offered during the initial ticket sale) may have been set by a Seller, performer, and/or venue operator. Not all of the above data needs to be specified or used in setting ticket prices.

At state 204, some or all of the data accessed at state 202 is entered (e.g., automatically by the computer system or manually by an operator) into one or more pricing models/processes (e.g., software models/processes), such as those discussed herein, which utilize some or all of the data to set initial ticket prices. If the tickets are for a general admission event (e.g., where ticket holders are not assigned a reserved seat), a single initial price may be set for all tickets being initially sold. If the event includes reserved seating, then different (or the same) initial ticket prices may be set for seats in different venue areas or price categories/bands.

At state 205, the tickets for seats designated to be released during the initial ticket sale are offered for sale (e.g., via online Website, physical ticket outlets, phones, kiosks, box-office, etc.) to the public or a select subset thereof.

At state 206, real time ticket sales data is monitored. The real time data can include some or all of the following: the number of purchasers in one or more queues (e.g., software request queues for users in an online ticket selection or purchase process, queues for phone users attempting to select or purchase tickets, etc.); a current or recent rate of ticket sales for the event an/or related events (e.g., optionally, broken down into rate of sales per venue seating area or price band); total ticket sales to date for event and/or related events (e.g., optionally, broken down into total tickets sales per venue seating area or price band); remaining capacity for the event (e.g., for the venue as a whole and/or for specific seating areas); demographic information regarding purchasers of event tickets; and demographic information regarding users that began, but abandoned a ticket selection/purchase process.

For example, some or all of the demographic information (e.g., age, gender, household income, ticket purchase frequency, event preferences, etc.) can be retrieved from a user's account record using a user identifier (e.g., a password, userID, token, cookie data, etc.) provided by the user (e.g., manually or automatically by the user's terminal) before or during the ticket selection or purchase processes. In addition, the user's Web page navigation information (accessed via a cookie or otherwise) can also be accessed and monitored so as determine the level of users' interest in an event (e.g., how many times a user visited a Web site or URL associated with the event or the event performer), which information can also be used to set and adjust prices. In addition, if the ticket sale allows users to specify the ticket price at which they would purchase a specified quantity of tickets, then such information can also be accessed.

Optionally, users accessing a ticketing website (e.g., to research or purchase an event ticket) may be surveyed via an online survey or via phone that asks the user at what price the user would purchase a ticket or a number of tickets for a given event or event type. The user can also be surveyed as to as how the ticket price would affect the quantity of tickets the user is willing to purchase (e.g., if the ticket price were $25 dollars/ticket the user would be willing to buy four tickets, and if the ticket price were $35 dollars/ticket the user would be willing to buy two tickets). Optionally, the survey questions are provided only to selected users, such as users that have entered into a seat selection process for a selected event, users that have actually purchased tickets for a selected event, or users that began, but abandoned a seat selection and/or ticket purchase process.

At state 208, some or all of the data collected at state 206 is compared to corresponding historical data, such as that accessed at state 202. At state 210, based on some or all of the data obtained at states 202 and 206, and/or on the comparison made at state 208, a determination is made as whether ticket prices for one or more seating areas should be adjusted, and if so, by how much. For example, a ticket price adjustment can be made to enhance total revenues (e.g., ticket sale and ancillary revenues) while not exceeding certain limits, such as limits on price adjustment frequency, limits on the total number of price adjustments, limits on the price decrease per price adjustment, limits on the total price decrease, limits on the price increase per price adjustment, and/or limits on the total price increase.

In certain ticket sales, the foregoing limits may not be applicable or considered. For example, if the rules for an event ticket sale preclude increasing ticket prices for a given quality of seat over time, then certain limits related to increasing ticket prices may not be relevant as the ticket prices will not be increased. The price adjustment determination can be made using one or more of the models and processes discussed herein. Optionally, for a given event, certain ticket prices may be adjusted upwards (e.g., for a relatively more in demand venue seat area or quality), and other ticket prices may be adjusted downward (e.g., for a relatively less in demand venue seat area or quality).

Optionally, the scheduling of price adjustments can be specified by the Seller and optionally, the public, or a specified subset thereof (e.g., members of a fan club, registered users of a ticketing service, users specifically placing a request) can be notified when such price reductions are going to take place, as similarly discussed below.

If a determination is made that tickets prices are to be adjusted (e.g., for one or more venue seating areas or quality of seats), the process proceeds to state 212, and corresponding ticket prices are appropriately adjusted up or down. Optionally, a notification can be provided before an event ticket sale takes place (if the scheduling of price adjustments has already been made) or during the ticket sale (if the scheduling is done dynamically or is according to a predetermined schedule). A notification may be provided a predetermined amount of time (e.g., one week, one day, one hour) prior to a given price adjustment.

The price adjustment notifications can be provided via a Web page, newspaper advertisements, radio advertisements, television advertisements, mailers, or otherwise. Optionally, notifications can be transmitted to users that requested to be provided with a notification when there is a downward adjustment in ticket prices. Optionally, a user may specify (e.g., via a Web page form) if a notification is to be provided to the user if any price drop occurs, if a price drop occurs in a specific seating area (or areas), or if the ticket price falls to or below a user specified level. The user can optionally specify if the notification is to be provided an email, via an SMS message, an instant messaging message, via a phone call, and/or via other communication techniques. If, at state 210, a determination is made that price adjustments are not to be made at this time, the process proceeds back to state 206.

At state 214, periodically, in response to ticket sales patterns, based on the time until the event takes place, and/or based on a manual instruction provided by an operator, a determination is made as to whether tickets for additional seats are to be released for purchase. If tickets for additional seats are to be released for purchase, a determination is made as to which seats are being released. The seat release determination can be based on instructions manually provided by an operator at that time or previously, at a predetermined schedule (e.g., release specified additional seats on specified dates), or the release determination can be made by a seat release software module that takes into account some or all of the historical and real-time data discussed above, as well as seat release limits (e.g., limits on how many seat release offerings can be made for an event, if any).

If the event has taken place (or optionally is to take place within a predetermined time period, such as two hours), or if the limits discussed above prevent further price adjustments, then the process illustrated in FIG. 2 can end without further price adjustments and/or seat releases. Optionally, when tickets are sold, the system can assign seats so as to enhance seat packing, as similarly described above, and thereby enhance revenues.

Figure 3:
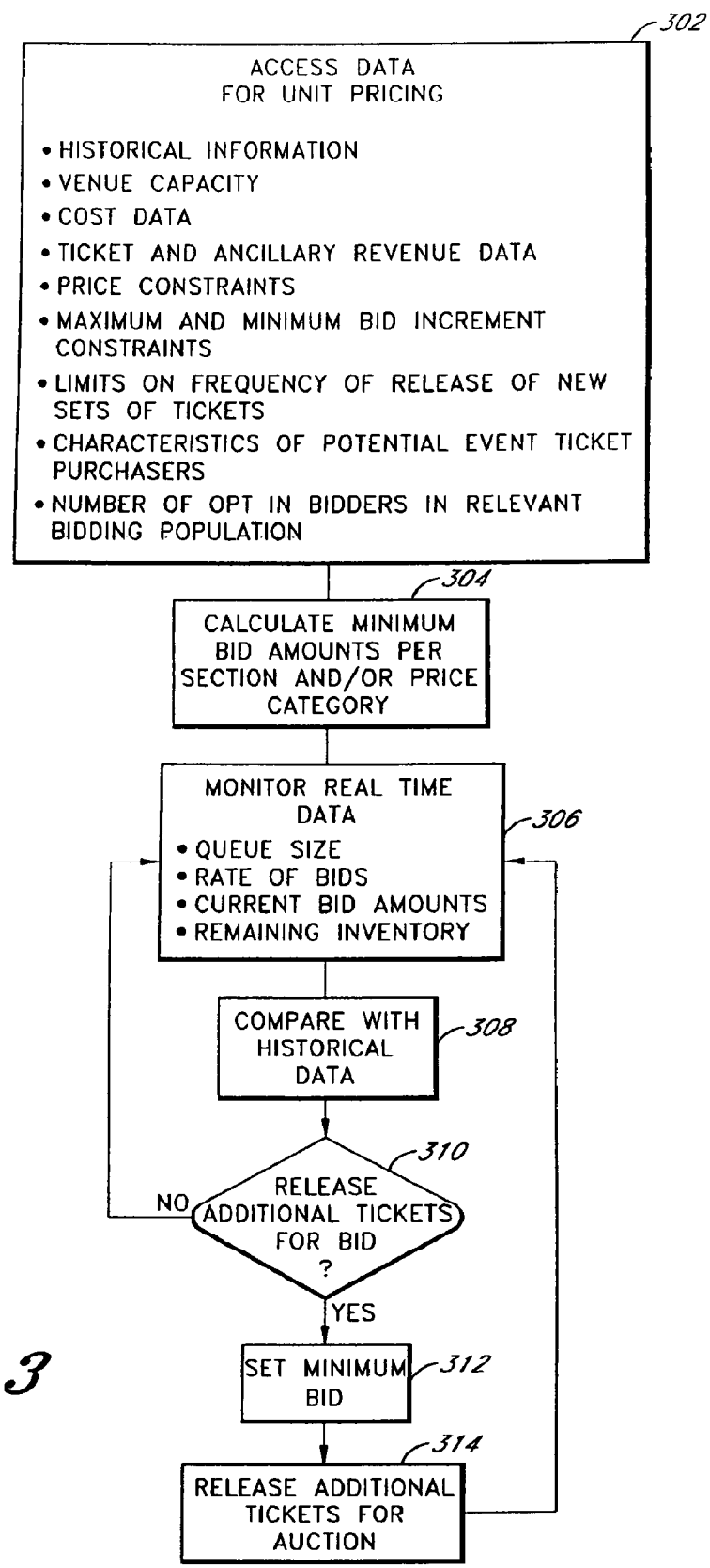
FIG. 3 illustrates a second example process.

FIG. 3 illustrates an example process that sets Unit (e.g., ticket) minimum bids in an auction. Prior to an event ticket auction beginning, initial minimum bids are set for one or more categories of tickets, such as tickets for seats in different venue areas. In this example, at state 302 data that will be used for setting initial minimum bids is read from a database or is otherwise received from a data source by a computer system, such as the system 104 discussed above. In this example, some or all of the following data is accessed:

Historical sales data (e.g., total ticket sales per seating area for one or more historical auction and/or non-auction event ticket sales, rate of ticket bids per price band/seating area for one or more historical events, total ticket sales per price band/area for one or more historical events, total number of bids, what ticket brokers have sold tickets for similar events, etc.);

Venue capacity (e.g., total seating capacity for event for which tickets are being auctioned);

Venue seat configuration (e.g., the number and types of seating areas, the capacity of different seating areas, seat rankings, seating area rankings, etc.);

Cost data;

Price constraints (e.g., maximum ticket price/allowable bid for each seating area and/or the venue as a whole, minimum initial minimum bids for each seating area and/or the venue as a whole, reserve prices, maximum initial minimum bids for each seating area and/or the venue as a whole);

Limits on the minimum bid increment;

Limits on the maximum bid increment;

Limits on the maximum number of tickets a user can bid on;

Limits on the minimum number of tickets a user can bid on;

Limits on the multiple of tickets a user can bid on (e.g., multiples of two);

Characteristics of potential ticket bidder population (e.g., population size of relevant ticket buying population, motivation for attending event, income, predicted or estimated patience, the minimum bid that would cause an estimated percentage of the relevant population not to bid on a ticket, and the minimum bid that would cause an estimated percentage of the relevant population bid on a ticket);

Limits on the minimum and/or maximum number of seats and/or specified venue areas for which tickets are to be offered in the initial ticket auction offering (e.g., a Seller may specify that at least half the seats and no more than 66% of the seats are to be offered during the initial ticket auction);

Designation of which seats are to be offered during the initial ticket auction;

The number or percentage of relevant potential bidders who have in the past opted-in for previous auctions (wherein a bidder has agreed to have their bid automatically increased by a certain amount and/or up to a maximum amount in order to attempt to ensure that the bidder will be successful in purchasing a ticket in a given auction).

Some or all of the auction set-up instructions discussed above (e.g., some of the aforementioned limits) may have been set by a Seller, performer, and/or venue operator.

At state 304, some or all of the data accessed at state 302 is entered (e.g., automatically by the computer system or manually by an operator) into one or more pricing models/processes (e.g., software models/processes), such as those discussed herein, which utilize some or all of the data to set initial ticket minimum bids. If the tickets are for a general admission event (e.g., where ticket holders are not assigned a reserved seat), a single initial minimum bid may be set for all tickets being initially auctioned. If the event includes reserved seating, then different (or the same) initial minimum bid may be set for seats in different venue areas or price categories/bands.

At state 306, the tickets for seats that are designated to be released during the initial ticket auction are offered for auction (e.g., via online Website, phones, kiosks, etc.) to the public or a select subset thereof. Real time ticket auction and/or sale data (e.g., for completed auction sales) is monitored.

The real time data can include some or all of the following: the number of active bidders; a current or recent rate of ticket bids (e.g., optionally, broken down into rate of bids per venue seating area or seat quality category); total ticket bids and/or sales to date (e.g., optionally, broken down into total tickets bids or sales per venue seating area or seat quality category); current high bid and lowest winning bid per seating area or seat quality category; remaining capacity (e.g., for the venue as a whole and/or for specific seating areas, expressed in absolute numbers and/or as a percentage of total capacity); demographic information regarding bidders or purchasers of event tickets; and demographic information regarding users that bid on, but did match higher bids for a ticket.

For example, some or all of the demographic information (e.g., age, gender, household income, ticket purchase frequency, event preferences, etc.) can be retrieved from a user's account record using a user identifier (e.g., a password, userID, token, cookie data, etc.) provided by the user (e.g., manually or automatically by the user's terminal) before or during the ticket selection or purchase processes. In addition, the user's Web page navigation information (accessed via a cookie or otherwise) can also be accessed and monitored as similarly discussed above. In addition, if the ticket auction allows users to specify the minimum ticket price at which they would submit a bid for one or more tickets, then such information can also be accessed.

Optionally, some or all of the substantially real-time data can be presented to users, such as bidders via a bid submission Web page or otherwise. Such information can enable bidders to make more informed decisions regarding when and how much to bid. For example, if there is little capacity left (e.g., less than 20%) and the bid rate is relatively high, the bidder may elect to submit a substantially higher bid than would be the case if the bidder was not informed regarding the remaining status and bid rate.

Optionally, the auction (for an event as a whole or for certain seats, such as certain premium seats) may be restricted to a certain category of people (e.g., members of one or more specified fan clubs, season ticket holders, holders of certain types of financial instruments, such as a credit card associated with a specified brand or issuer, frequent ticket buyers, etc.). By way of example, before user can submit a bid, the user may be asked to enter or otherwise provide a password, a userID, token, key, and/or biometric authentication (e.g., wherein the user's identity is verified via a fingerprint scan, a vein scan, a facial scan, a retina scan, a voice scan, or via other biometric reading). If the user is successfully authenticated than the user can submit a bid. If the user is not successfully authenticated, then the user is optionally prevented from submitting a bid, or the user is permitted to submit a bid, the bid is not considered and the user is so informed.

Optionally, a bidder can select (e.g., via a Web page) one or more subsets of seats or ticket-types for which a bid is to be considered. For example, the bidder can specify that a bid is only for a front row seat, only for an orchestra seat, or only for an orchestra or center mezzanine seat. Once the bidder submits a bid, the bid is automatically inspected to determine whether the bid meets the applicable bidding requirements (if any). If the bid does not meet such applicable bidding requirements the bidder is optionally so informed. Optionally, a non-compliant bid is not considered with respect to determining winning bids.

At state 308, some or all of the data collected at state 306 is compared to corresponding historical data, such as that accessed at state 302. At state 310, based on some or all of the data obtained at states 302 and 306, and/or on the comparison made at state 308, a determination is made as whether additional tickets should be released for bid. For example, the determination can be made periodically, in response to ticket sales patterns, based on the time until the event takes place, and/or based on a manual instruction provided by an operator. Optionally, a Seller can specify the schedule for releasing seat tickets.

If tickets for additional seats are to be released for auction, a determination is made as to which seats are being released. The seat release determination can be based on instructions manually provided by an operator or specified by a Seller, or can be made by a seat release software module that takes into account some or all of the historical and real-time data discussed above, as well as seat release limits (e.g., limits on how many additional seat release offerings can be made for an event, if any).

At state 312, new minimum bids, which can be higher or lower than those for comparable seats already released for auction, are calculated or accessed from memory for the tickets that are to be released. For example, a minimum bid adjustment can be made to enhance total revenues (e.g., ticket sales and ancillary revenues) while not exceeding certain limits, such as limits the minimum permissible minimum bid or limits on the highest permissible minimum bid. At state

314, the additional seat tickets are released for auction with the corresponding minimum bids specified. The process then proceeds to state 306. If, at state 310, a determination is that additional tickets are not to be released for bid at the current time, the process proceeds to state 306.

Optionally, a user may specify (e.g., via a Web page form) if a notification is to be provided to the user if a minimum bid is at or lower then a certain level, or when a minimum winning bid reaches a certain level for a specific seating area or areas (e.g., a certain dollar amount or when it exceeds the user's current bid). The user can optionally specify if the notification is to be provided an email, an SMS message, an instant messaging message, via a phone call, and/or via other communication techniques. If the event has taken place (or optionally is to take place within a predetermined time period, such as two hours), or if the limits discussed above prevent additional price adjustments, then the process illustrated in FIG. 3 can end.

Once the auction has ended, the ticket assignments to bidders can be completed, and the ticket prices calculated. Optionally, the auction winners can pay what they bid, all winners can pay the lowest winning bid for a category of seats (uniform pricing), the auction winners can pay a calculated "average" (or other statistical measurement) across their bid values, as similarly discussed above.

If a reserve price (e.g., the minimum price that will be accepted for an item) was set for tickets for one or more seats or categories of seats, then a determination is made as to whether one or more bids for the corresponding tickets attained the reserve price. If, the reserve price has not been attained, then optionally, those tickets will not be sold to a bidder. Optionally, the reserve price may not have been disclosed to bidders prior to the auction close. Optionally, the reserve price may have been disclosed to bidders from the time the tickets were put up for auction. Bids are optionally accepted even if the reserve has not been attained.

FIGS. 8A-C illustrate example auction user interfaces. The user interfaces can be accessed from a ticketing web site via a web browser. The user interface illustrated in FIG. 8A, provides fields via which the user can specify for which ticket groups (e.g., seating areas) a user bid is to be considered in an event ticket auction. In this example, the first listed group is considered the most desirable listed ticket group, the second listed group is the second most desirable listed ticket group, etc.

The user call select an "all" control if the user wants the bid compete in all listed ticket groups. The user can instead manually select one or more of the listed ticket groups. In the illustrated example, the user has selected the third, fourth, fifth, and sixth row (Ticket Groups 1-4). The user can click on an arrow following the ticket group description and the system, via the user interface, will display additional information regarding the ticket group. For example, the description for the third row ticket group discloses that the group includes the chance to win reserved seats on the floor, row 3, seats 1-8. In addition, the user interface provides the current minimum bid for the corresponding ticket group. The user interface explains that in the example auction, the more ticket groups selected by the user the better the chances the user will win a ticket, thus encouraging the user select several ticket groups. The user interface also lists the performer name ("Bon Jovi"), the tour name "Have a Nice Day"), the venue ("Air Canada Centre, Toronto, ON), and the date and time of the event. The user interface also lists the auction start date/time, end date/time, and time remaining in the auction.

The example user interface illustrated in FIG. 8B lists the ticket groups previously selected by the user and the current minimum bid. A control (e.g., an "Add More Ticket Groups" link) is provided via which the user can add additional ticket groups (e.g., using a user interface similar to that illustrated in FIG. 8A.) A "Bid Per Ticket" field is provided via which the user can enter the amount the user is bidding for each ticket requested by the user via a "Ticket Quantity" field. In this example, the user is informed that bid increases are restricted to multiples of $10. An opt-in field is provided via which the user can request that a notification (e.g., an email notification) be provided to the user if the user's bid status changes (e.g., from winning to losing). The user can activate a "Submit" control to submit the bid.

FIG. 8C illustrates an example bid status user interface. The user interface displays the user's current bid per ticket, the ticket quantity designated by the user, and the total bid amount (e.g., the ticket quantity multiplied by the user's current bid per ticket), optionally, excluding service fees. The user interface displays the bid status (e.g., outbid, winning, etc.) for each of the ticket groups selected by the user. In the illustrated example, the user has bid $100 per ticket for a ticket quantity of four. The user has been outbid for the Ticket Group 1 (third row ticket group), where the current minimum bid is $110, and is winning in Ticket Group 2 (fourth row ticket group), where the current minimum bid is $80. Because, in this example auction, the user will be awarded tickets from the highest ranked ticket group for which the user's bid is a winning bid, optionally, the status of A control (e.g., an "Add More Ticket Groups" link) is provided via which the user can add additional ticket groups (e.g., using a user interface similar to that illustrated in FIG. 8A.).

The user is informed that the user needs to increase the user's bid to win seats in Ticket Group 1. A field ("Increase Bid Per Ticket to") is provided via which the user can specify a new bid. The user can click on a "Calculate" control and a new total bid amount will be calculated by the ticket system or on code executing on the user's computer, and new total bid amount will be displayed to the user. The user can then activate a "Submit" control to submit the new bid. Once the auction is concluded, the user will be awarded tickets from the most preferred ticket group (e.g., highest rank ticket group) for which the user's bid was a winning bid (if any).

Figure 9:
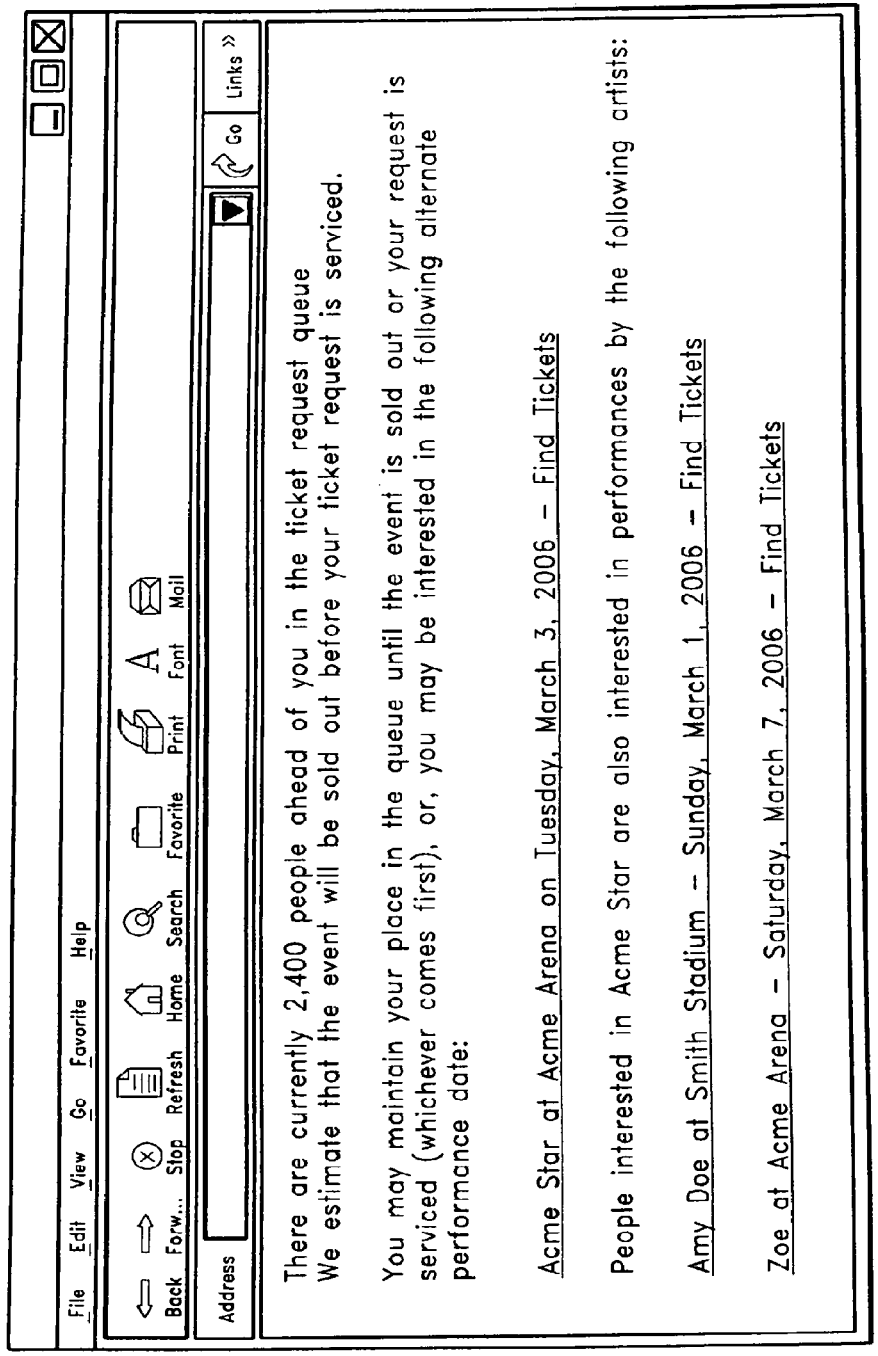
FIG. 9 illustrates an example queue status user interface.

FIG. 9 illustrates an example of a user interface that is optionally displayed to a user that has a ticket-related request pending in a queue (e.g., a queue that includes ticket requests being provided over a network, such as the Internet, from user terminals). In this example, the user is informed regarding how may ticket requests (or an estimate thereof) are ahead of the user in the queue. The user interface further informs that user regarding the likelihood that the user will be able to purchase tickets via the user's queued request. In this example, the user is informed that the system estimates that the event will be sold out before the user's request is serviced. The user is provided the option of maintaining the user's place in the queue, of selecting an alternate performance date, and selecting a performance by a different performer. The selection of performances by a different performer is optionally automatically made using predictive collaborative filtering, as similarly described above.

FIG. 10 illustrates an example user interface via which a user can specify which types of notifications the user wants to receive related to an event ticket sale. In the illustrated example, the user interface includes a performer name, an event venue name, and a date (and optionally a time) for an event associated with declining ticket prices, wherein ticket prices for at least one category of seats may be reduced prior to the event occurring. The user is provided with several notification options which the user can select by clicking on a click field or otherwise. In this example, the user can request that the user be provided with a notification when a ticket price drop occurs. Optionally, a field may be provided via which the user can request that a notification be provided when a price drop occurs for a specific ticket group or groups.

With reference to FIG. 10, a field is also provided via which the user can specify that a notification is to be transmitted to the user when a ticket price attains or falls below a price specified by the user. The user can further request that a notification be provided when additional seats are released for the event. Optionally, the user can specify that the seat release notification be provided only when seats are released in a specified venue area. Fields are provided via which the user can select one or more notification destinations or methods (e.g., email address, SMS address, Instant Messaging address, phone number, etc.).

FIG. 11 illustrates an example survey form which can be used to collect information from users (e.g., likely ticket purchasers or the general public) which can be used to price tickets. The survey can be presented in the form of a web page to a user in the process of searching for, selecting, or purchasing a ticket, via an email to a registered user of a ticketing service, or otherwise. The survey results can be stored in a survey database, as described above.

The example survey illustrated in FIG. 11 relates to a specific performer, but other embodiments can relate to one or more event types (e.g., for rock concerts generally, for sporting events, for plays, etc.) rather than a specific performer. In the illustrated example, the user is asked to submit how much the user would be willing to pay for tickets for seats of different quality in different venue areas. The user is also asked to provide an indication as to what the user thinks the relative value difference is for different seating areas. As previously discussed, this information can be used to set ticket prices for one or more events. Optionally, all or a portion of the survey results aggregated from a plurality of users can be presented to one or more potential ticket purchasers to provide additional valuation information.

FIG. 12 illustrates an example user interface that enables a user to elect to participate in an event presale upon payment of a presale participation fee. In the illustrated example, the user can elect to pay a first amount ($20) to participate in a first, relatively earlier phase of a presale (e.g., the first week of the presale), or the user can select to pay a relatively lower amount ($10) to participate in a relatively later phase of the presale (e.g., the second week). In this example, the presale participation fee is not refundable and optionally will be charged or billed to the customer (e.g., charged to the user's credit card) even before the presale takes place. Thus, the user is charged the presale participation fee even if the user does not later purchase a ticket. Optionally, the presale participation fee is instead refundable.

An example software system and associated user interfaces will now be described that can be used for forecasting ticket demand and for yield management. The forecasting/yield management software system (also referred to as the yield management system) utilizes historical data statistics from past events to forecast expected demand for future events. The yield management system can further be used to estimate and enhance or optimize expected cash flow for an event. Yield management can assist Sellers in establishing and/or adjusting pricing and capacity of an event, and optionally can aid in selecting and initiating promotions to increase ticket sales so as to enhance or maximize event income.

As will be described in greater detail herein, the software system performs demand forecasting by importing historical demand data and statistics. For example the system can import (e.g., from one or more generated reports) rates of ticket sales from the time tickets for an event are offered for sale until the sale is completed (e.g., up to the event data). By way of example, a report can include event characteristics, such as time of day, day of week, primary performer, and secondary performers. By way of further example, a report can include a season of events, such as the Dodgers' 2006 season, or a portion of a season. Optionally, multiple reports, or multiple seasons worth of events, can be imported.

Optionally, a user can set up a filter to locate and identify events that have characteristics that correspond to the filter. For example, the filter can be set up to locate historical events with characteristics similar to the event for which demand forecasting is being performed. The historical data and statistics associated with the located event or events can then be used to generate demand forecasts.

For example, a user can set up a filter to filter for evening Dodgers' games, where the team plays the Padres. Demand forecasts created under this filter estimate future evening Dodgers' games, where the Dodgers plays the Padres.

A user can further specify that certain events (e.g., a season of events) be weighted differently than other events when generating demand forecasts if certain facts indicate such weighting is appropriate. For example, if a team had a winning season in 2004, a losing season in 2005, and is expected to have a losing season in 2006, it may be appropriate to assign a higher weight to the 2005 data than to the 2004 in forecasting demand for the year 2006 season.

The yield management system can optionally enable a user to map/override event characteristic values. By way of example, a user can specify that certain event characteristics that differ are to be mapped so as to be considered the same for filtering purposes. For example, sales demand for a Padres game on Memorial Day (Monday), may be more similar to the sales demand for a weekend game (Saturday or Sunday) than a typical weekday game; in this scenario, a user may remap the event's "day of week" characteristic to a Saturday or Sunday. Thus, the system will identify historical events that took place on Saturdays and Sundays when generating for an event that is to take place on Monday (e.g., Memorial Day).

A user can also override for a default characteristic, which might include a Secondary Performer. By way of example, assume that the event being forecast is for a first team playing against a second team, where the second a team was popular for the previous two years ago but since then many of the better players have left the team. It may be appropriate to use historical event information for games involving the first team and a relatively unpopular third team rather than, or in addition to, historical event information for games including the first team and the second team.

After historical data and statistics have been imported, an event filter has been created, seasons have been weighed against each other, and characteristics have been overridden (where appropriate), the tool can generate a forecast of expected sales demand. For a future event whose characteristics correspond to those identifier via the filter, the demand forecast optionally includes an expected sales rate and accumulation of sales leading up to a performance date or end of sale date.

The forecast information can be used for tracking and planning purposes with respect to yield enhancement. For example, if actual sales are below forecasted sales, a promotion (e.g., a ticket price reduction, two tickets for the price of one, free parking, coupon for free or discounted concessions) may be instituted to increase sales.

In addition to, or instead of, the demand forecasting processed described above, the management system can forecast demand using interpolation to forecast sales/demand for an event based at least in part on data and statistics of an event with characteristics which are not very similar to those of the event that is being forecasted. Such interpolation can be advantageously used when certain characteristics of the event to be forecasted do not match characteristics from the set of imported events.

An example cash flow analysis and enhancement/process performed by the example system operates as follows. One or more individuals or groups provide an estimation of expected demand vs. ticket pricing. Demand vs. pricing estimates are optionally broken down by price level and/or seating area, and the system provides one or more methods to shape and scale demand vs. price curves. These estimates represent a "vote" for expected demand and price, and different estimates can be weighed relative to each other to produce a combined demand vs. price estimate.

For example, a Seller accounting department and the general manager for the event's market may provide demand vs. pricing estimates. If it is believed that the accounting department generally provides more accurate estimated than the general manager, the estimate provided by the accounting department is optionally weighted more heavily in a demand vs. price curve that is a result of the combination or aggregation of the account department estimate and the general manager estimate.

In the example below, the Box Office and the Accounting department provide estimates. If the Box Office' estimate is believed to be (e.g., based on prior estimate performance) twice as likely to be correct as the Accounting's estimate, then the Box Office can be assigned a weight of 2 and Accounting a weight of 1.

| Name | Weight | Type |
| --- | --- | --- |
| Accounting | 1 | User |
| Box Office | 2 | User |
| Test | 0 | User |

For example, the accounting department can estimate likely demand for:
$10 seats is 1000
$20 seats is 500,
$30 seats is 400 seats.
For example, the box office can estimate likely demand for:
$10 seats is 500
$20 seats is 250,
$30 seats is 200 seats.

The system can extrapolate values for demand at various prices using a likely or average demand curve, a pessimistic demand curve and/or an optimistic curve.

The estimates from the box office and accounting department are combined or merged using the defined data source weighting. Thus, if the accounting department estimates there will be a 1000 people that will come at $10. and the box office estimates there will be 2000 people, and the box office is assigned a weight double that of accounting, then the merged demand estimate is about 1600, and this merged estimate can be used in forecasting demand.

The system can generate a net cash flow estimate based on the estimated demand and on assumed pricing and capacity inputs. Thus, for example, pricing and capacity are optionally set on a per-price level basis.

The scheduling or itemization of expected cash flow will now be described. In an example embodiment, items in a schedule represent either a positive or a negative cash flow. Schedule items can be grouped into categories and optionally sub-categories, such as "Concessions", "Ticketing", or "Facilities". The cash flow amount associated with a given item is optionally specified as a fixed cost for the entire event, or is dependent upon pricing, demand, occupancy, revenue, and/or capacity information, optionally based on the historical event data obtained as described above. Cash flow amounts can optionally also be specified as a single value for all price levels, or can be split into separate values for different price levels. Several example cash flow schedule items are described below.

By way of example, negative cash flow can be associated with janitorial services. Janitorial services may be assigned to the "Facilities" category, and optionally a "janitorial" sub-category (another example "Facilities" subcategory can include event security). The negative cash flow association with janitorial services for an event can optionally be set up as a fixed charge for the entire event, or the janitorial services negative cash flow can be dependent upon the number of occupants (e.g., number of seats to clean).

By way of example, positive cash flow can be associated with ticketing surcharges. Surcharges could be assigned to a "Ticketing" category, and in particular, to a "surcharge" sub-category. Surcharge amounts, expressed as a percentage, can be dependent upon expected ticketing revenue, such as those determined using historical event data, as described above. By way of example, if a first price level has a higher surcharge than a second price level, a per price-level split of surcharges can be provided.

In addition, the system can perform "what-if" analyses and optimizations. For example, a schedule of cash flow items can be filtered to only display items in a single category or sub-category, or in two or more specified categories or sub-categories. In may be desirable to limit the analysis to a single category or sub-category to support a contract negotiations, for example, where ticket surcharge information is relevant, but costs for janitorial services are not. Selecting a category causes a cash flow schedule, such as that illustrated in FIG. 23, to limit the display to items and resulting cash flows in the selected category (and its sub-categories, if there are sub-categories). For example, selecting a 'Facilities' category, would cause the cash flow schedule to restrict the display to items in the 'Facilities' category, and corresponding subcategories (e.g., 'event security' and 'janitorial' sub-categories).

For a given cash flow schedule, ticket pricing can be optimized to maximize or enhance net cash flow. As part of what-if analyses, optionally ticket pricing can also be set manually. In addition, seating capacities can be shifted from one price level to another price level as part of the analysis and yield enhancement.

Optionally, selected demand estimates can be excluded from cash flow estimates. In terms of resulting expected cash flow, this type of analysis highlights the differences between several demand estimates.

While preserving the same overall shape, demand vs. pricing curves can be scaled in order to demonstrate the sensitivity of expected cash flow to expected demand.

Figure 13:
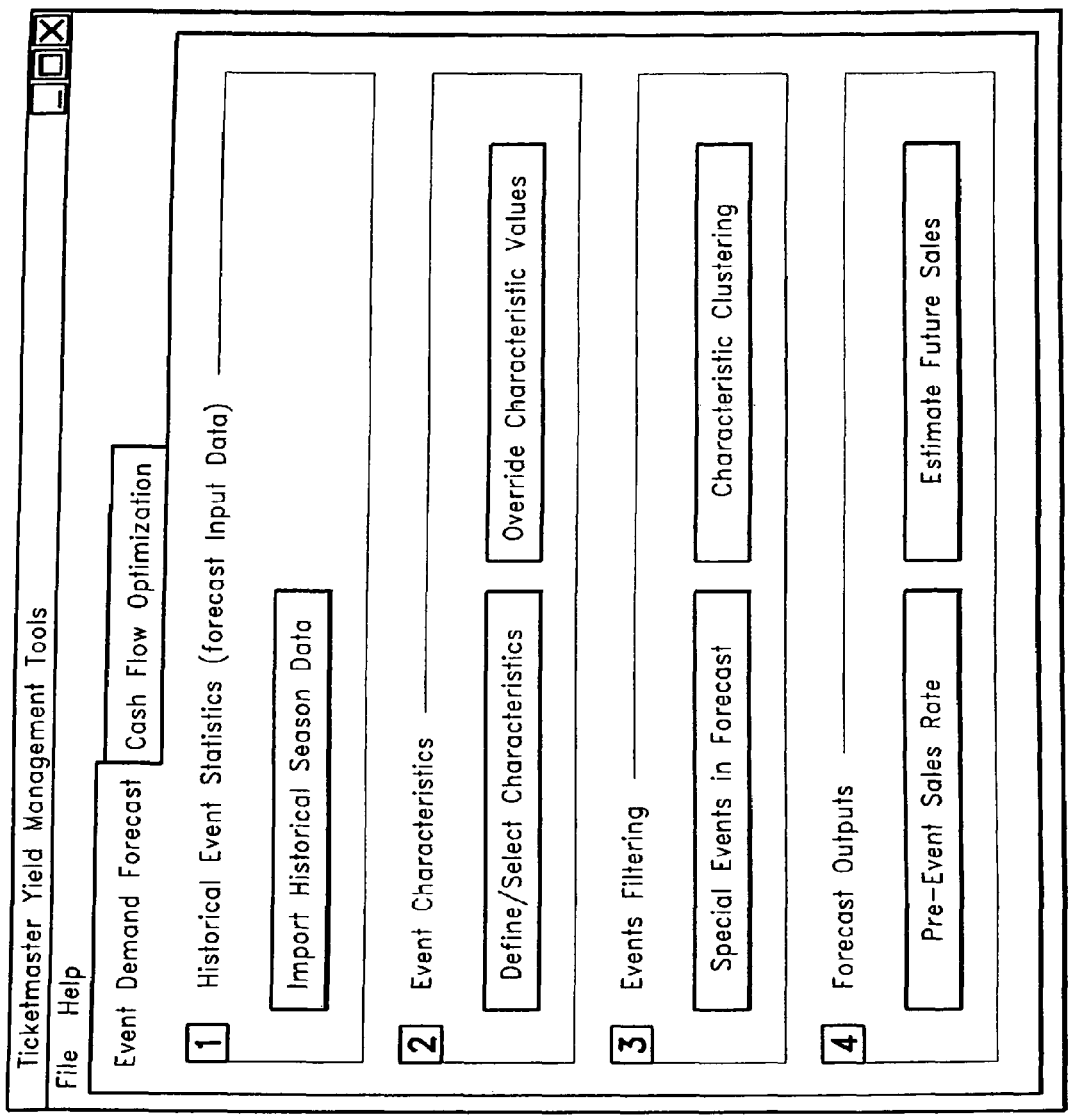
FIG. 13 illustrates an example yield management system event demand forecast user interface.

FIG. 13 illustrates an example yield management system event demand forecast user interface. In this example, the user interface is divided into four parts so as to help guide the user though the four example states of a yield forecast process. In this example, the user begins at state 1 and proceeds through state 4.

In particular, with respect to state 1, accessing historical event statistics and data, the user can first activate an import control (e.g., an "Import Historical Season Data" control) to import historical data for one event or for a set of events.

With respect to state 2, the user can then activate event characteristics controls. By way of illustration, a user can define new characteristics or override existing characteristics. For example, the user can activate a "define/select characteristics" control to define and select event characteristics. The user can also, activate an override characteristic control to override characteristics, if desirable or appropriate.

With respect to state 3, event filtering can be performed. A "select events" control is provided (e.g., a "Select Events in Forecast" control) via which the user can set up one or more event filters. A clustering control is provided (e.g., "Characteristic Clustering") which enables a user to select a cluster of events, for example a cluster of the best selling events, and observe whether there is a commonality or a pattern to such events. For example, a pie-chart can be generated and displayed, with the relative number of characteristic values for each selected event in an event demand forecast. By way of illustration, an illustrative chart may indicate that 5 of the selected events are 7:05 PM games, and 1 game is a 4:05 PM game, which illustrates graphically that most of the selected games/events are evening games.

At state 4, forecast generation is performed. In this example, a pre-event sales rate control is provided that, when activated, will cause the system to generate a prediction of sales over time (e.g., a graph format with a sales vs. time curve, and/or in a text format). An estimate future sales control is provided that, when activated, will cause the system to generate an estimate of future sales for one or more events.

Other embodiments can include more, fewer, or different controls, which correspond to more, fewer, or different yield forecast process states than those discussed above with respect to FIG. 13.

An example of the use of the Event Demand Forecast user interface will now be discussed. In this illustrative example, the user wants to predict the demand for a particular sports event for the current season using data from the last two seasons. The user will import historical and other data (if such data needs to be imported), optionally add and/or remove characteristics, optionally override characteristic values, perform event filtering (e.g., select events to be include in the forecast and optionally view characteristic clustering), generate a forecast result report (e.g., display a demand forecast graph (Pre-Event Sales Rate), and/or estimate future sales). For example, if the event being forecast is for a sporting event between two teams on a given date, the report can provide a demand estimate (e.g., seats expected to be sold per price level) for the sporting event based on historical trends. A dollar value can also be provided for expected ticket sales, concession sales, and/or total revenues. Optionally, the report can take into account cost data and provide an estimated net revenue or profitability estimates.

In particular, with respect to importing historical data, in this example, the historical data is imported on a seasonal basis. For example, a report can be generated that includes a season of events, such as a baseball season or a concert tour, and the report results can then be imported (or directly accessed). Optionally, multiple reports, representing multiple seasons' worth of events, can be imported into the yield management system.

By way of illustration, statistical reports can be generated based in whole or in part on past events and the report results can be imported into the yield management system. The data collected by the report can include some or all of the following:
  event code;
  event attributes;
  capacity;
  ticket count, optionally broken down by price level;
  hourly, daily, weekly, and/or monthly ticket sales broken down by operator type; and hourly, daily, weekly, and/or monthly ticket sales broken down by sales channel (e.g., online Website, physical ticket outlets, phones, kiosks, box-office, etc.).

Figure 14:
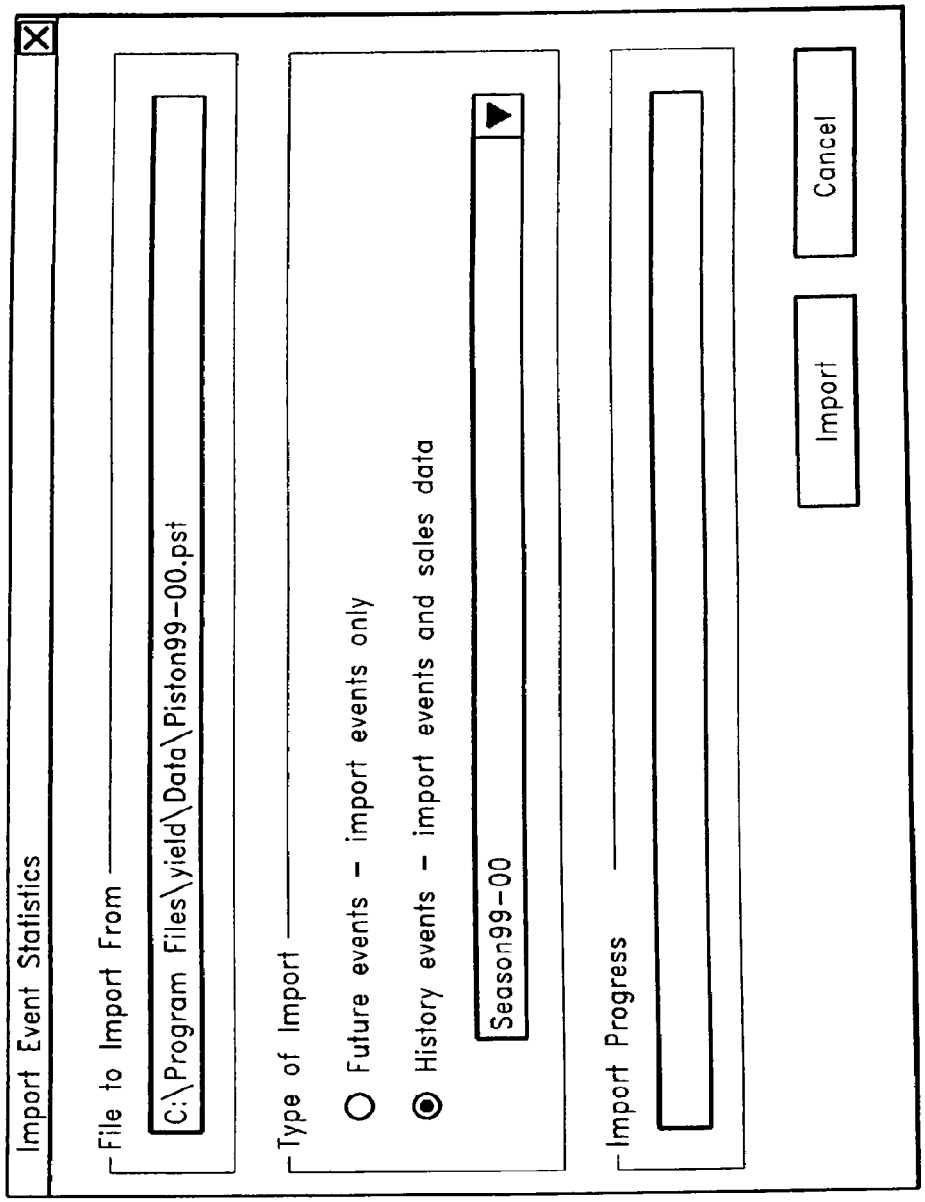
FIG. 14 illustrates an example data import user interface.

The import process can optionally be performed as follows. The user can click the Event Demand Forecast tab to access the corresponding controls (e.g., buttons or links). The user can then click the Import Historical Season Data control, and an import form (e.g., an Import Historical Event Statistics dialog box) is displayed on the user terminal. FIG. 14 illustrates an example data import user interface that can be used to import data (e.g., event type, event data, venue identifier, venue capacity, sales data) corresponding to historical events and/or data for future events (e.g., event type, event data, venue identifier, venue capacity).

Referring to FIG. 14, the user can utilize a file selection user interface (e.g., a File to Import From field) to select a file to be imported, such as a report regarding one or more historical events generated as discussed above. The user can then click on a control to select a type of import (e.g., History Events to import events and sales data, or Future Events to import event data). The user can then enter a name to be associated with the imported reports (e.g., a unique season name, such as one that includes the season year(s)) and activate an import control to initiate the import, which will then be performed by the system. The foregoing process can be repeated to import one or more additional sets of data.

After importing data as described above, the user can activate the define/select characteristics control illustrated in FIG. 13 to define event characteristics, and one or more user interfaces, such as those illustrated in FIGS. 15A-C, are presented via the user terminal. A set of characteristics/attributes are associated with a given event. These characteristics are included in or related to the historical data imported to the yield management system. For example, the characteristics can include predefined characteristics or characteristics that are defined during the import process, such as some or all of the following: Primary Performer, Secondary Performer, Performance Date, Day of Week, Time of Day, Major Category, Minor Category, Venue, and Prototype Curve. A prototype, as used herein, is set of data, which acts as a standard or reference that other event data can be compared to.

Optionally, the user may create user-defined characteristics. The user-defined characteristic may be related or unrelated to existing characteristics. For example, a user may define a new characteristic with values of "weekday" and "weekend". Such characteristic can be created based on the day of week characteristic. For example, events with a "day of week" value of Monday, Tuesday, Wednesday, Thursday or Friday will be assigned a value of weekday for the new characteristic. Events with a "day of week" value of Saturday or Sunday will be assigned a value of weekend. FIGS. 16A-B illustrates an example weekend/weekdays characteristics and values user interface via which a user can map characteristics, select prototype curve values, and select "day of week" values.

By way of further illustration, another example user-defined characteristic can be "baseball special promotions" with values such as no promotions, bat day, baseball card day, and so on. This user-defined characteristic can optionally be a stand-alone characteristic (e.g., not based on or related to other event characteristics), and optionally, the characteristic value for a given event is entered manually or otherwise.

Users are optionally also provided with the ability to add characteristics, modify characteristics, edit characteristic values, or delete characteristics via appropriate controls, such as the "Add Characteristic", "Delete Characteristic", and "Edit Values" controls illustrated in FIGS. 15A-B. Thus, for example, if a specific characteristic does not contain relevant information for forecasting purposes, the user may choose to delete that characteristic. An example may be the venue characteristic for a sports team (although in many instances, the venue characteristic may be relevant for a sports team). FIG. 15C illustrates a user interface displayed when the user activates the edit characteristic control. The user can select the characteristic to be edited from a current table (e.g., "Primary Performer"), select a characteristic type, and select from one or more allowed characteristic assignments (e.g., one or more baseball teams).

Characteristics can also be used to visually identify event patterns and commonalities. For example, a user can instruct the system to generate a graph of imported historical sales data. The user can then select a cluster of events, for example a cluster of the best selling events, and find out if there is a commonality or a pattern to the best selling events. By way of illustration, for a sports team, it may be one or more particular opposing teams that appear to cause sales to significantly increase. For a concert tour, it may be a specific venue or a day of week (e.g. Saturday) that tend to be associated with the best selling events or that tend to coincide with increased ticket sales for like-priced tickets.

In addition to enabling users to assign characteristics to events, the user interfaces illustrated in FIGS. 15A-B enable a user to assign overrides because of external circumstances or where otherwise appropriate.

An example characteristic creation process will now be described, although other processes and states can be used.

1. The user can activate the Define/Select Characteristics control from the user interface illustrated in FIG. 13. A table of the existing characteristics and their corresponding values, such as that illustrated in FIG. 15A, is then displayed to the user.
2. The user can activate the Add Characteristic control illustrated in FIG. 15A. A new characteristic will be displayed (e.g., at the bottom of the table). The user can activate (e.g., double-click) the name to place the cursor in the name field, delete the default name, and type a new name.
3. The characteristic type is displayed as <Undefined>. The user can click on a drop down list arrow or other menu to display a list of data types (e.g., Number, Date, Time and Text) which the user can then select.
4. The user can click the Edit Values control.
5. The can user position the cursor in a blank Values field and click an Add control (e.g., via a right-click menu selection).
6. The user can then type the desired value.
7. The user can repeat steps 5 and 6 until the values of the characteristic have been appropriately defined.

To assign values to events for a new related characteristic, the user proceeds to steps 8 and 9. To assign values to events for a new stand-alone (unrelated) characteristic, steps 8 and 9 can be skipped, and the user performs an assignment of characteristic values to events for a new, unrelated characteristic.
8. From a Mapped Characteristics list, such as that illustrated in FIG. 16B, the user selects the check box for the characteristic that corresponds to the newly created characteristic, and the values for that characteristic will be displayed.
9. From the new characteristics Values box, the user selects check boxes for corresponding characteristic values.

If the user is assigning characteristic values to for a new unrelated characteristic, the following process can be performed.
1. The user activates the Override Characteristic Values control illustrated in FIG. 13. A table of events and corresponding characteristic values is displayed.
2. The user can select a default value, <Undefined>, for the new characteristic, the user can click on a drop down list arrow or other menu to display a list of values from which the user can then select the appropriate value.
3. If more than one season of data has been imported, the user can select the next season and from the new characteristics Values box, select check boxes for corresponding characteristic values.

With respect to deleting a characteristic, the user can select a characteristic (e.g., via the table illustrated in FIG. 15A) to be deleted, click on the delete control, and the characteristic will be deleted.

A user can optionally specify how many events are to be used to generate a demand forecast. Many events have ticket sales that generally correspond to one of the following curve-types, which can be used a prototype curves, although some events may have ticket sales that correspond to different curves, such as a combination of one or more of the following curves.

Curve A: The first portion of the curve corresponds to a high sales rate, which then tapers off, reflecting an initial high sales rate, with the sales rate dropping off over time.

Curve B: A relatively flat curve, indicating that sales are relatively constant over the course of the ticket sale or a substantial portion thereof.

Curve C: The first portion of the curve is relatively flat, with the curve then ascending, indicating that the initial sales rate is relatively flat, but that the sales rate increases as the event approaches.

Curve D: The first portion of the curve corresponds to a high sales rate, which then drops to about zero, reflecting a high sales rate until the event is sold out.

Thus, if an event is sold out, it may correspond to Curve D. If the event is 90% sold out it will be a different curve type, and if the event is 30% sold out, the curve is likely to also be different. Optionally, the system can display at the same time the sales vs. time curves for a plurality of selected historical events. The user can declare (e.g., based on final sales), how many events the user considers to belong to the same category or curve type. The system optionally color codes event curves based on user-specified criteria. For example, the user can declare that the ninety-nine events with the highest ticket events belong to a first category (e.g., are Curve A-type events) and that such curves are to be color coded red, and that the events ranges 100-200 by sales belong to a second category and that such curves are to be color coded red.

The user can also specify that an average demand curve over time is to be displayed for events belonging to the first category, the second category, and/or a combination of the first and second categories. The actual or relative sales rates of a current event can be observed and compared and fit against a prototype curve (e.g., an average demand curve and/or one or more of the individual event curves), and a prediction can be made regarding future sales for the current event.

As previously discussed, a user can set up one or more events filters to identify and select appropriate historical data to be used in demand forecasting, yield management, or otherwise. A filter can be defined which to locate historical events that have a set of characteristics that correspond to the event to be forecasted.

For example, if data for an entire season were imported, there may be specific events that the user believes may more closely represent the event to be forecasted. Thus, the user can use the filter to include those more representative events, rather than the entire season, in performing a forecasting analysis. Optionally, the user can assign weights to data and override characteristics.

Optionally, a table can be presented to the user that lists one or more imported events and optionally, the characteristics (e.g., Primary Performer, Secondary Performer, Performance Date, Day of Week, Time of Day, Major Category, Minor Category, Venue, and Prototype Curve) associated with corresponding events. Optionally, each event (or set of events, such as a season of events) have an inclusion check box via which a user can mark an event or set of events for inclusion in the forecasting analysis, and an exclusion check box via which a user can mark an event or set of events for exclusion from the forecasting analysis. Optionally, the table can be sorted by clicking on a column header, which can aid in grouping events. For example, if the Primary Performer is the Dodgers, the user can click on the Secondary Performer to sort and group the events in which the Dodgers play a particular team (e.g., the Giants) together. The user can then easily select historical games in which the Dodgers played the Giants. Optionally, multiple seasons (or other grouping) of event statistics can be selected for inclusion or exclusion from the event demand forecast. Optionally, a user can activate a "select all" control to select all listed events for inclusion in the forecast analysis, or the user can activate a "clear all" control to unselect currently selected events. The user can activate a filter control (e.g., "Filter Events In Forecast" button) which causes one or more database queries to be generated that correspond to the filter.

Optionally, instead of or in addition to using the table above to select of filter events, a user can view event demand graphs of multiple events and select (e.g., via a lasso or user drawn selection tool, wherein a user can draw out an irregularly or regularly shaped area with a pointer, and the objects inside this area are selected) a certain cluster in the graph, and the historical data corresponding to the selected cluster or events will be used to generate a demand forecast for the event at issue. Optionally, in addition or instead, the user can form a database query for the characteristics of the past events that the user expects to see in the event at issue.

For example, a user might filter for evening Dodgers games, where the opposing team is the Padres. A table will display Dodgers night games against the Padres. Demand forecasts created under this filter would forecast demand for future evening Dodgers vs. Padres games.

FIG. 18 illustrates an example user interface for defining a filter. In this example, the user has set up the filter to select events wherein the secondary performer characteristic (e.g., the visiting team) equals the Milwaukee Brewers, and the "time of day" characteristic equals 7:05 PM. The user has named the filter "Brewers Night Games." The desired relation between the characteristic and the characteristic value can be set using a desired comparison parameter (e.g., equal to, not equal to, great than, less than, etc.). When the filter is applied, the system will locate and display events in which the Brewers played, scheduled for 7:05 PM. The user can later use the saved filter without having to redefine the filter. This example filter would be appropriate for forecasting what the pre-event sales for evening Brewers games might look like for the next season.

As previously discussed, the system enables a user to override/remap characteristic values. A user can select the mapped characteristic, select the desired value, and select a "Use Override Characteristic Values in Forecast" instruction. The system will then use the override value. FIG. 19 illustrates an example characteristic override user interface. The user can select a desired event season or seasons via a select season menu. A user can click on or otherwise select a characteristic value (e.g., the Philadelphia Phillies) and enter a mapped-to value. In this example, a user selected the Philadelphia Phillies for entry EPM0425, and selected or typed in the San Francisco Giants as the mapped-to characteristic value. The user interface indicates which value is the actual value and which is the remapped or mapped-to value. For example, although the Florida Marlins may actually be playing the Philadelphia Phillies for a given game, the user can instead specify that a game in which the Giants are playing is to be used in generating a forecast.

As previously discussed, a user can request a demand forecasting report, such as Pre-Event Sales Rate report. The report can be in the form of a time trend analysis that uses historical event data to predict sales for future events based on selected events with characteristics similar to those of the future events. The time trend analysis can be presented in the form of a graph of forecasted daily cumulative sales (e.g., as a percentage of the final sales and/or in absolute numbers). Forecast information can be used for tracking and planning purposes. For example, if actual sales are below forecasted sales, a promotion (e.g., a discount, two-for-one sale, free parking, free or discounted concessions, upgraded seat, etc.) may be implemented by the Seller to increase sales.

By way of example, based upon a set of selected events, a pre-event demand forecast view displays a forecast of expected sales leading up to the performance date. One axis optionally represents the cumulative sales, optionally as a percentage of final sales, and a second axis represents the number of days (or other time period, such as hours) before the event. The graph can display demand or other appropriate statistical curves for events used in generating the forecast (optionally, with a first color coding or other identifier), events not used in generating the demand curve (optionally, with a second color coding or other identifier), and a demand curve (forecasted average of expected or estimated cumulative sales) for the event being forecasted (optionally, with a third color coding or other identifier). The term curve as used herein is not limited to smooth curves, and can also include jagged curves, and curves with ninety degree or other points of inflection. By way of further example, several different graph types can be used to display demand curves. For example, a linear graph tries to fit a line through the curves, an exponential graph tries to fit an exponential decay curve through the data points, etc.

Figure 20:
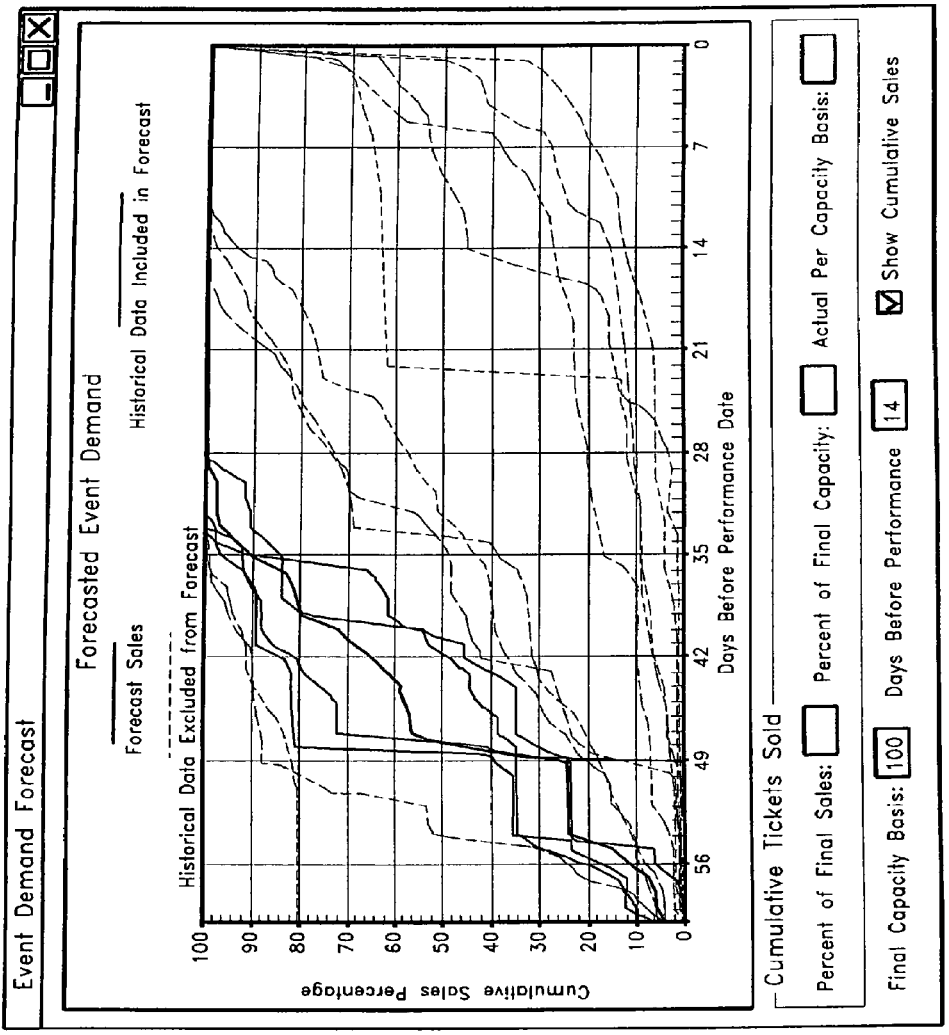
FIG. 20 illustrates an example event demand forecast user interface.

FIG. 20 illustrates an example event demand forecast user interface. The user interface presents several categories of color-coded (or otherwise identified) demand curves. For example, the illustrated user interface presents curves for historical event data not being used in the current forecast, for historical event data being used in the current forecast, and for a predicted demand curve for the event being forecast. In this example, the X-axis corresponds to cumulative sales percentages relative to the total event sales (e.g., 100 (sales to day/total sales)). The Y-axis corresponds to the number of days (or other specified time increment) before the event. Optionally, instead, the X-axis can correspond to cumulative sales percentages relative to the total number of event tickets offered for sale or event capacity. Optionally, instead, the X-axis can correspond to cumulative sales, rather than as a ratio or percentage. As the user moves a cursor (e.g., using a pointing device) over a portion of a demand curve, the system causes the user interface to display the corresponding cumulative sales as a percent of total final sales, the corresponding cumulative sales as a percent of final event capacity, the actual sales per capacity basis, and the corresponding days before the event, in corresponding user interface fields. The user can specify the final capacity basis via a final capacity basis field.

Figure 21:
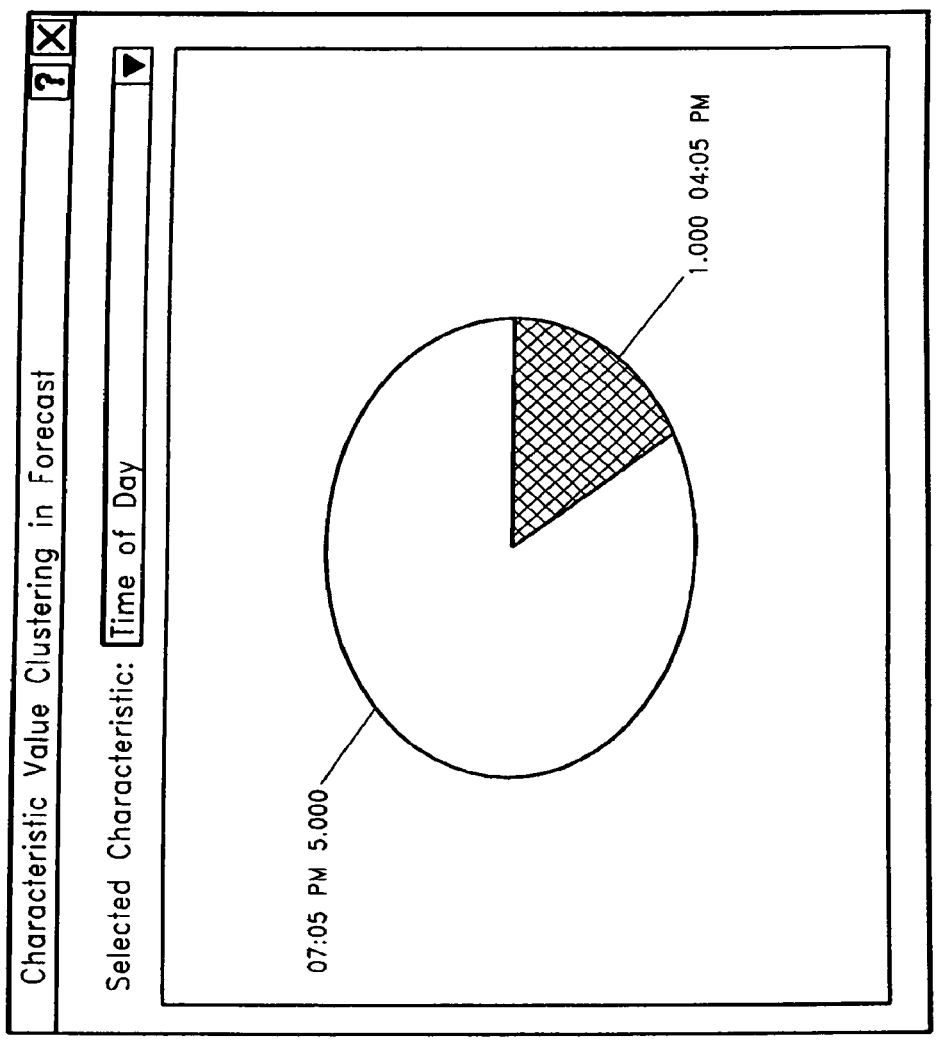
FIG. 21 illustrates an example user interface for displaying characteristic value clustering.

Optionally, a user select (e.g., via a lasso, selection rectangle, or user drawn selection tool) a cluster of interest in the graph, and the historical data corresponding to the selected cluster or events will be used to generate a pie chart, such as that illustrated in FIG. 21. The example pie chart in FIG. 21 indicates that 5 of the selected events are 7:05 PM games, and 1 game is a 4:05 PM game, which indicates that most of the selected games/events in the cluster are evening games.

As previously discussed, if a user observes a group of curves on the graph which appear to be clustered, the user optionally can visually select the clustered curves via a lasso or otherwise. Events corresponding to the set of selected curves will be selected and the event demand forecast will be re-generated based upon this selection. After selecting curves in this fashion, a user interface displaying characteristic value clustering is optionally performed.

Optionally, demand forecasting can be performed using interpolation to predict sales/demand for an event, even if the event's characteristics do not match those of an historical event. This type of analysis is optionally performed when certain characteristics of the event to be forecasted do not match or do not sufficiently match characteristics from the set of imported historical events. Interpolation can be used instead of, or in addition to selecting a group of events to produce a forecast for an event whose characteristics "look like" the characteristics in the selected group of events.

Thus, a system and process has been described that provides for:
1. Importing historical demand statistics
2. Selecting and/or filtering events with characteristics similar to the expected event
3. Weighting different events of event seasons of statistics
4. Overriding characteristics
5. Producing a demand forecast
6. Viewing characteristic value clustering
7. Predicting sales/demand for an event using interpolation Optionally, a value (e.g., a dollar value or a relative value) can be assigned to one or more seats or seating areas. Once seat ticket pricing has been determined based on the yield management processes described above or otherwise, a comparison can be performed with the assigned value. If the pricing and the values differ, or differ more than a certain amount or percentage, it implies that the values are not correct and/or the system has misestimated the demand at one or more price levels, and the values and/or the pricing can be adjusted accordingly.

Optionally, the system can track the effect of one or more promotions on demand, revenues, the net cost of the promotion, and the net income related to the promotion. Optionally, a report can be generated that provides the event cost without the promotion, and the event cost including the promotion, and the net revenue can be determined.

FIG. 22 illustrates an example user interface for setting up a cash flow analysis, such as a new cash flow analysis. Creating a new cash flow analysis, which provides a cash flow estimates, sets up an initial demand estimate and a cash flow schedule. In addition, a user specifies one or more analysis parameters. The user can specify the source(s) of the initial demand estimate(s), the initial cost/income schedule, the number of event price levels, a minimum price, and a maximum price, which then be used in generating a cash flow prediction. For example, price levels can play a role in demand estimation, ticket pricing, and splitting of cash flow items by price level. The minimum and maximum prices provide a lower and upper bound for demand estimations, so the cash flow analysis software can determine whether sufficient information has been provided to accurately approximate, or interpolate, expected demand for one or more prices between the minimum and maximum price level or at the minimum or maximum price level.

FIG. 23 illustrates an example cash flow schedule. A cash flow schedule represents an itemization of the expected costs and income associated with an event. A given schedule item contributes positive or negative cash flow to an event's overall net cash flow. Cash flow for an individual schedule item is optionally determined by a rule input value (e.g., face value, security, post-event clean up, performer fee, food and drink, performer's share of the concessions, surcharge to ticketing system operator, etc.) and rule type (e.g., fixed amount, per ticket sold, per seat of capacity, percent of ticket revenue, percent of another schedule item's cash flow, etc.). To flexibly represent different types of real-world cost and income items, optionally several different rule types are supported. A positive rule input value denotes positive cash flow (income), while a negative rule input value denotes negative cash flow (cost).

Schedule items are assigned to categories. These categories are used to filter, or limit, the items displayed in a schedule, or to target a cash flow optimization to a single category. Categories for cash flow schedule items can be changed by clicking on an existing item's category, and selecting a new category from a drop down menu or otherwise.

Estimated cash flows are optionally provided for one or more items based on pessimistic demand estimates, likely demand estimates, and optimistic demand estimates. The pessimistic, likely, and optimistic estimated total net cash flows are provided by summing the corresponding item cash flows. When the user activates the "optimize cash flow" control, the user will enter parameters, and based on the cash flow schedule and the user defined parameters, the system will select a ticket price for one or more event areas or price bands that will result in the highest estimated cash flow.

The example table below provides example rule types, example cash flow computation methodologies, "what if" parameters, and applicable schedule items.

| Rule Type | How Cash Flow is Computed (single rule input) | How Cash Flow is Computed (rule inputs split by price level) | "What-if" Parameters Cash Flow Depends Upon | Example Schedule Items (Applicability) |
| --- | --- | --- | --- | --- |
| Fixed Amount | Same as rule input value. | Sum of rule inputs values for each price level. | Rule input value. | Flat fee for janitorial services. |

-continued

| Rule Type | How Cash Flow is Computed (single rule input) | How Cash Flow is Computed (rule inputs split by price level) | "What-if" Parameters Cash Flow Depends Upon | Example Schedule Items (Applicability) |
|---|---|---|---|---|
| | | | | Fixed cost to rent the venue. Fixed cost to pay the performer. Fixed advertisement income. Fixed costs for promotions. |
| Per Ticket Sold (per attendee) | Multiply the rule input value by overall number of tickets (estimated to be) sold. | Multiply the rule input value for each price level by the number of tickets sold in that price level, then sum these values together. | Rule input value. Ticket pricing Capacity levels Demand estimates | Parking income. Security services where staffing scales with the number of people attending the event. Janitorial services, where the fee scales with the number of "seats to clean". |
| Per Seat of Capacity | Multiply rule input value by overall venue capacity (shown in capacity shift form). | Multiply the rule input value for each price level by the number of seats of capacity for that price level, then sum the per-price-level values together. | Rule input value. Capacity levels | |
| Percent of Ticket Revenue | Multiply the rule input value by the overall expected revenue. | Multiply the rule input value for each price level by the expected revenue for that price level, then sum the per-price level values together. | Rule input value. Ticket pricing Capacity levels Demand estimates | Ticketing Surcharges. Performer's cut of revenue. |
| Percent of another schedule items cash Flow | Multiply the rule input value by the overall positive or negative cash flow for another item's cash flow. | Multiply the rule input value by the overall positive or negative cash flow for another item's cash flow and if appropriate, for each price level, where the per-price level values are summed | Rule input value What the 'linked to' item depends upon | Performer's share of concessions income. |

Figure 24:
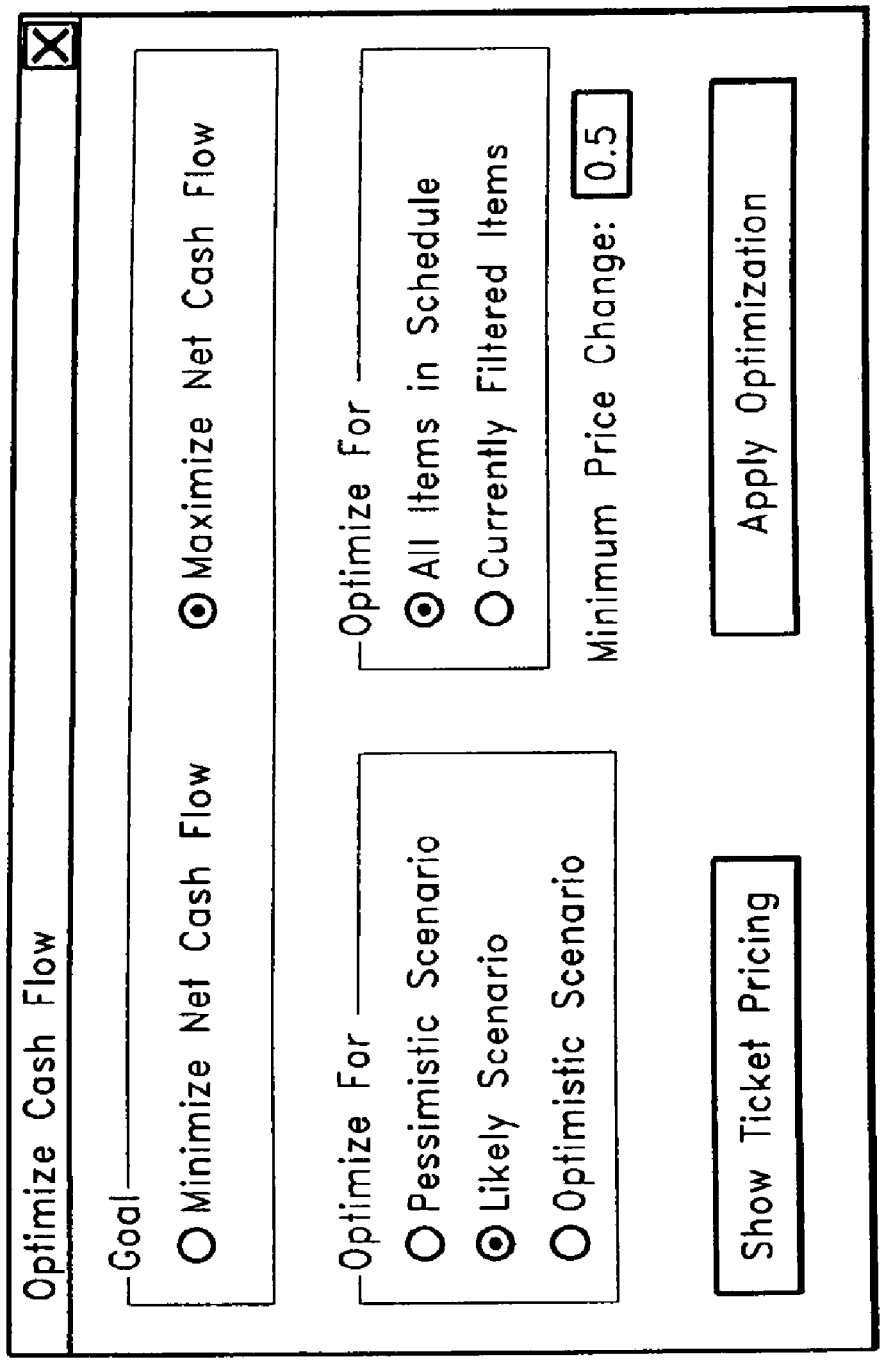
FIG. 24 illustrates an example cash flow enhancement user interface.

FIG. 24 illustrates an example cash flow enhancement user interface which the user can utilize to specify cash flow enhancement or optimization parameters. For example, the user can select a cash flow enhancement goal (e.g., minimize net cash flow or maximize net cash flow). The user can select a demand scenario (e.g., a pessimistic scenario based on pessimistic demand estimates, a likely scenario based on likely demand estimates, or a optimistic scenario based on optimistic demand estimates) that the cash flow is to be optimized or enhanced for. The user can further specify that the optimization or enhancement is to be performed for all schedule items, or a subset thereof, such as items selected by a filter. The user can then activate an "Apply Optimization" control, and the software will perform a cash flow optimization or enhancement process in accordance with the user-specified parameters. The user can activate a "show ticket pricing" and the ticket prices that are predicted to optimize the cash flow according to the user-specified parameters will be calculated and displayed.

Figure 25:
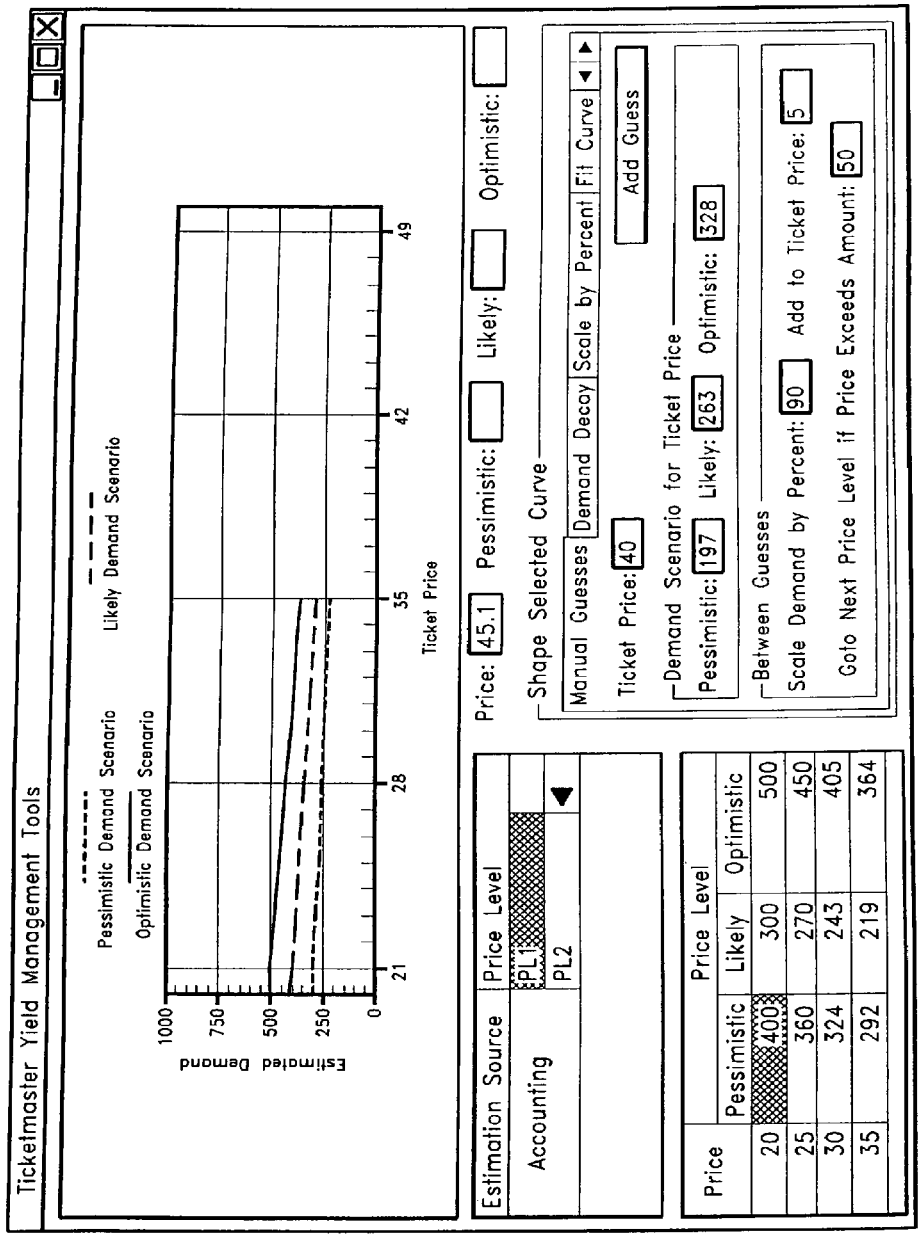
FIG. 25 illustrates an example user interface for displaying demand estimates.

FIG. 25 illustrates an example user interface for displaying demand estimates. The user interface displays estimated demand (e.g., the number of tickets that are estimated will be purchased) vs. ticket prices for one or more scenarios (e.g., a pessimistic scenario based on pessimistic demand estimates, a likely scenario based on likely demand estimates, or a optimistic scenario based on optimistic demand estimates). The user interface provides controls via which the user can select various methods to shape and scale the demand vs. price curves for the currently selected price level and estimation source (e.g., via "Demand Decay", "Scale by Percent", and "Fit Curve" tabs).

The tabs provide a different way to shape or scale the demand vs. price curve for the currently selected price level and estimation source. For example, the Demand Decay tab will perform an exponential fit of the estimates or guesses. The "Scale by Percent" tab enables the user to scale the curves by percent. The "Fit Curve" tab enables the user to instruct the system to perform a second order polynomial fit of the estimates or guesses. The "Manual Guesses" tab enables the user to add demand guesses (e.g., pessimistic, likely, and optimistic guesses) for a given ticket price (e.g., $40 in this example).

Rather than having to provide a guess for each dollar increment, the user can specify how demand is to be scaled between guesses (e.g., scale demand by percent) at a given ticket price increment. The user can also specify at what ticket price that next price level should be used.

The user can select one or more demand estimation sources (e.g., accounting department, box office, general manager, etc.) which provide demand estimates at one or more select ticket price levels (e.g., PL 1 or PL 2). The user can make the selections by clicking on a row in the table of estimation sources and price levels.

Demand estimates are completed by adding enough demand guesses to approximate demand for prices between the minimum and maximum ticket prices (e.g., provided by a user while creating a new cash flow analysis). In this regard, completed demand estimates for a given price level are color coded or otherwise emphasized. In the illustrated example "PL 1" is complete, but "PL 2" is incomplete. The demand guesses matrix tabulates the various ticket demand guesses at various price points.

When the user moves the cursor over the graph, the corresponding pessimistic, likely, and optimistic demand approximations (including, but not limited to guesses) for the corresponding ticket price are displayed in the corresponding fields (e.g., the "Price" field, the "Pessimistic" field, the "Likely" field, and the "Optimistic" field"). The resulting estimates can be weighted and combined to produce another estimated demand vs. ticket price curve.

Figure 26:
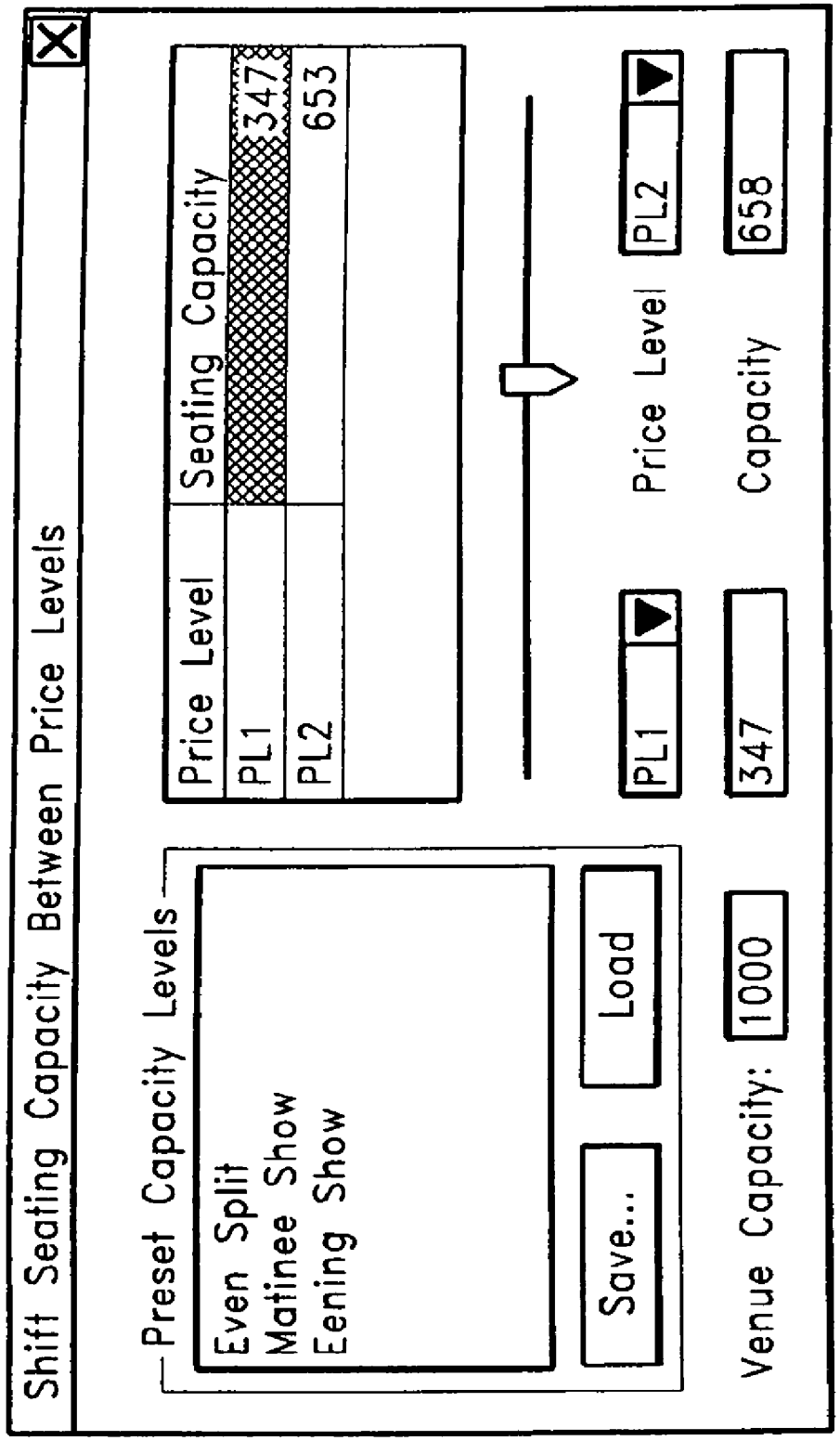
FIG. 26 illustrates an example user interface for shifting seating capacity between price or minimum bid levels.

FIG. 26 illustrates an example user interface for shifting seating capacity between price or minimum bid levels. The user interface enables the user to shift seating capacity from one price level to another price level so as to enhance cash flow. In this example, the user can select from two different price levels (PL 1 and PL 2) and can shift capacities between the price levels. Once the price levels are selected, the capacity fields or the slider can be used to shift capacity between the price levels. Price level fields can be used to select and display the price levels being used. Corresponding capacity fields are used to enter and/or display the current capacity assigned to each price level. A venue capacity field displays the venue capacity.

A set of per-price level capacity levels can also be saved as a preset. This can be useful in situations where a venue has fixed, "natural" divisions between price levels (e.g., lower and upper deck of a theater). Activation of a "Save" control will create a new capacity level preset, based upon the currently displayed capacities. Preset capacity levels can be loaded by double-clicking on the preset's name, or by single-clicking on the preset name, then pressing the "Load" button.

Using one or more of the processes and apparatus disclosed herein, ticket prices can be set closer to market value, thereby ensuring fairer pricing and reducing the ability of ticket brokers and scalpers from exploiting the traditional disparity between ticket face value and market value, wherein ticket brokers and scalpers purchase tickets before most consumers attempt to, and then resell the tickets far above face value. Thus, increased fairness and efficiency is brought to the ticket process.

While the foregoing detailed description discloses several embodiments of the present invention, it should be understood that this disclosure is illustrative only and is not limiting of the present invention. It should be appreciated that the specific configurations and operations disclosed can differ from those described above, and that the methods described herein can be used in contexts other than ticketing systems.

What is claimed is:

1. A method of providing queue messaging to resource requesters, the method comprising:
    determining or estimating by a computer system a position in a queue of a resource request for a first resource associated with a first requester, wherein:
        the resource request was received from a user terminal associated with the first requester;
        the first resource is an event ticket, and
        the queue is configured to queue at least requests for event tickets received from user terminals;
    determining or estimating by the computer system whether the requested resource will be available when the queued request is anticipated to be serviced based at least in part on:
        historical queue abandonment data with respect to ticket requests, and
        how many ticket requests there are in the queue; and
    at least partly in response to estimating or determining that the requested resource will not be available or is unlikely to be available when the queued request is anticipated to be serviced, transmitting by the computer system a message over a network to the user terminal from which the resource request from the first requester was received, the message indicating that the requested resource will not be available or is unlikely to be available when the queued request is anticipated to be serviced.

2. The method as defined in claim 1, the method further comprising providing the first requester with a link enabling the first requester to request an event ticket to an alternate ticketed event in association with the message indicating that the requested resource will not be available or is unlikely to be available when the queued request is anticipated to be serviced.

3. The method as defined in claim 1, the method further comprising:
    inferring that the first requester has an interest in an alternate ticketed event; and
    providing the first requester with a link to information regarding the alternate ticketed event.

4. The method as defined in claim 1, the method further comprising:
    using collaborative filtering to identify an interest of the first requester in an alternate ticketed event; and
    providing the first requester with a link to information regarding the alternate ticketed event.

5. The method as defined in claim 1, the method further comprising:
    selecting a time resolution based at least in part on a first queue condition; and
    providing for display to at least one requester a queue wait time with the selected time resolution.

6. The method as defined in claim 1, the method further comprising:
    based at least in part on a first queue condition, determining whether to provide a queue wait time for display to at least one requester.

7. A system, comprising:
    at least one computing device;
    a non-transitory storage medium having program code stored therein, the program code configured to cause the at least one computing device to perform operations comprising:
        determining or estimating a position in a queue of a resource request for a first resource associated with a first requester, wherein:

the resource request was received from a user terminal associated with the first requester;

the first resource is an event ticket, and the queue is configured to queue at least requests for event tickets received from user terminals;

determining or estimating whether the requested resource will be available when the queued request is anticipated to be serviced based at least in part on:

historical queue abandonment data with respect to ticket requests, and how many ticket requests there are in the queue; and at least partly in response to estimating or determining that the requested resource will not be available or is unlikely to be available when the queued request is anticipated to be serviced, transmitting a message over a network to the user terminal from which the resource request from the first requester was received, the message indicating that the requested resource will not be available or is unlikely to be available when the queued request is anticipated to be serviced.

8. The system as defined in claim 7, the operations further comprising providing the first requester with a link enabling the first requester to request an event ticket to an alternate ticketed event in association with the message indicating that the requested resource will not be available or is unlikely to be available when the queued request is anticipated to be serviced.

9. The system as defined in claim 7, the operations further comprising:

inferring that the first requester has an interest in an alternate ticketed event; and providing the first requester with a link to information regarding the alternate ticketed event.

10. The system as defined in claim 7, the operations further comprising:

using collaborative filtering to identify an interest of the first requester in an alternate ticketed event; and providing the first requester with a link to information regarding the alternate ticketed event.

11. The system as defined in claim 7, the operations further comprising:

selecting a time resolution based at least in part on a first queue condition; and providing for display to at least one requester a queue wait time with the selected time resolution.

12. The system as defined in claim 7, the operations further comprising:

based at least in part on a first queue condition, determining whether to provide a queue wait time for display to at least one requester.

13. A computer product comprising a non-transitory storage medium having program code stored therein, the program code configured to cause a computer system to perform operations comprising:

determining or estimating a position in a queue of a resource request for a first resource associated with a first requester, wherein:

the resource request was received from a user terminal associated with the first requester;

the first resource is an event ticket, and the queue is configured to queue at least requests for event tickets received from user terminals;

determining or estimating whether the requested resource will be available when the queued request is anticipated to be serviced based at least in part on:

historical queue abandonment data with respect to ticket requests, and how many ticket requests there are in the queue; and at least partly in response to estimating or determining that the requested resource will not be available or is unlikely to be available when the queued request is anticipated to be serviced, transmitting a message over a network to the user terminal from which the resource request from the first requester was received, the message indicating that the requested resource will not be or is unlikely to be available when the queued request is anticipated to be serviced.

14. The program code as defined in claim 13, the operations further comprising providing the first requester with a link enabling the first requester to request an event ticket to an alternate ticketed event in association with the message indicating that the requested resource will not be or is unlikely to be available when the queued request is anticipated to be serviced.

15. The program code as defined in claim 13, the operations further comprising:

inferring that the first requester has an interest in an alternate ticketed event; and providing the first requester with a link to information regarding the alternate ticketed event.

16. The program code as defined in claim 13, the operations further comprising:

using collaborative filtering to identify an interest of the first requester in an alternate ticketed event; and providing the first requester with a link to information regarding the alternate ticketed event.

17. The program code as defined in claim 13, the operations further comprising:

selecting a time resolution based at least in part on a first queue condition; and providing for display to at least one requester a queue wait time with the selected time resolution.

18. The program code as defined in claim 13, the operations further comprising:

based at least in part on a first queue condition, determining whether to provide a queue wait time for display to at least one requester.

\* \* \* \* \*